(12) United States Patent
Fujita

(10) Patent No.: US 9,939,967 B2
(45) Date of Patent: Apr. 10, 2018

(54) POSITION DETECTION METHOD IN TOUCH PANEL AND TOUCH PANEL

(71) Applicant: FUJITSU COMPONENT LIMITED, Tokyo (JP)

(72) Inventor: Kenichi Fujita, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 14/445,181

(22) Filed: Jul. 29, 2014

(65) Prior Publication Data
US 2014/0333583 A1    Nov. 13, 2014

Related U.S. Application Data

(63) Continuation of application No. PCT/JP2013/051934, filed on Jan. 29, 2013.

(30) Foreign Application Priority Data

Jan. 31, 2012   (JP) ................................. 2012-019103

(51) Int. Cl.
   *G06F 3/044*   (2006.01)
   *G06F 3/045*   (2006.01)
   *G06F 3/041*   (2006.01)

(52) U.S. Cl.
   CPC .............. *G06F 3/044* (2013.01); *G06F 3/045* (2013.01); *G06F 3/0418* (2013.01); *G06F 2203/04104* (2013.01); *G06F 2203/04112* (2013.01)

(58) Field of Classification Search
   CPC .. G06F 3/0416; G06F 3/04883; G06F 3/0488; G06F 3/045; G06F 3/0412;
   (Continued)

(56) References Cited

U.S. PATENT DOCUMENTS 4,389,711 A *  6/1983  Hotta ..................... G06F 3/0414
                                                         178/18.03
6,255,604 B1   7/2001  Tokioka et al.
(Continued)

FOREIGN PATENT DOCUMENTS

EP      2410412       1/2012
JP      H01-269120    10/1989
(Continued)

OTHER PUBLICATIONS

International Search Report dated May 7, 2013.

*Primary Examiner* — Nalini Mummalaneni
(74) *Attorney, Agent, or Firm* — IPUSA, PLLC

(57) ABSTRACT

A position detection method that includes calculating a distance between 2 contact points in a first direction by measuring a potential of a first electrode in a state where a power supply voltage is applied to the first electrode and a second electrode is grounded, calculating a distance between 2 contact points in a second direction by measuring a potential of a third electrode in a state where a power supply voltage is applied to the third electrode and a fourth electrode is grounded, and correcting the distance between the 2 contact points in the first direction obtained by the potential of the first electrode in accordance with the distance between the 2 contact points in the second direction obtained by the potential of the third electrode.

14 Claims, 74 Drawing Sheets

(58) Field of Classification Search
CPC .... G06F 3/041; G06F 3/0418; G06F 3/04886;
G06F 3/03547; G06F 3/047; G06F 3/038;
G06F 3/04817; G06F 3/017; G06F
3/0414; G06F 3/016; G06F 3/03545;
G06F 3/04101; G06F 3/04106; G06F
3/04102; G06F 3/04108; G06F 3/04105;
G06F 2203/04104; G06F 2203/04808;
G06F 2203/04103; G06F 2203/04112;
G06F 2203/0381; G06F 2203/014; G06F
1/1643; G06F 1/16; G06F 1/3262; G06F
1/1652; G06F 1/13338; G06F 1/1684;
Y10T 29/49155; Y10T 29/49124; Y10T
29/49117; Y10T 29/49826
See application file for complete search history.

(56) References Cited

U.S. PATENT DOCUMENTS

| | | | |
|---|---|---|---|
| 2005/0041018 A1* | 2/2005 | Philipp | G06F 3/045 |
| | | | 345/178 |
| 2006/0279548 A1* | 12/2006 | Geaghan | G06F 3/0416 |
| | | | 345/173 |
| 2009/0189877 A1 | 7/2009 | Washino et al. | |
| 2011/0025642 A1 | 2/2011 | Tada et al. | |
| 2011/0157083 A1 | 6/2011 | Hershman et al. | |
| 2011/0261011 A1 | 10/2011 | Sakamoto | |
| 2012/0262417 A1* | 10/2012 | Wakasugi | G06F 3/0416 |
| | | | 345/174 |

FOREIGN PATENT DOCUMENTS

| | | | | |
|---|---|---|---|---|
| JP | H03-077119 | 4/1991 | | |
| JP | H08-054976 | 2/1996 | | |
| JP | H08-054977 | 2/1996 | | |
| JP | H08-241161 | 9/1996 | | |
| JP | 2554577 | 11/1996 | | |
| JP | H09-045184 | 2/1997 | | |
| JP | H10-171581 | 6/1998 | | |
| JP | H11-095929 | 4/1999 | | |
| JP | H11-232023 | 8/1999 | | |
| JP | 2001-067186 | 3/2001 | | |
| JP | 3351080 | 11/2002 | | |
| JP | 3397519 | 4/2003 | | |
| JP | 3402858 | 5/2003 | | |
| JP | 2005-049978 | 2/2005 | | |
| JP | 2007-156875 | 6/2007 | | |
| JP | 2009-176114 | 8/2009 | | |
| JP | 2009-289157 | 12/2009 | | |
| JP | 2010-102627 | 5/2010 | | |
| JP | 2011-076591 | 4/2011 | | |
| JP | 2011-123815 | 6/2011 | | |
| JP | 2011-134316 | 7/2011 | | |
| JP | 2011-248858 | 12/2011 | | |
| WO | 2011/065011 | 6/2011 | | |
| WO | WO 2011065011 A1 * | 6/2011 | | G06F 3/0416 |

* cited by examiner

IMAGE OF DEPRESSION POINT

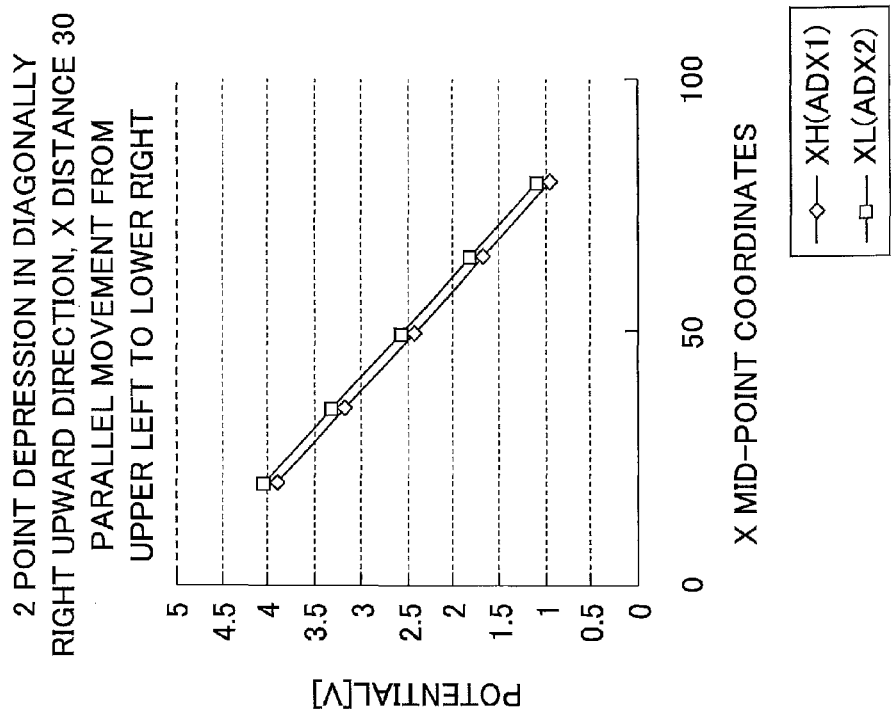
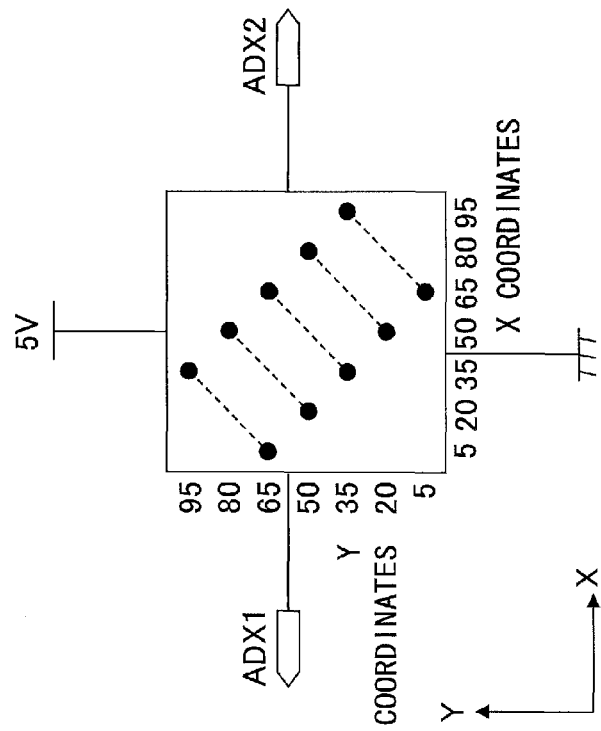

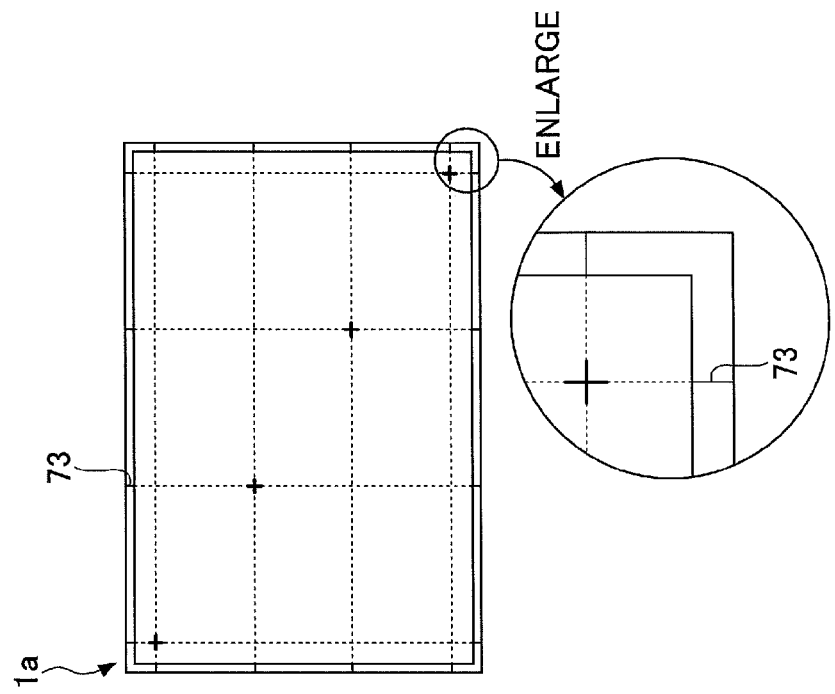
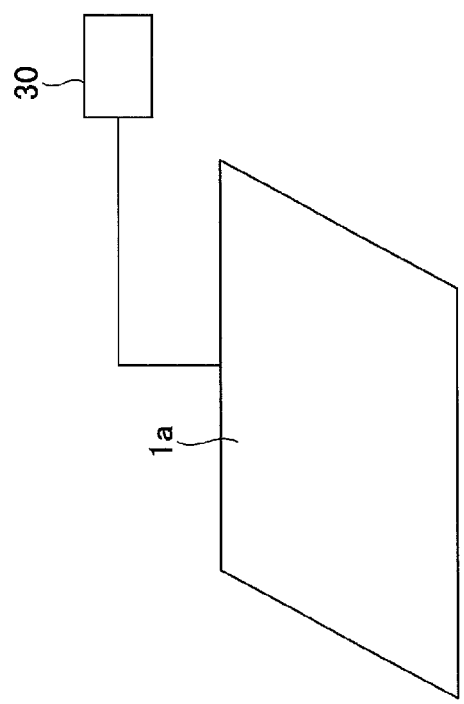

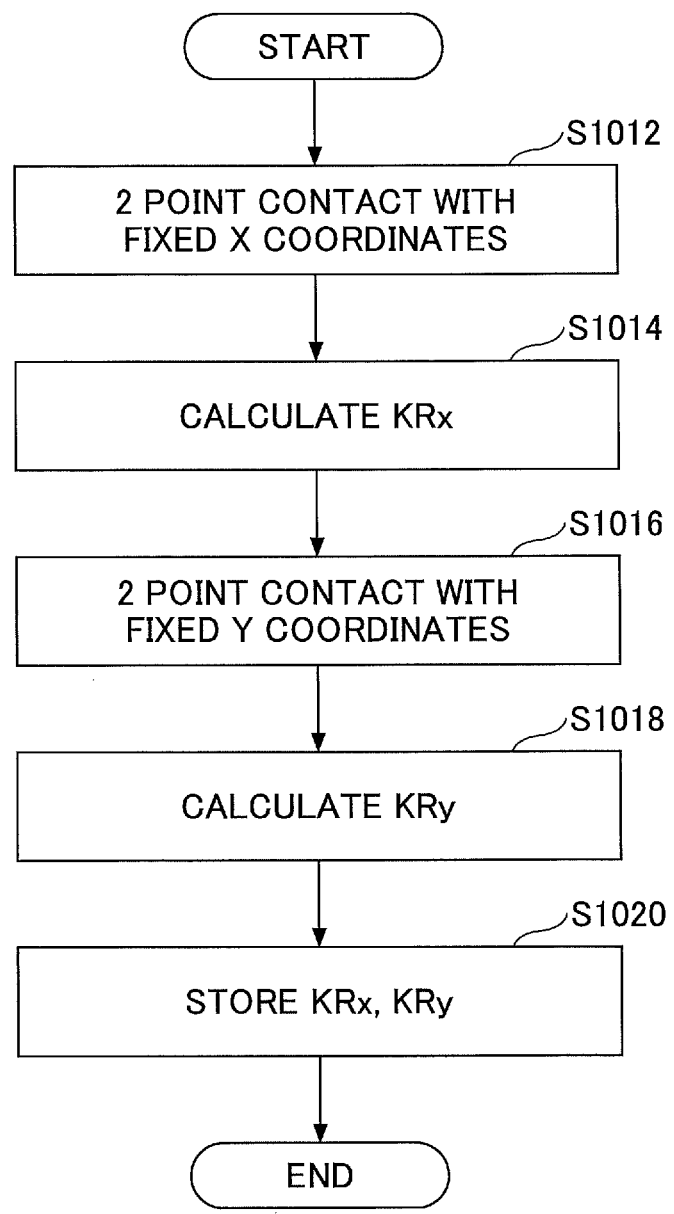

POSITION DETECTION METHOD IN TOUCH PANEL AND TOUCH PANEL

CROSS-REFERENCE TO RELATED APPLICATIONS

This application is a continuation application filed under 35 USC 111(a) claiming benefit under 35 USC 120 and 365(c) of PCT application JP2013/051934, filed Jan. 29, 2013 and designating the U.S., which claims priority to Japanese Patent Application No. 2012-019103, filed on Jan. 31, 2012. The entire contents of all of the foregoing applications are incorporated herein by reference.

FIELD

The embodiments discussed herein are related to a position detection method in a touch panel and a touch panel.

BACKGROUND

Many electronic devices that are currently widely used include a touch panel. Information can be input to an electronic device with the touch panel by directly touching the touch panel with a finger or the like. The touch panel is expected to be further widely used as a simple data input unit.

Incidentally, most typical touch panels detect a contact position when 1 point of the touch panel is being contacted. Therefore, in a case where the touch panel is being contacted at 2 points or more, position of the contact points cannot be detected accurately. Therefore, there is a desire for a method that allows accurate position detection even in a case where the contact points are two points.

As for a method of detecting contact points in a case where the contacts points are two points of the touch panel, various methods are disclosed in the following Patent Documents 1 to 17.

More specifically, there is disclosed, for example, a method of using the slight difference between the time of contacting the first point and the time of contacting the second point, a method of connecting a resistance to a conductive film of a touch panel, and a method of applying a voltage between an X side electrode and a Y side electrode.

Further, in the following Patent Document 12, there is disclosed a method of detecting distance information between 2 points in a case where 2 points are depressed. Further, in the following Patent Document 14, a configuration having a divided resistance film is disclosed. Further, in the following Patent Document 17, a configuration having 2 sets of resistance films is disclosed. Further, in the following Patent Documents 18 and 19, there is disclosed a method that corrects distortion caused by contacting 1 point.

Patent Document 1: Japanese Registered Patent No. 3402858
Patent Document 2: Japanese Laid-Open Patent Publication No. 2009-289157
Patent Document 3: Japanese Registered Patent No. 3397519
Patent Document 4: Japanese Laid-Open Patent Publication No. 8-54976
Patent Document 5: Japanese Laid-Open Patent Publication No. 3-77119
Patent Document 6: Japanese Laid-Open Patent Publication No. 10-171581
Patent Document 7: Japanese Laid-Open Patent Publication No. 11-95929
Patent Document 8: Japanese Laid-Open Patent Publication No. 1-269120
Patent Document 9: Japanese Laid-Open Patent Publication No. 8-241161
Patent Document 10: Japanese Laid-Open Patent Publication No. 8-54977
Patent Document 11: Japanese Laid-Open Patent Publication No. 2007-156875
Patent Document 12: Japanese Laid-Open Patent Publication No. 2009-176114
Patent Document 13: Japanese Registered Patent No. 3351080
Patent Document 14: Japanese Laid-Open Patent Publication No. 9-45184
Patent Document 15: Japanese Laid-Open Patent Publication No. 2005-49978
Patent Document 16: Japanese Laid-Open Patent Publication No. 2010-102627
Patent Document 17: Japanese Laid-Open Patent Publication No. 11-232023
Patent Document 18: Japanese Laid-Open Patent Publication No. 2001-67186
Patent Document 19: Japanese Registered Patent No. 2554577
Patent Document 20: Japanese Laid-Open Patent Publication No. 2011-76591
Patent Document 21: Japanese Laid-Open Patent Publication No. 2011-123815
Patent Document 22: Japanese Laid-Open Patent Publication No. 2011-134316

With the above-described method of detecting the position information of 2 contact points of the touch panel, there is a problem of being unable to accurately detect position coordinates of 2 points in a case where the 2 points are contacted simultaneously. Further, the configuration of dividing the resistance film for detecting 2 points or the configuration of providing 2 sets of resistance films for detecting 2 points require a specific structure and lead to increase of manufacturing cost.

Therefore, there is a desire for a position detection method that allows position coordinates to be detected with a conventional 4-wire type touch panel at a low cost even in a case where 2 points are simultaneously contacted.

SUMMARY

According to an aspect of the invention, there is provided a position detection method in a touch panel that includes a first resistance film having first and second electrodes provided one on each end in a first direction and a second resistance film having third and fourth electrodes one on each end in a second direction orthogonal to the first direction. The position detection method includes calculating a distance between 2 contact points in the first direction by measuring a potential of the first electrode in a state where a power supply voltage is applied to the first electrode and the second electrode is grounded, calculating a distance between 2 contact points in the second direction by measuring a potential of the third electrode in a state where a power supply voltage is applied to the third electrode and the fourth electrode is grounded, and correcting the distance between the 2 contact points in the first direction obtained by the potential of the first electrode in accordance with the distance between the 2 contact points in the second direction obtained by the potential of the third electrode.

The object and advantages of the invention will be realized and attained by means of the elements and combinations particularly pointed out in the claims.

It is to be understood that both the foregoing general description and the followed detailed description are exemplary and explanatory and are not restrictive of the invention, as claimed.

BRIEF DESCRIPTION OF DRAWINGS

FIGS. 27A-27B are diagrams (17) illustrating an analysis of the touch panel by using the finite element method;

FIGS. 66A-66B are diagrams (1) for describing another touch panel of the eighth embodiment;

FIG. 74 is a flowchart (2) of a position detection method in a touch panel according to a ninth embodiment of the present invention.

DESCRIPTION OF EMBODIMENTS

Figure 1:
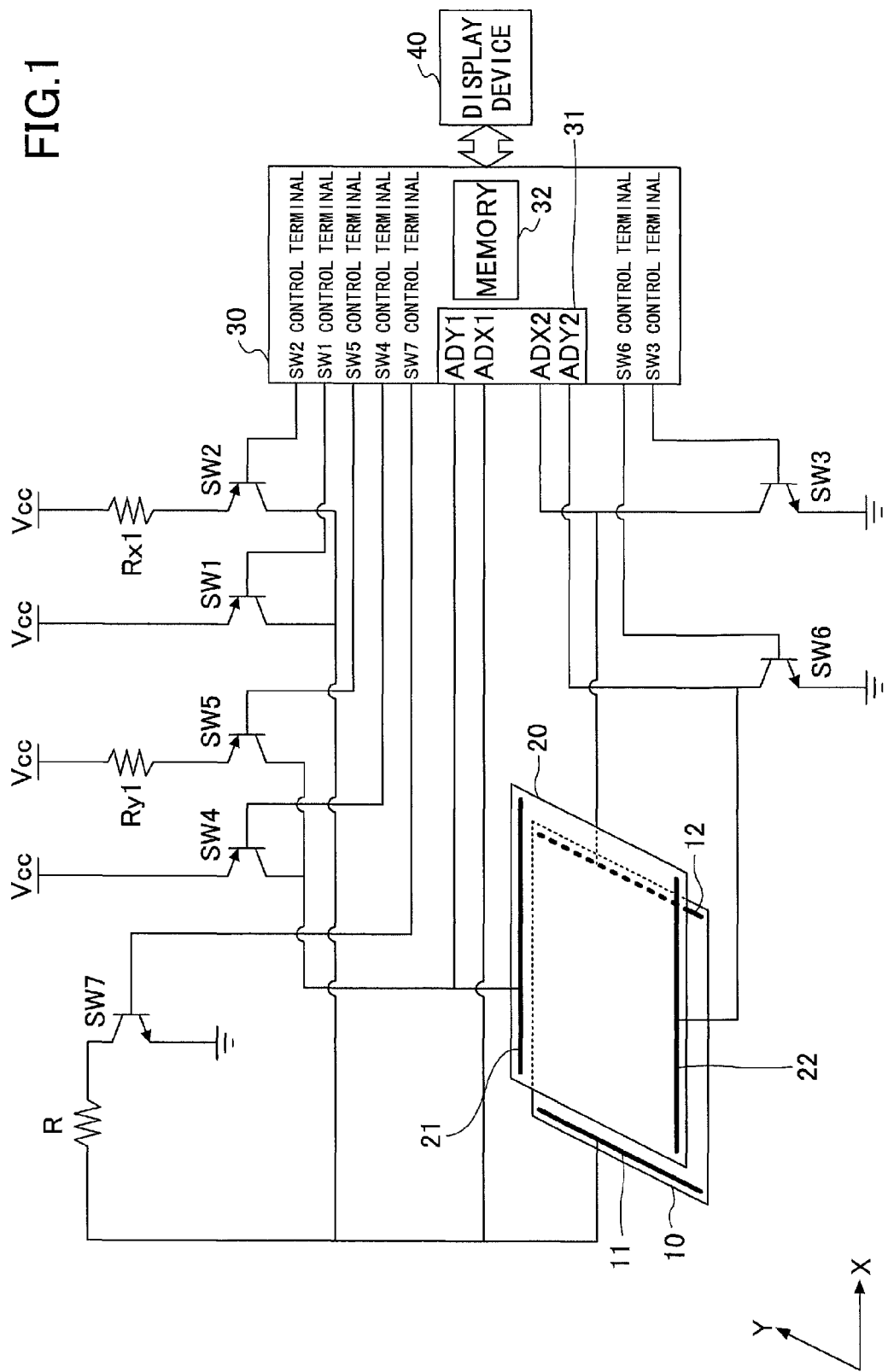
FIG. 1 is a diagram illustrating a configuration of a touch panel used for an embodiment of the present invention.

Embodiments of the present invention are described with reference to the drawings. Like components are denoted with like reference numerals and are not further explained.
<First Embodiment>
<Structure of Touch Panel>

A touch panel of the first embodiment is described with FIG. 1. The touch panel of this embodiment includes a first resistance film 10 and a second resistance film 20 that are formed of a transparent conductive film (e.g., ITO (Indium Tin Oxide)). The first resistance film 10 and the second resistance film 20 may be formed on a surface of a glass substrate, a transparent film, or the like. The first resistance film 10 and the second resistance film 20 are arranged in a manner facing each other. An XH electrode 11 is formed along a Y axis direction on one end of the first resistance film 10 in an X axis direction whereas an XL electrode 12 is formed on another end of the first resistance film 10 in the X axis direction. Further, a YH electrode 21 is formed along the X axis direction on one end of the second resistance film 20 in the Y axis direction whereas a YL electrode 22 is formed along the X axis direction on the other end of the second resistance film 20 in the Y axis direction.

The XH electrode 11 is a first electrode. The XH electrode 11 is connected to a switch SW1 including a transistor connected to a power supply potential Vcc. The XH electrode 11 is also connected to a switch SW2 including a transistor connected to the power supply potential Vcc via a resistor Rx1. The XH electrode 11 and a switch SW7 that includes a transistor connected to a ground potential are via a resistor R. The XH electrode 11 is also connected to a potential detection part ADX1 of an AD converter 31 provided in a control part 30 for detecting potential.

The XL electrode 12 is a second electrode. The XL electrode 12 is connected to a switch SW3 including a transistor connected to the ground voltage. The XL electrode 12 is also connected to a potential detection part ADX2 in the AD converter 31 for detecting potential.

The YH electrode 21 is to be a third electrode. The YH electrode 21 is connected to a switch SW4 including a transistor connected to the power supply potential Vcc. The YH electrode 21 is also connected to a switch SW5 including a transistor connected to the power supply potential Vcc via a resistor Ry1. The YH electrode 21 is also connected to a potential detection part ADY1 for detecting the potential in the AD converter 31 provided in the control part 30.

The YL electrode 22 is to be a fourth electrode. The YL electrode 22 is connected to a switch SW6 including a transistor connected to the ground potential. Further, the YL electrode 22 is connected to a potential detection part ADY2 for detecting the potential in the AD converter 31.

The resistor Rx1 is a first resistor. The resistor Rx1 has a resistance value that is substantially equal to a resistance value of the first resistance film 10 between the XH electrode 11 and the XL electrode 12. The resistor Rx2 is a second resistor. The resistor Rx2 has a resistance value that is substantially equal to a resistance value of the second resistance film 20 between the YH electrode 21 and the YL electrode 22.

The switches SW1, SW2, SW3, SW4, SW5, SW6, and SW7 are connected to a SW1 control terminal, a SW2 control terminal, a SW3 control terminal, a SW4 control terminal, a SW5 control terminal, a SW6 control terminal, and a SW7 control terminal provided in the control part 30, respectively.

A memory 32 capable of storing various information is provided in the control part 30. Further, the control part 30 is connected to a display device 40.
<Position Detection Method>

Figure 2:
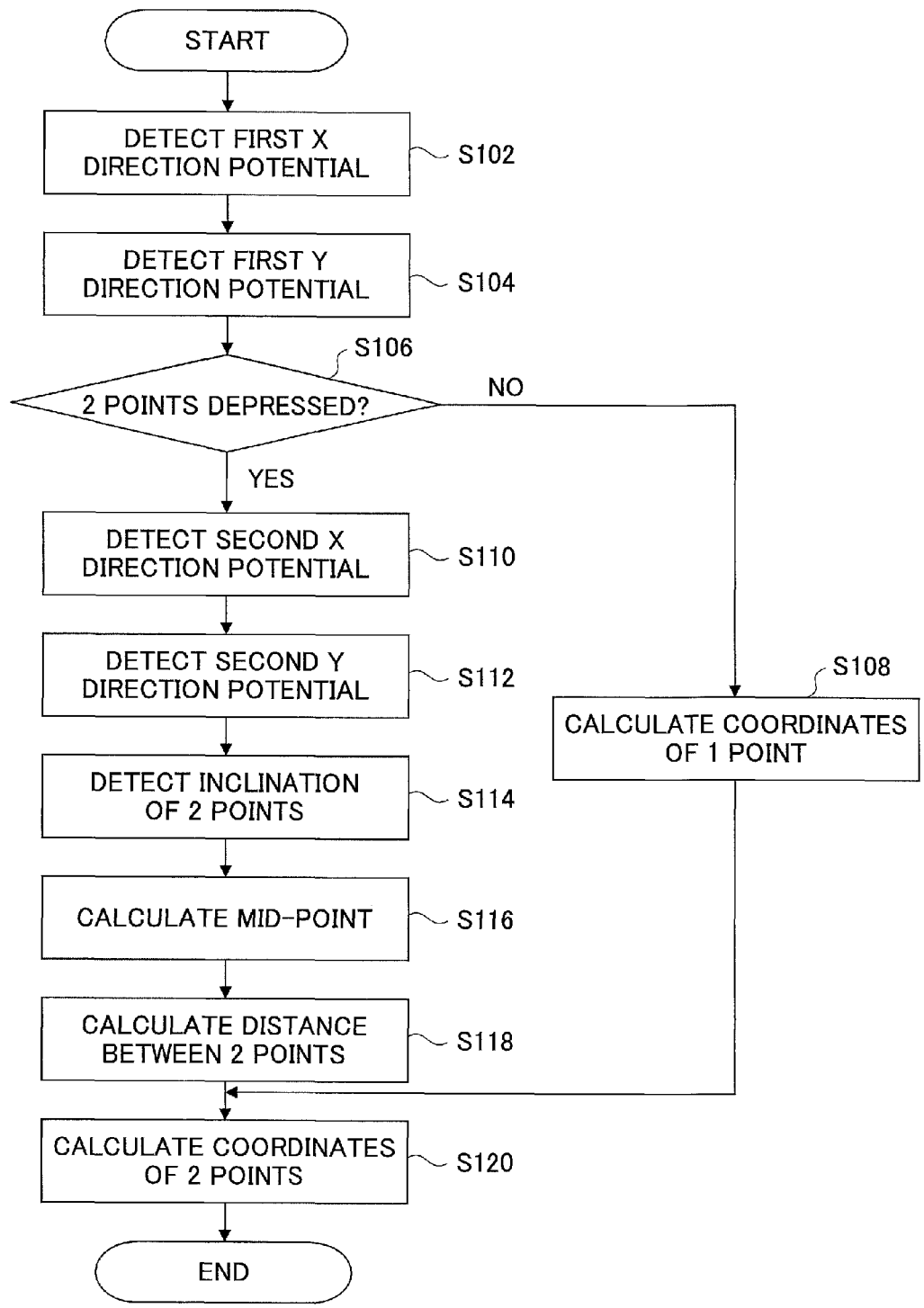
FIG. 2 is a flowchart of a position detection method according to a first embodiment of the present invention.

Next, a position detection method of a touch panel of this embodiment is described. The position detection method of the touch panel, which is a position detection method for a touch panel having the configuration illustrated in FIG. 1, is described with reference to FIG. 2. In describing this embodiment, the power supply potential Vcc may be indicated as "5V" and the ground potential may be indicated a "0V".

First, in Step S102, a first X direction potential detection is performed. More specifically, in the touch panel 1 illustrated in FIG. 1, switches SW2 and SW3 are switched on whereas the other switches are switched off. In this state, the potential is measured with the potential detection part ADX1. In this state, the voltage of Vcc is applied to the XH electrode 11 via the resistor Rx1, and the XL electrode 12 is grounded. Therefore, potential distribution occurs in the X axis direction of the first resistance film 10. In this state, the potential detection part ADX1 measures potential and stores the detected potential in the memory 32 or the like. The potential detected by the potential detection part ADX1 is a value of a voltage divided by a resistance component between the XH electrode 11 and the XL electrode 12 and a resistance of the resistor Rx1. The Step S102 may also be referred to as "first measurement step".

Then, in Step S104, a first Y direction potential detection is performed. More specifically, in the touch panel illustrated in FIG. 1, switches SW5 and SW6 are switched on whereas the other switches are switched off. In this state, the potential is measured with the potential detection part ADY1. In this state, the voltage of Vcc is applied to the YH electrode 21 via the resistor Ry1, and the YL electrode 22 is grounded. Therefore, potential distribution occurs in the Y axis direction of the second resistance film 20. In this state, the potential detection part ADY1 measures potential and stores the detected potential in the memory 32 or the like. The potential detected by the potential detection part ADY1 is a value of a voltage divided by a resistance component between the YH electrode 21 and the YL electrode 22 and a resistance of the resistor Ry1. The Step S104 may also be referred to as "second measurement step".

Then, in Step S106, whether a contact point is 1 point is determined. More specifically, by determining whether the potential measured by the potential detection part ADX1 in Step S102 and the potential measured by the potential detection part ADY1 in Step S104 are both Vcc/2, it is determined whether a contact point is 1 point or 2 points.

Figure 3:
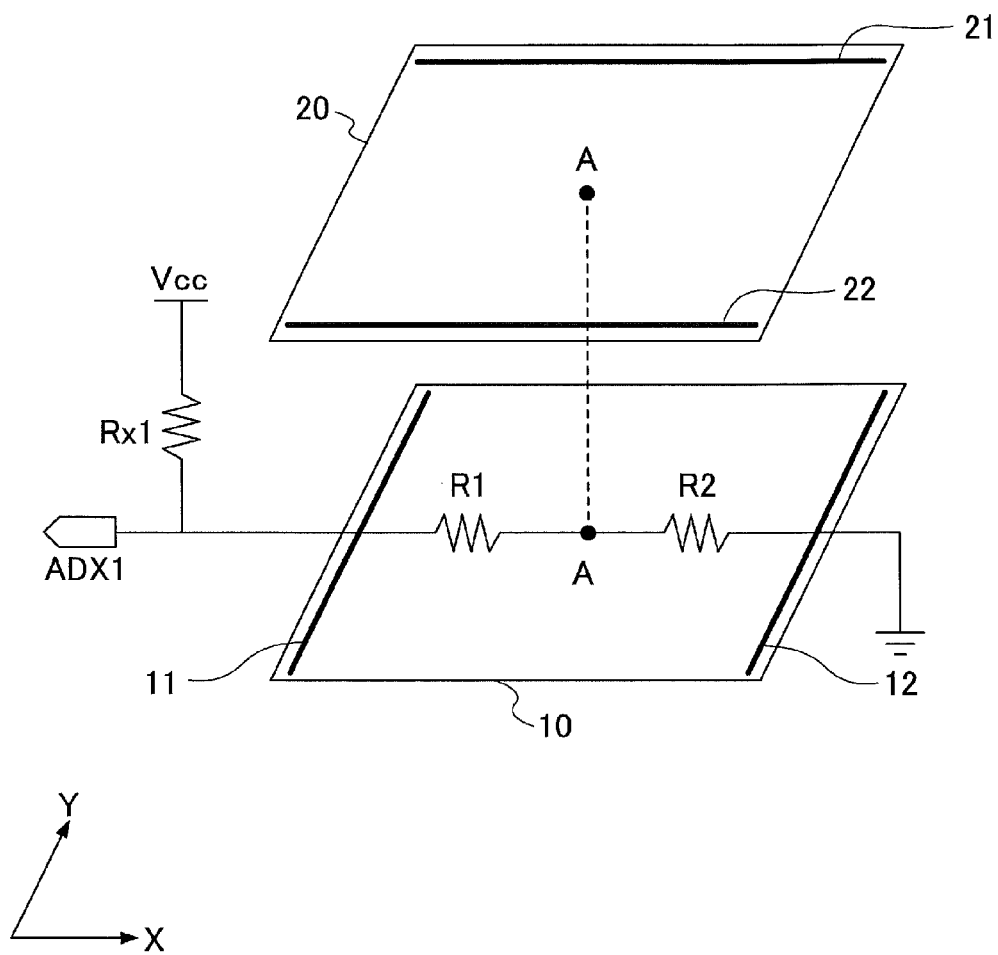
FIG. 3 is a diagram (1) for describing 1 point contact in a touch panel of the first embodiment.

More specifically, in Step S102, the resistance value of the first resistance film 10 between the XH electrode 11 and the XL electrode 12 corresponds to a resistance value where a resistance component R1 and a resistance component R2 of the first resistance film 10 are connected in series if the first resistance film 10 and the second resistance film 20 contacts at only a single point A as illustrated in FIG. 3. The resistance value where a resistance component R1 and a resistance component R2 of the first resistance film 10 are connected in series is substantially equivalent to the resistance value of the resistor Rx1. Therefore, the potential detected by the potential detection part ADX1 becomes Vcc/2.

Figure 4:
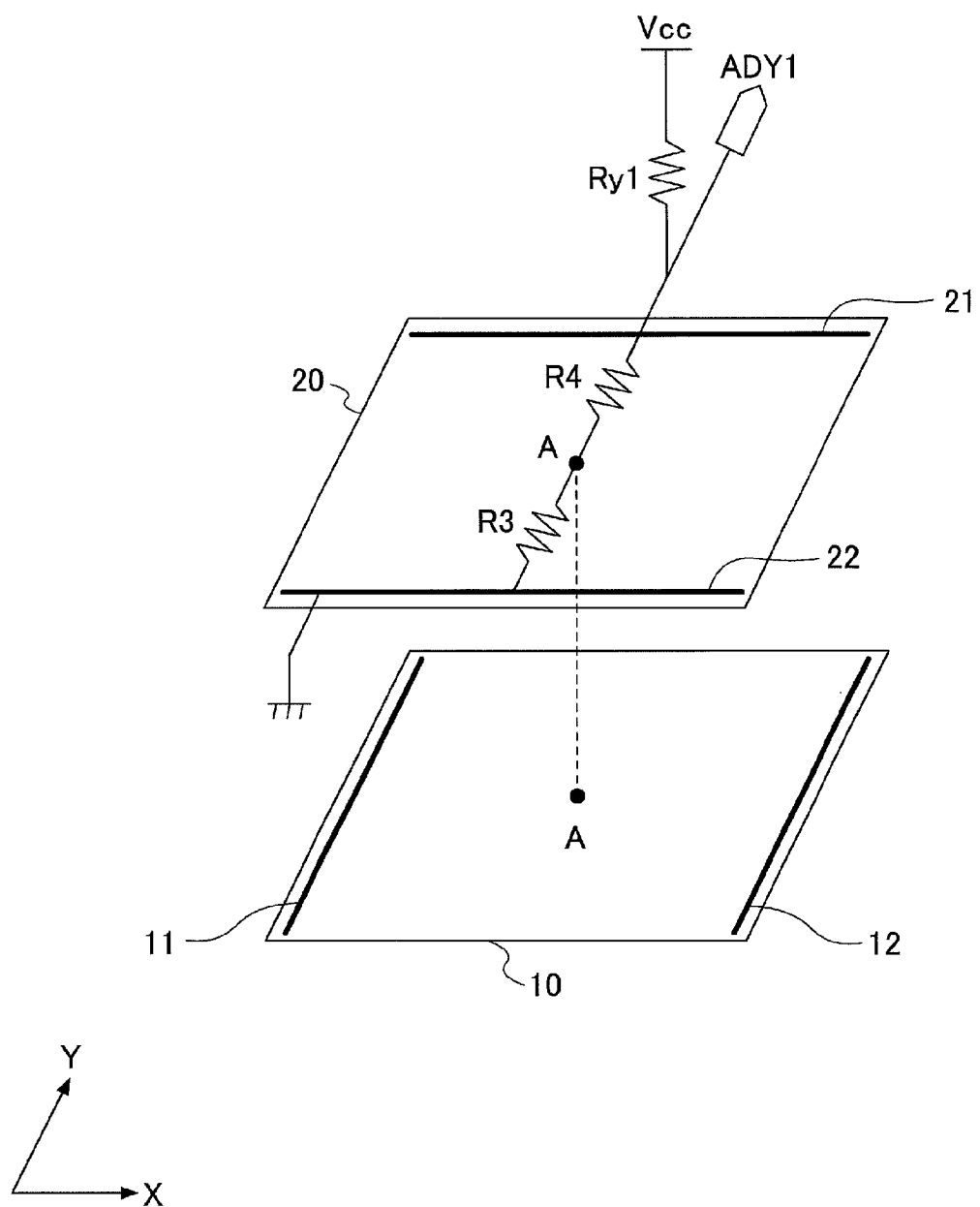
FIG. 4 is a diagram (2) for describing 1 point contact in the touch panel of the first embodiment.

Further, in Step S104, the resistance value of the second resistance film 20 between the YH electrode 21 and the YL electrode 22 corresponds to a resistance value where a resistance component R3 and a resistance component R4 of the second resistance film 20 are connected in series if the first resistance film 10 and the second resistance film 20 contacts at only a single point A as illustrated in FIG. 4. The resistance value where a resistance component R3 and a resistance component R4 of the second resistance film 20 are connected in series is substantially equivalent to the resistance value of the resistor Ry1. Therefore, the potential detected by the potential detection part ADY1 becomes Vcc/2.

Figure 5:
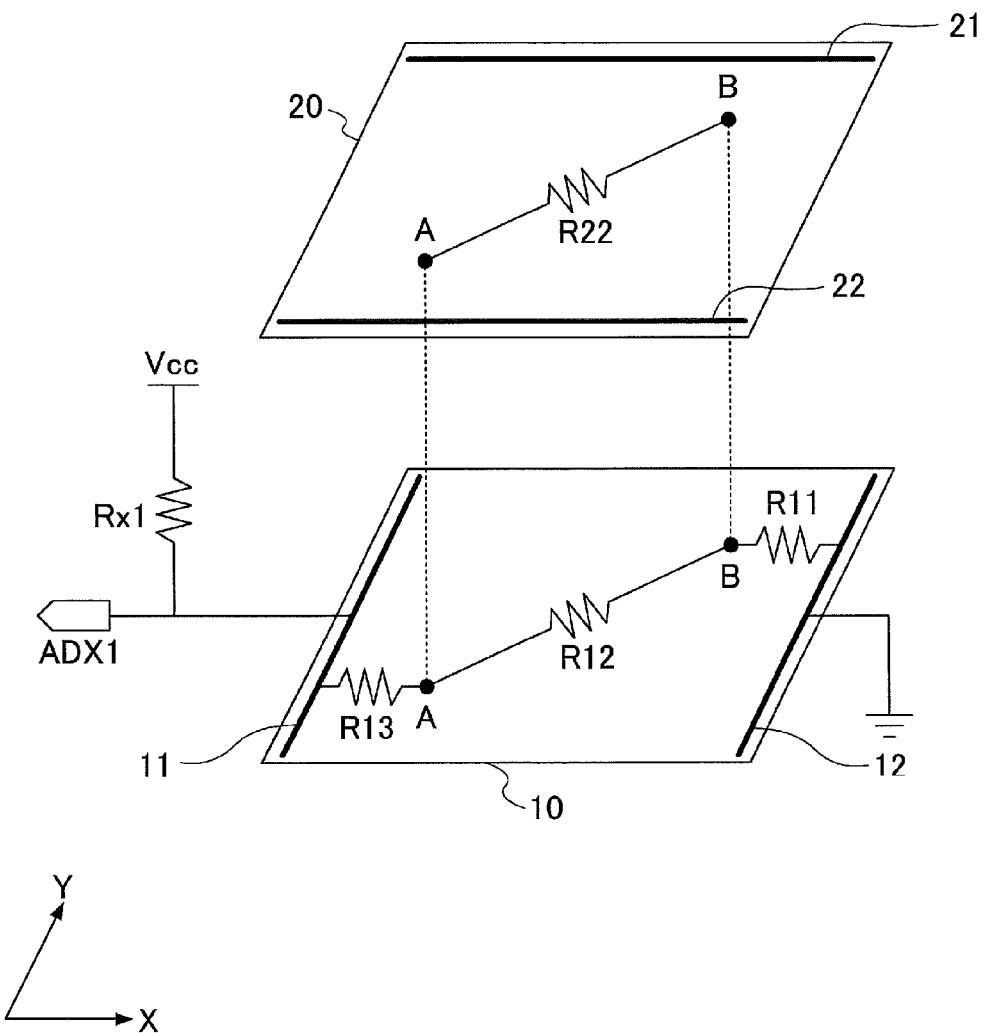
FIG. 5 is a diagram (1) for describing 2 point contact in the touch panel of the first embodiment.

On the hand, in Step S102, the resistance component between points A and B correspond to a resistance component in which a resistance component R12 of the first resistance film 10 and a resistance component R22 of the second resistance film 20 are connected in parallel if the first resistance film 10 and the second resistance film 20 contact at two points A and B as illustrated in FIG. 5. Accordingly, the resistance component between points A and B corresponds to a combined resistance of the resistance components R11, R12 and resistance components R22, R13 that are the resistance between the XL electrode 12 and the XH electrode 11. Thus, because the combined resistance includes the resistance component where the resistance component R12 and the resistance component 22 are connected in parallel, the value of the combined resistance is lower than the resistance value of the resistance Rx1. Therefore, the potential detected by the potential detection part ADX1 is lower than Vcc/2.

Figure 6:
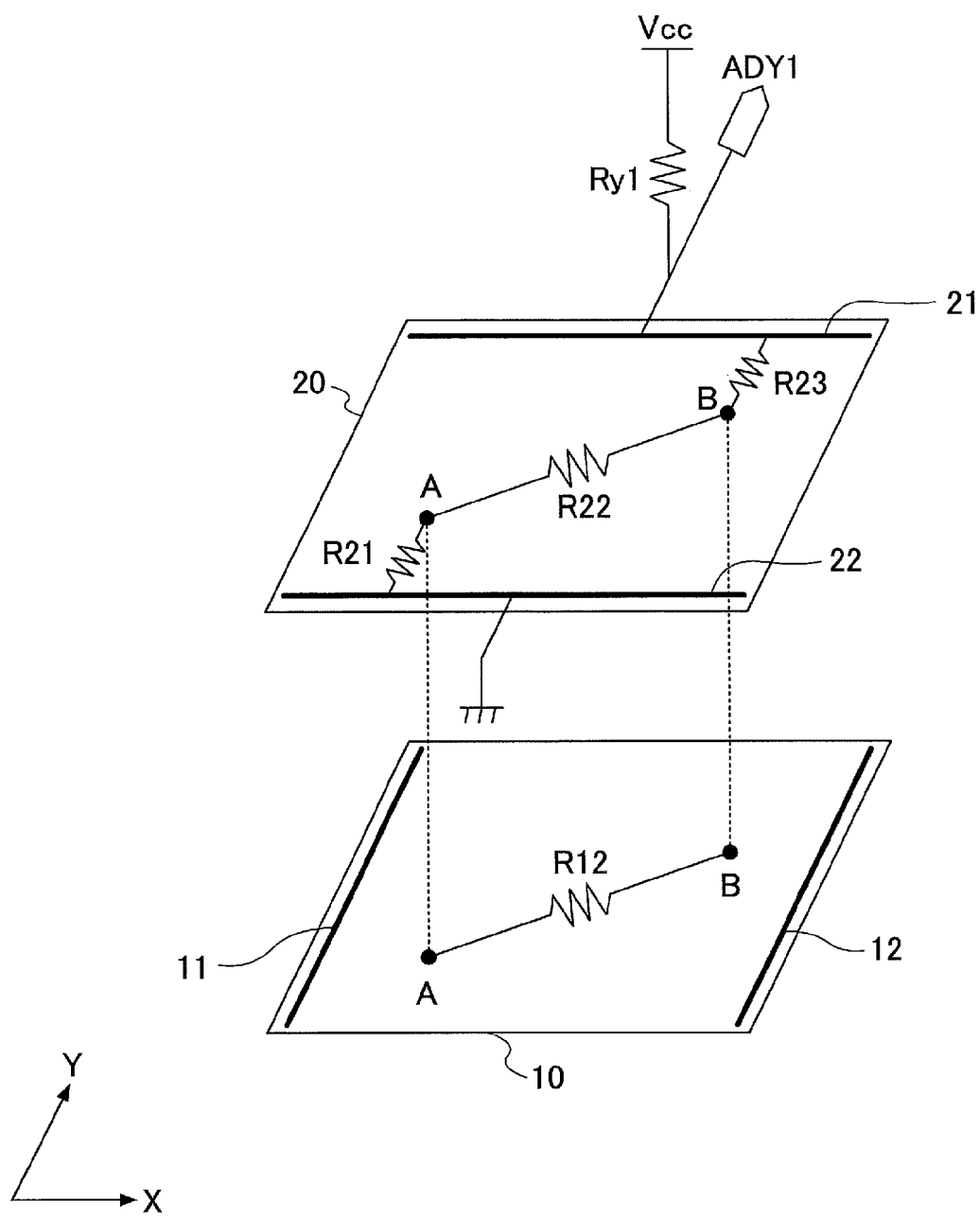
FIG. 6 is a diagram (2) for describing 2 point contact in the touch panel of the first embodiment.

Further, in Step S104, the resistance value between points A and B correspond to a resistance value where a resistance component R12 of the first resistance film 10 and a resistance component R22 of the second resistance film 20 are connected in parallel if the first resistance film 10 and the second resistance film 20 contact at two points A and B as illustrated in FIG. 6. Accordingly, the resistance value between points A and B corresponds to a combined resistance of the resistance component R21 of the second resistance film 20 between the YL electrode 22 and point A, the resistance component between the point A and point B where the resistance component R12 and the resistance component R22 are connected in parallel, and the resistance element R23 of the second resistance film 20 between point B and the YH electrode 21. Thus, because the resistance component where the resistance component R12 and the resistance component 22 are connected in parallel is included in the combined resistance, the value of the combined resistance is lower than the resistance value of the resistance Ry1. Therefore, the potential detected by the potential detection part ADY1 is lower than Vcc/2.

Accordingly, by determining whether the potential measured by the potential detection part ADX1 in Step S102 and the potential measured by the potential detection part ADY1 in Step S104 are both Vcc/2, whether the contact point is 1 point or 2 points can be determined.

Figure 7:
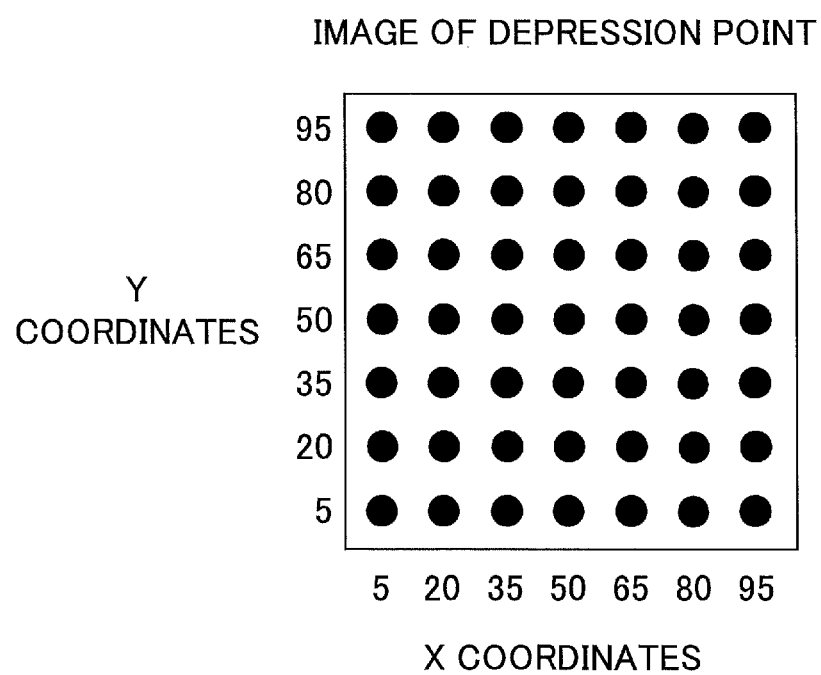
FIG. 7 is a diagram for analyzing depression points of a touch panel by using a finite element method.

The results of analyzing the touch panel by using a finite element method are illustrated below for proving that the contact point can be determined to be 1 point or 2 points by determining whether the potential measured by the potential detection part ADX1 in Step S102 and the potential measured by the potential detection part ADY1 in Step S104 are both Vcc/2. More specifically, as illustrated in FIG. 7, analysis is performed by assuming that the touch panel has a square shape, the touch panel is divided into 100 parts in the X and Y directions, the depression points are located in positions 5, 20, 35, 50, 65, 80, and 95 in the X direction (hereinafter also referred to as "position 5", "position 20", "position 35", "position 50", "position 65", "position 80" and position "95"), and the depression points are located in positions 5, 20, 35, 50, 65, 80, and 95 in the Y direction (hereinafter also referred to as "position 5", "position 20", "position 35", "position 50", "position 65", "position 80" and position "95"). The intervals, distances, or the like may be described by using the differences between the values of the aforementioned positions.

Figure 8B:
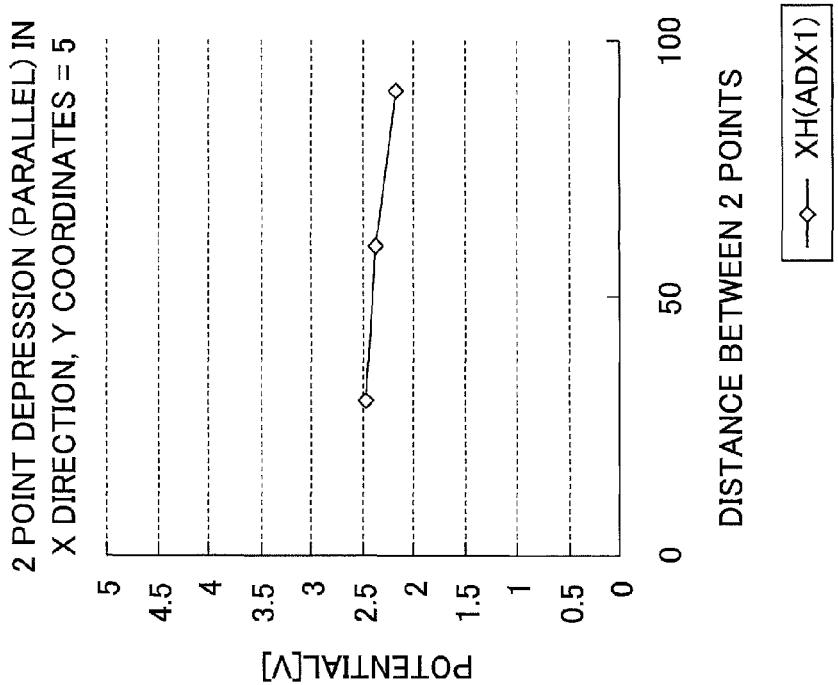
FIGS. 8A-8B are diagrams (1) illustrating an analysis of the touch panel by using the finite element method.
Figure 8A:
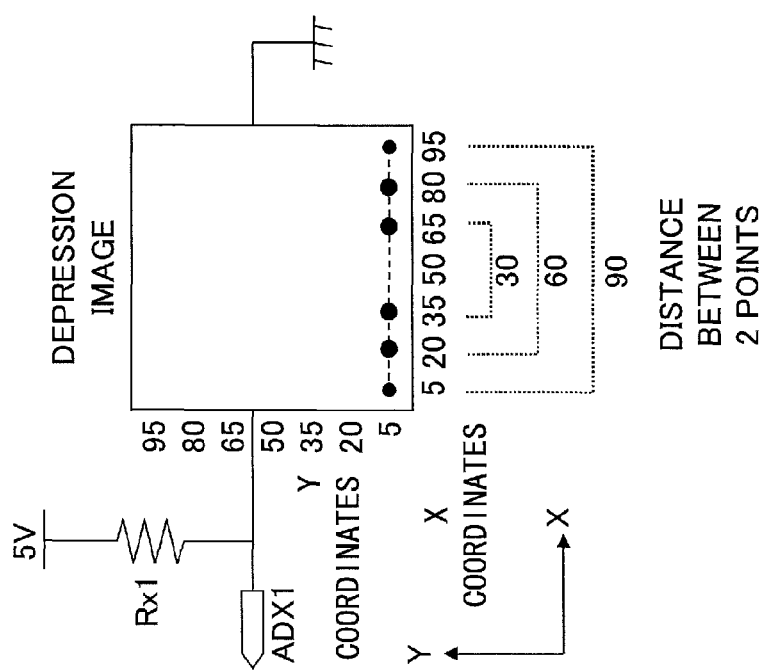

FIGS. 8A-8B illustrate a case that the intervals of 2 contacts points in the touch panel are changed to 30, 60, and 90 in the X axis direction while the Y coordinates of the 2 points are both position 5, when applying voltage in the X axis direction, that is, a case of applying voltage of 5V to the XH electrode 11 via the resistor Rx1 and grounding the XL electrode 12. FIG. 8A illustrates coordinate positions of the 2 contact points in the touch panel in this case. FIG. 8B illustrates a relationship between the interval of the 2 points, that is, the distance between the 2 points and the potential detected by the potential detection part ADX1.

Figure 9B:
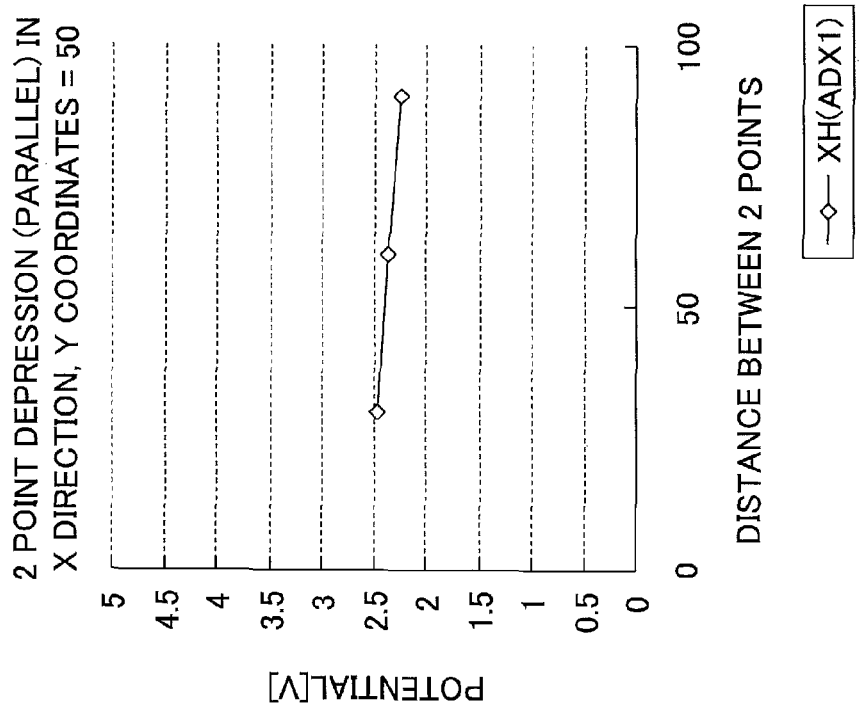
FIGS. 9A-9B are diagrams (2) illustrating an analysis of the touch panel by using the finite element method.
Figure 9A:
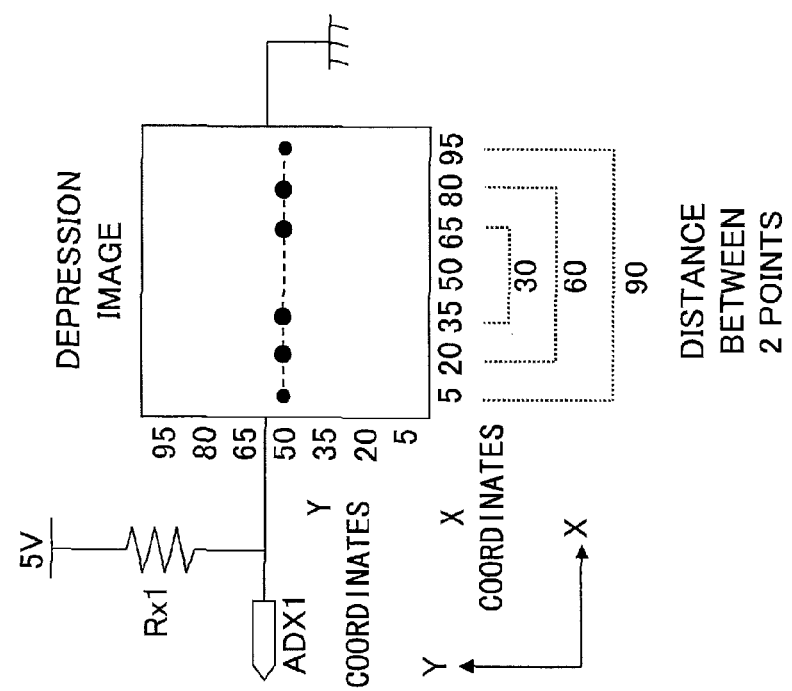

Further, FIGS. 9A-9B illustrate a case that the intervals of the contact positions of 2 contact points in the touch panel are changed to 30, 60, and 90 in the X axis direction while the Y coordinates of the 2 points are both position 50 when applying voltage in the X axis direction, that is, a case of applying voltage of 5V to the XH electrode 11 via the resistor Rx1 and grounding the XL electrode 12. FIG. 9A illustrates coordinate positions of the 2 contact points in the touch panel in this case. FIG. 9B illustrates a relationship between the interval of the 2 points, that is, the distance between the 2 points and the potential detected by the potential detection part ADX1.

Figure 10A:
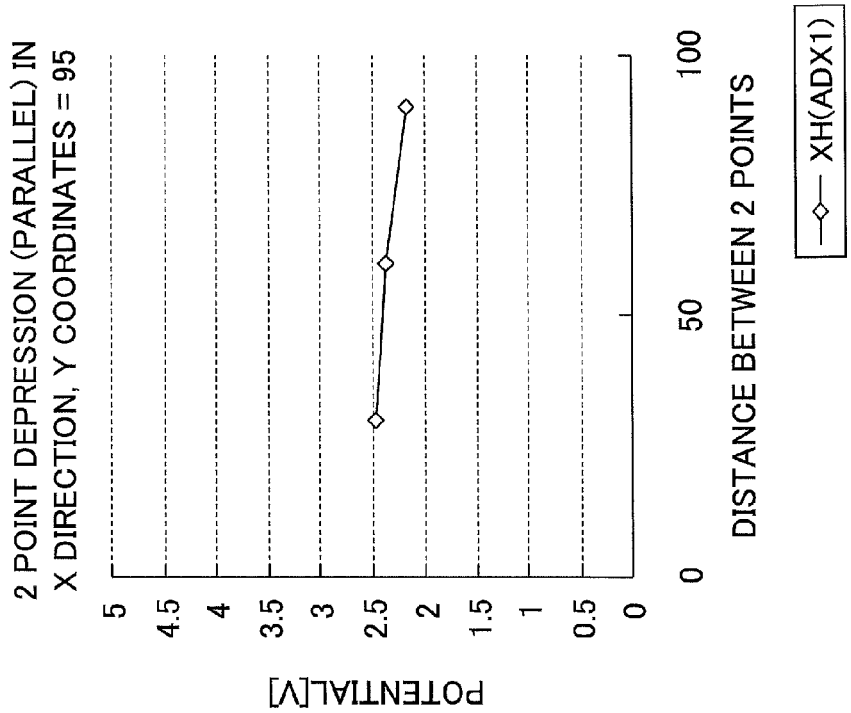
FIGS. 10A-10B are diagrams (3) illustrating an analysis of the touch panel by using the finite element method.
Figure 10B:
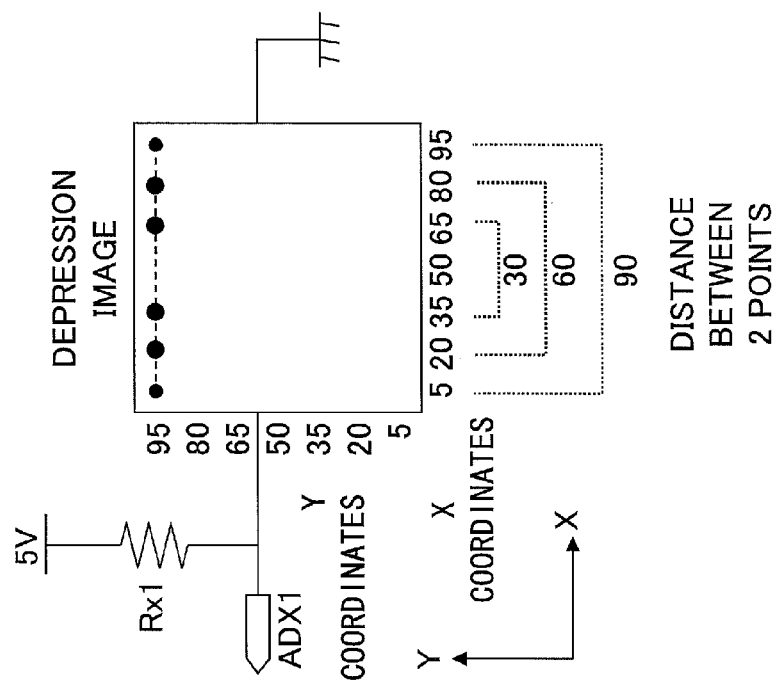

Further, FIGS. 10A-10B illustrate a case that the intervals of the contact positions of 2 points in the touch panel are changed to 30, 60, and 90 in the X axis direction while the Y coordinates of the 2 points are both position 95 when applying voltage in the X axis direction, that is, a case of applying voltage of 5V to the XH electrode 11 via the resistor Rx1 and grounding the XL electrode 12. FIG. 10A illustrates coordinate positions of the 2 contact points in the touch panel in this case. FIG. 10B illustrates a relationship between the interval of the 2 points, that is, the distance between the 2 points and the potential detected by the potential detection part ADX1.

As illustrated in FIGS. 8-10, the potential detected by the potential detection part ADX1 in a case where the Y coordinates of 2 contact points are both the same, the voltage becomes equal to or less than half of the applied voltage of 5V. Further, as the 2 points are separated from each other, the potential detected by the potential detection part ADX1 decreases. That is, when the 2 points are separated from each other in a direction parallel to the direction in which voltage is applied, the potential detected by the potential detection part ADX1 decreases. The same applies to a case where voltage is applied in the Y axis direction. In this case, the voltage detected by the potential detection part ADY1 decreases.

Figure 11B:
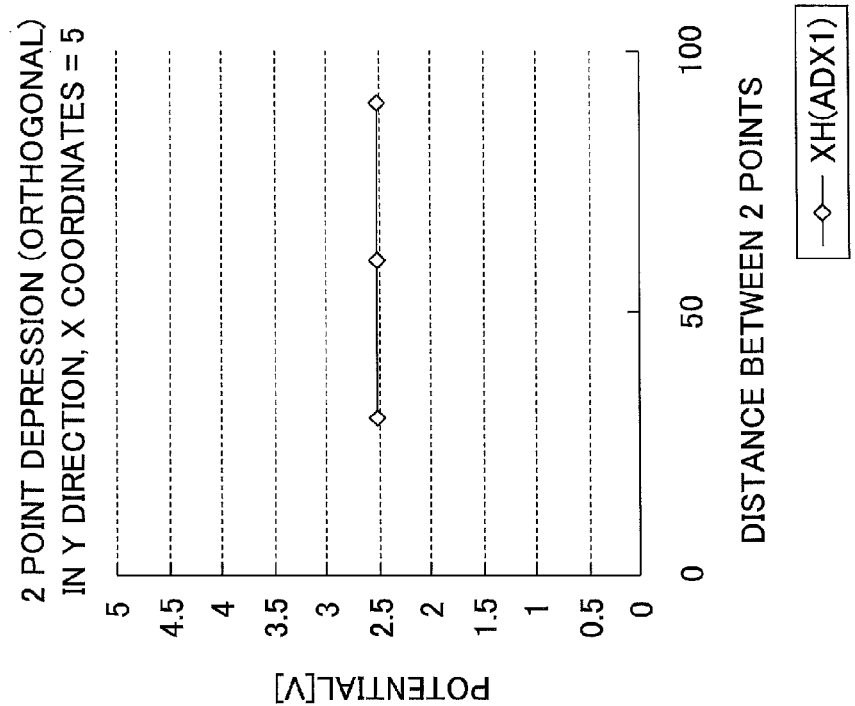
FIGS. 11A-11B are diagrams (4) illustrating an analysis of the touch panel by using the finite element method.
Figure 11A:
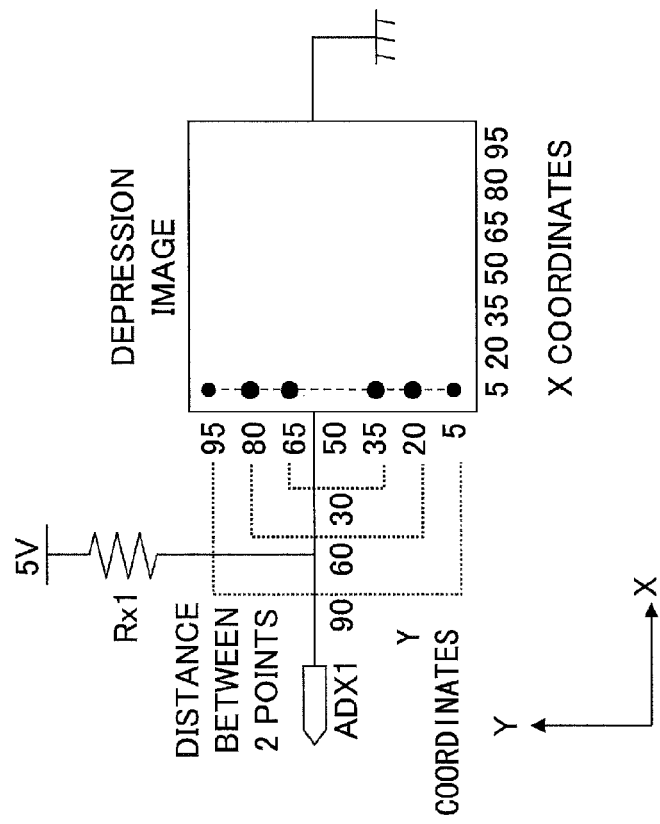

FIGS. 11A-11B illustrate a case that the intervals of the contact positions of 2 points in the touch panel are changed to 30, 60, and 90 in the Y axis direction while the X coordinates of the 2 points are both position 5 when applying voltage in the X axis direction, that is, a case of applying voltage of 5V to the XH electrode 11 via the resistor Rx1 and grounding the XL electrode 12. FIG. 11A illustrates coordinate positions of the 2 contact points in the touch panel in this case. FIG. 11B illustrates a relationship between the interval of the 2 points, that is, the distance between the 2 points and the potential detected by the potential detection part ADX1.

Figure 12B:
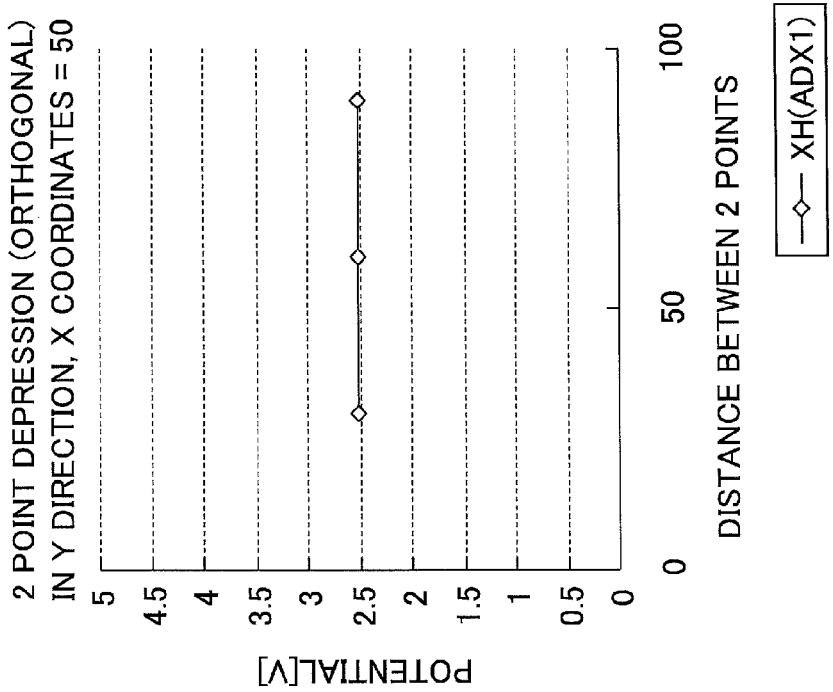
FIGS. 12A-12B are diagrams (5) illustrating an analysis of the touch panel by using the finite element method.
Figure 12A:
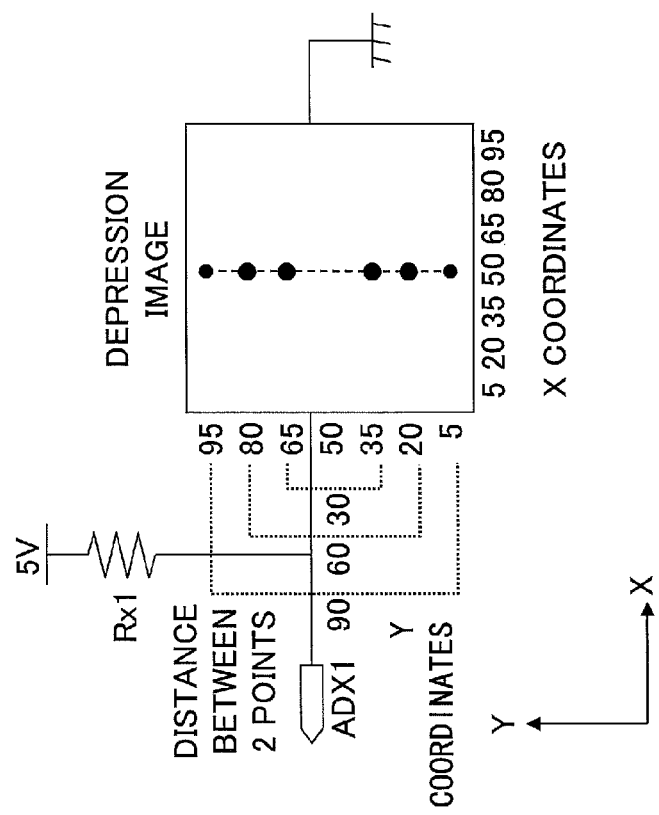

Further, FIGS. 12A-12B illustrate a case that the intervals of the contact positions of 2 points in the touch panel are changed to 30, 60, and 90 in the Y axis direction while the X coordinates of the 2 points are both position 50 when applying voltage in the X axis direction, that is, a case of applying voltage of 5V to the XH electrode 11 via the resistor Rx1 and grounding the XL electrode 12. FIG. 12A illustrates coordinate positions of the 2 contact points in the touch panel in this case. FIG. 12B illustrates a relationship between the interval of the 2 points, that is, the distance between the 2 points and the potential detected by the potential detection part ADX1.

Figure 13B:
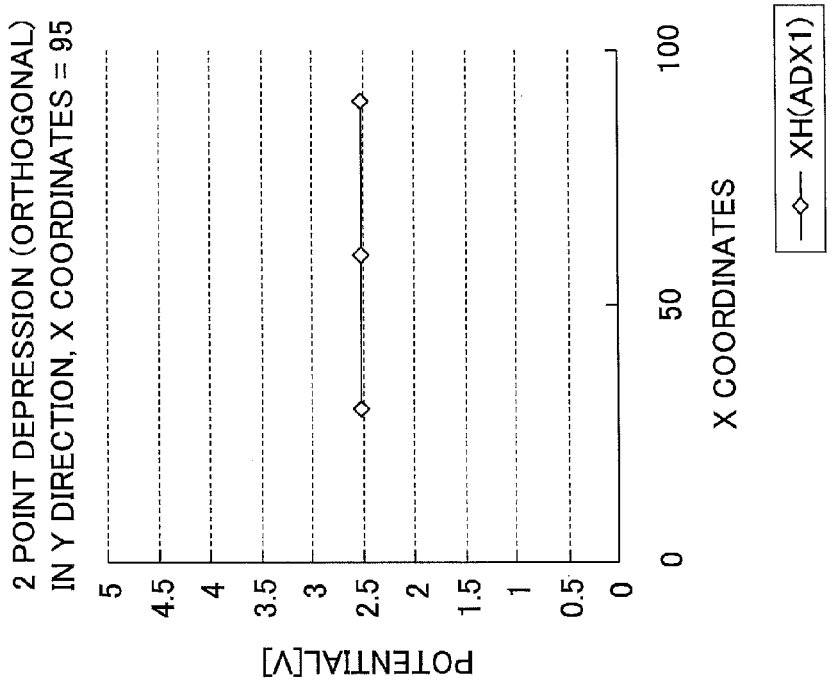
FIGS. 13A-13B are diagrams (6) illustrating an analysis of the touch panel by using the finite element method.
Figure 13A:
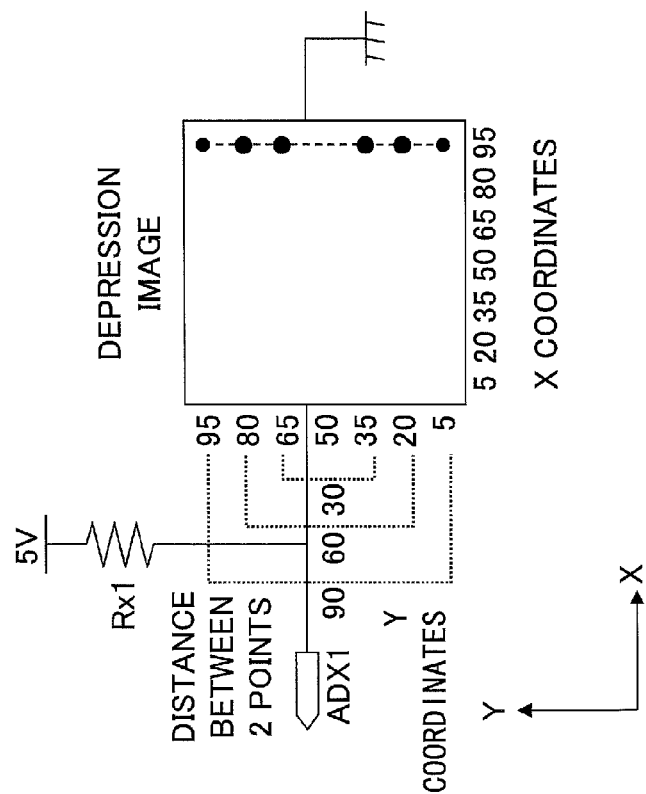

Further, FIGS. 13A-13B illustrate a case that the intervals of the contact positions of 2 points in the touch panel are changed to 30, 60, and 90 in the Y axis direction while the X coordinates of the 2 points are both position 95 when applying voltage in the X axis direction, that is, a case of applying voltage of 5V to the XH electrode 11 via the resistor Rx1 and grounding the XL electrode 12. FIG. 13A illustrates coordinate positions of the 2 contact points in the touch panel in this case. FIG. 13B illustrates a relationship between the interval of the 2 points, that is, the distance between the 2 points and the potential detected by the potential detection part ADX1.

As illustrated in FIGS. 11-13, the potential detected by the potential detection part ADX1 in a case where the X coordinates of the contact positions of the 2 points are both the same, the voltage becomes half of the applied voltage of 5V and remains constant regardless of the distance between the 2 points. That is, even in a case where the 2 contact points are separated from each other in a direction orthogonal to the direction in which voltage is applied, the potential detected by the potential detection part ADX1 remains constant and does not change. This applies to a case where voltage is applied in the Y axis direction. In this case, the potential detected by the potential detection part ADY1 remains constant and does not change.

Figure 14B:
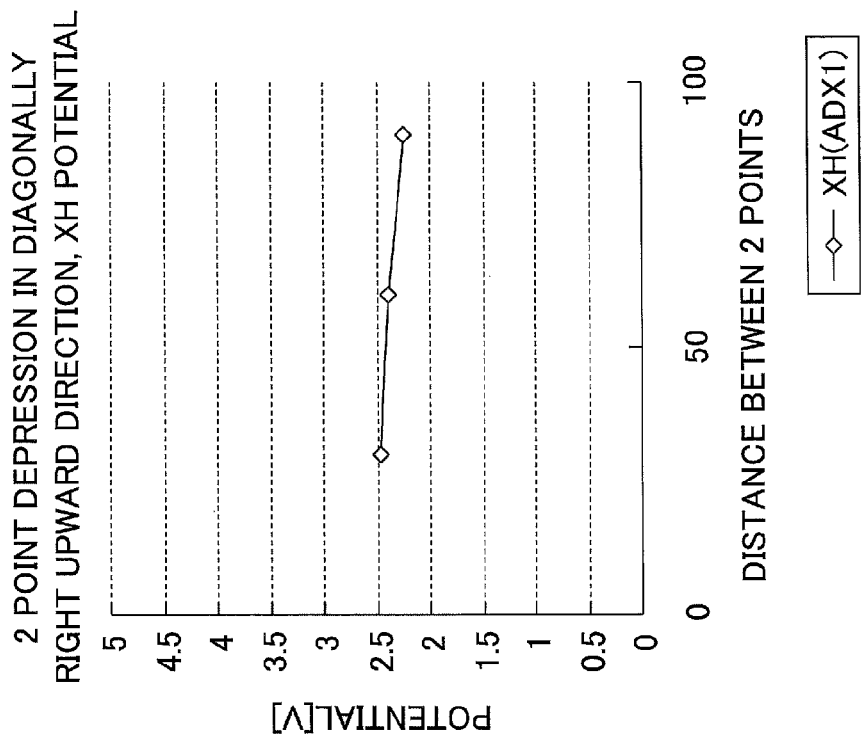
FIGS. 14A-14B are diagrams (7) illustrating an analysis of the touch panel by using the finite element method.
Figure 14A:
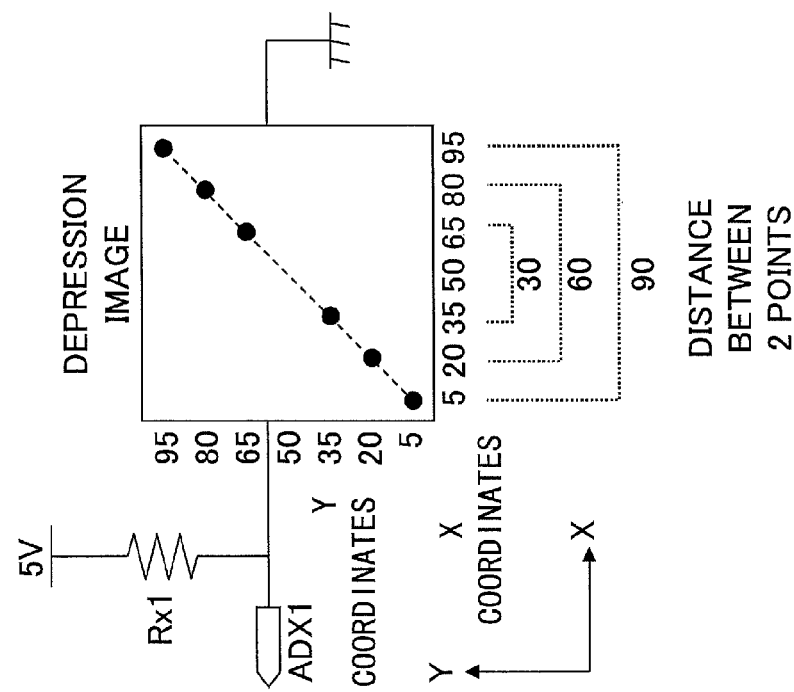

FIGS. 14A-14B illustrate a case that the intervals of the contact positions of 2 points in the touch panel are changed to 30, 60, and 90 in the X axis direction while moving in a direction other than the X-Y directions, that is, diagonally upward to the right (direction in which one contact point becomes closer to both the XL electrode 12 and the YH electrode 21 than the other contact point or a direction in which the other contact point becomes closer to both the XH electrode 11 and the YL electrode 22 than the one contact point) when applying voltage in the X axis direction, that is, a case of applying voltage of 5V to the XH electrode 11 via the resistor Rx1 and grounding the XL electrode 12. FIG. 14A illustrates coordinate positions of the 2 contact points in the touch panel in this case. FIG. 14B illustrates a relationship between the interval of the 2 points, that is, the distance between the 2 points and the potential detected by the potential detection part ADX1.

Figure 15B:
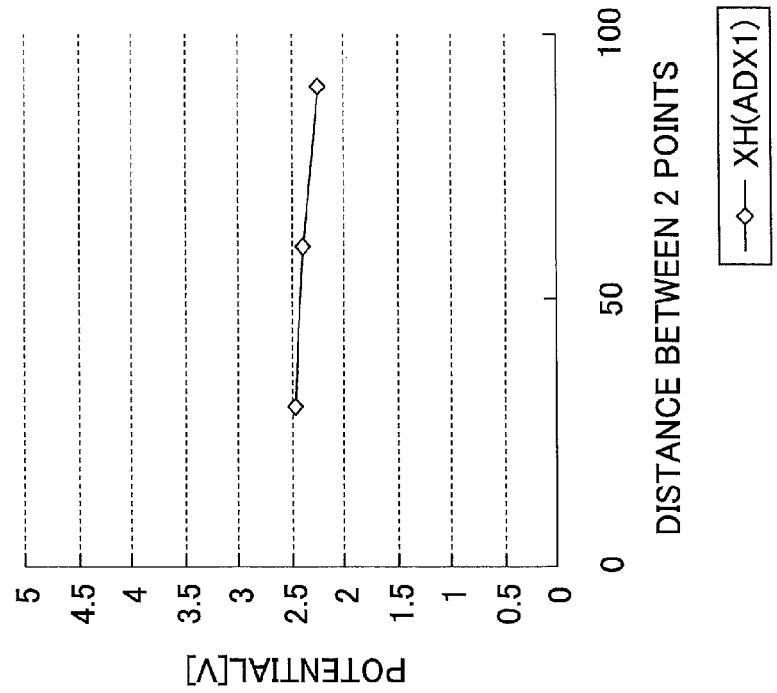
FIGS. 15A-15B are diagrams (8) illustrating an analysis of the touch panel by using the finite element method.
Figure 15A:
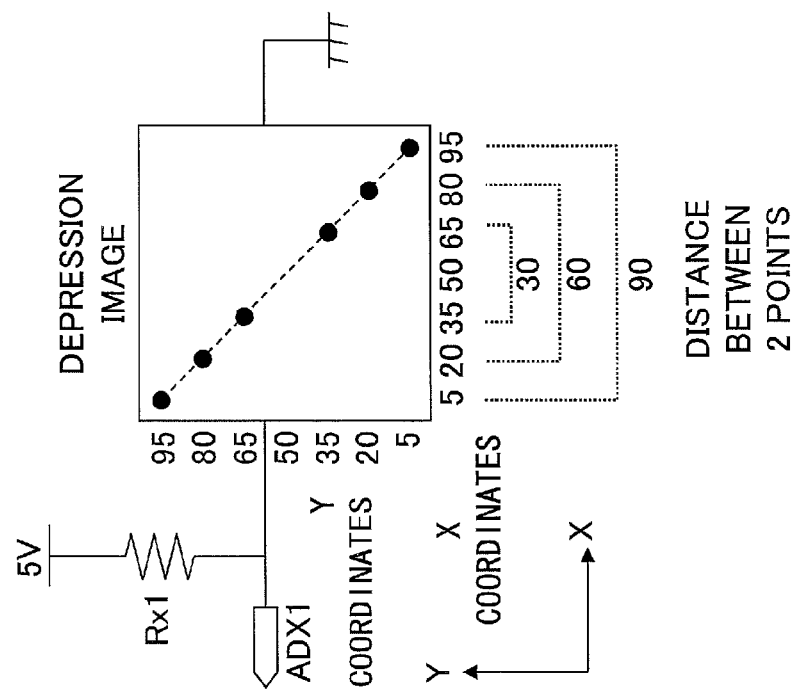

FIGS. 15A-15B illustrate a case that the intervals of the contact positions of 2 points in the touch panel are changed to 30, 60, and 90 in the X axis direction while moving in a direction other than the X-Y directions, that is, diagonally upward to the left (direction in which one contact point becomes closer to both the XH electrode 11 and the YH electrode 21 than the other contact point or a direction in which the other contact point becomes closer to both the XL electrode 12 and the YL electrode 22 than the one contact point) when applying voltage in the X axis direction, that is, a case of applying voltage of 5V to the XH electrode 11 via the resistor Rx1 and grounding the XL electrode 12. FIG. 15A illustrates coordinate positions of the 2 contact points in the touch panel in this case. FIG. 15B illustrates a relationship between the interval of the 2 points, that is, the distance between the 2 points and the potential detected by the potential detection part ADX1.

As illustrated in FIGS. 14-15, the potential detected by the potential detection part ADX1 in a case where 2 contact points are not oriented in the X direction or the Y direction, the voltage becomes equal to or less than half of the applied voltage of 5V. Further, as the 2 points are separated from each other, the potential detected by the potential detection part ADX1 decreases. That is, when the 2 points are separated from each other in a direction that is neither parallel to nor orthogonal to the direction in which voltage is applied, the potential detected by the potential detection part ADX1 decreases. The same applies to a case where voltage is applied in the Y axis direction. In this case, the voltage detected by the potential detection part ADY1 decreases.

More specifically, an initial potential is measured by the potential detection part ADX1 by generating an electric field distribution in the X axis direction beforehand while the contact point on the touch panel is 0 or 1 point. Similarly, in a case where the contact point on the touch panel is 0 or 1 point, an initial potential is measured by the potential detection part ADY1 by generating an electric field distribution in the Y axis direction beforehand. The measured potentials are stored in the memory 32 or the like. That is, in a case where the contact point on the touch panel is 0, or is 1, the switches SW2 and SW3 of FIG. 1 are switched on whereas the other switches of FIG. 1 are switched off, and the potential is measured with the potential detection part ADX1 in this state. In this state, as the voltage of Vcc is applied to the XH electrode 11 via the resistor Rx1, and the XL electrode 12 is grounded, potential distribution occurs in the X axis direction of the first resistance film 10. The potential detection part ADX1 measures potential in this state and stores the detected potential as the initial potential in the memory 32 or the like. Similarly, in a case where the contact point(s) on the touch panel is 0, or in a case where the contact point(s) on the touch panel is 1, the switches SW5 and SW6 are switched on whereas the other switches are switched off. In this state, the potential is measured with the potential detection part ADY1. In this state, the voltage of Vcc is applied via the resistor Ry1 to the YH electrode 21, and the YL electrode 22 is grounded. Thereby, potential distribution occurs in the Y axis direction of the second resistance film 20. In this state, the potential detection part ADY1 measures potential and stores the detected potential as the initial potential in the memory 32 or the like.

By comparing the values of the initial potential with the values of the potential measured in Steps S102 and S104, whether the contact point is 1 point or 2 points is determined. Further, whether a line connecting the 2 points is parallel to the X axis direction, parallel to the Y axis direction (orthogonal to the X axis direction), or neither parallel to the X and Y axes directions can be determined in a case where the contact points are 2 points.

More specifically, in a case where the potential measured by the potential detection part ADX1 in Step S102 is substantially the same as the initial potential measured by the potential detection part ADX1, and the potential measured by the potential detection part ADY1 in Step S104 is substantially the same as the initial potential measured by the potential detection part ADY1, it is determined that the contact point is 1 point. In a case where the potential measured by the potential detection part ADX1 in Step S102 is lower than the initial potential measured by the potential detection part ADX1, and the potential measured by the potential detection part ADY1 in Step S104 is substantially the same as the initial potential measured by the potential detection part ADY1, it is determined that a line connecting 2 contact points is parallel to the X axis direction (orthogonal to the Y axis direction). In a case where the potential measured by the potential detection part ADX1 in Step S102 is substantially the same as the initial potential measured by the potential detection part ADX1, and the potential measured by the potential detection part ADY1 in Step S104 is lower than the initial potential measured by the potential detection part ADY1, it is determined that a line connecting 2 contact points is parallel to the Y axis direction (orthogonal to the X axis direction). In a case where the potential measured by the potential detection part ADX1 in Step S102 is lower than the initial potential measured by the potential detection part ADX1 and the potential measured by the potential detection part ADY1 in Step S104 is lower than the initial potential measured by the potential detection part ADY1, it is determined that 2 contact points are oriented in a diagonal direction (neither the X axis direction nor the Y axis direction).

More specifically, in the following cases where the initial potentials measured by the potential detection parts ADX1 and ADY1 are both 2.5 V, it is determined that the contact point is 1 point when the potential measured by the potential detection part ADX1 in Step S102 is 2.5 V and the potential measured by the potential detection part ADY1 in Step S104 is 2.5 V. In a case where the potential measured by the potential detection part ADX1 in Step S102 is lower than 2.5 V and the potential measured by the potential detection part ADY1 in Step S104 is 2.5 V, it is determined that a line connecting 2 contact points is parallel to the X axis direction. In a case where the potential measured by the potential detection part ADX1 in Step S102 is 2.5 V and the potential measured by the potential detection part ADY1 in Step S104 is lower than 2.5 V, it is determined that a line connecting 2 contact points is parallel to the Y axis direction (orthogonal to the X axis direction). In a case where the potential measured by the potential detection part ADX1 in Step S102 is lower than 2.5 V and the potential measured by the potential detection part ADY1 in Step S104 is lower than 2.5 V, it is determined that 2 contact points are oriented in a diagonal direction (neither the X axis direction nor the Y axis direction).

Accordingly, whether the contact point is 1 point or 2 points can be determined. Further, whether a line connecting the 2 points is parallel to the X axis direction, parallel to the Y axis direction (orthogonal to the X axis direction), or neither parallel to the X and Y axes directions can be determined in a case where the contact points are 2 points.

In another method of determining whether the contact point is 1 point or 2 points without measuring the initial potential, the contact point can be determined to be 1 point when the potential measured by the potential detection part ADX1 is 2.5 V and the potential measured by the potential detection part ADY1 is 2.5 V. In a case where the potential measured by the potential detection part ADX1 is lower than 2.5 V and the potential measured by the potential detection part ADY1 is 2.5 V, it is determined that a line connecting 2 contact points is parallel to the X axis direction. Further, in a case where the potential measured by the potential detection part ADX1 is 2.5 V and the potential measured by the potential detection part ADY1 is lower than 2.5 V, it is determined that a line connecting 2 contact points is parallel to the Y axis direction (orthogonal to the X axis direction). Further, in a case where the potential measured by the potential detection part ADX1 is lower than 2.5 V and the potential measured by the potential detection part ADY1 is lower than 2.5 V, it is determined that 2 contact points are oriented in a diagonal direction (neither the X axis direction nor the Y axis direction).

Based on the above, whether the contact point of the touch panel of this embodiment is 1 point or 2 points can be determined in Step S106. In determining whether the measured potential is equal to or lower than 2.5 V, a threshold may be set for defining a predetermined range having 2.5 V as a criterion. The potential can be determined to be 2.5V in a case where the measured potential is within the predetermined range whereas the potential can be determined to be lower than 2.5 V in a case where the measured potential is beyond the predetermined range. The determined information are stored in, for example, the memory 23 of the control part 30 according to necessity.

Process proceeds to Step S108 if the contact point of the touch panel is determined to be 1 point in Step S106. Further, process proceeds to Step S110 in a case where the contact points are determined to be 2 points in Step S106.

In Step S108, position coordinates of a contact point in the case where the contact point is 1 point is detected. Because the detected contact point is 1 point, a conventional position method can be used to detect position coordinates of the contact point. For example, in a case where potential of 5 V is applied to the XH electrode 11 in a state where the XL electrode 12 is grounded, the potential in the X axis direction can be detected by the potential detection part ADY1. Based on the detected potential, the X coordinates of the contact point can be detected. Further, in a case where potential of 5 V is applied to the YH electrode 21 in a state where the YL electrode 22 is grounded, the potential in the Y axis direction can be detected by the potential detection part ADX1. Based on the detected potential, the Y coordinates of the contact point can be detected.

In Step S110, a second X direction potential detection is performed. More specifically, in the touch panel 1 illustrated in FIG. 1, switches SW1 and SW3 are switched on whereas the other switches are switched off. In this state, the potentials are measured with the potential detection parts ADY1, ADY2. In this state, the voltage of Vcc is applied to the XH electrode 11, and the XL electrode 12 is grounded, and potential distribution occurs in the X axis direction of the first resistance film 10. In this state, the potential detection parts ADY1, ADY2 measure potentials and store the detected potentials in the memory 32 or the like. The Step S110 may also be referred to as "third measurement step".

In Step S112, a second Y direction potential detection is performed. More specifically, in the touch panel illustrated in FIG. 1, switches SW4 and SW6 are switched on whereas the other switches are switched off. In this state, the potentials are measured with the potential detection parts ADX1, ADX2. In this state, the voltage of Vcc is applied to the YH electrode 21, and the YL electrode 22 is grounded, and potential distribution occurs in the Y axis direction of the second resistance film 20. In this state, the potential detection parts ADX1 and ADX2 measure potentials and store the detected potentials in the memory 32 or the like. The Step S112 may also be referred to as "fourth measurement step".

In Step S114, the inclination of a line connecting 2 points contacting the touch panel is detected. More specifically, whether a line that connects 2 points contacting the touch panel is parallel to the X axis direction or the Y axis directions is determined. Further, in a case where the line is not parallel to neither of the X axis and Y axis, it is determined whether the line has a right upward inclination or a left upward inclination. That is, as described above, an initial potential is measured by the potential detection part ADX1 by generating an electric field distribution in the X axis direction beforehand while the contact point on the touch panel is 0 or 1 point, an initial potential is measured by the potential detection part ADX1 by generating an electric field distribution in the X axis direction beforehand. Similarly, in a case where the contact point on the touch panel is 0 or 1 point, an initial potential is measured by the potential detection part ADY1 by generating an electric field distribution in the Y axis direction beforehand while the contact point on the touch panel is 0 or 1 point. The measured potentials are stored in the memory 32 or the like. More specifically, the switches SW2 and SW3 of FIG. 1 are switched on whereas the other switches of FIG. 1 are switched off, and the potential is measured with the potential detection part ADX1 while the contact point on the touch panel is 0 or is 1. In this state, the voltage of Vcc is applied via the resistor Rx1 to the XH electrode 11, and the XL electrode 12 is grounded, and potential distribution occurs in the X axis direction of the first resistance film 10. In this state, the potential detection part ADX1 measures potential and stores the detected potential as the initial potential in the memory 32 or the like. Similarly, the switches SW5 and SW6 are switched on whereas the other switches are switched off, and the potential is measured with the potential detection part ADY1 while the contact point on the touch panel is 0 or is 1. In this state, the voltage of Vcc is applied via the resistor Ry1 to the YH electrode 21, and the YL electrode 22 is grounded, and potential distribution occurs in the Y axis direction of the second resistance film 20. In this state, the potential detection part ADY1 measures potential and stores the detected potential as the initial potential in the memory 32 or the like.

By comparing the values of the initial potential with the values of the potential measured in Steps S110 and S112, it can be determined whether a line connecting the 2 contact points is parallel to the X axis direction or parallel to the Y axis direction (orthogonal to the X axis direction).

More specifically, in a case where the potential measured by the potential detection part ADX1 in Step S110 is lower than the initial potential measured by the potential detection part ADX1 and the potential measured by the potential detection part ADY1 in Step S112 is substantially the same as the initial potential measured by the potential detection part ADY1, it is determined that a line connecting 2 contact points is parallel to the X axis direction (orthogonal to the Y axis direction). In a case where the potential measured by the potential detection part ADX1 in Step S110 is substantially the same as the initial potential measured by the potential detection part ADX1 and the potential measured by the potential detection part ADY1 in Step S112 is lower than the initial potential measured by the potential detection part ADY1, it is determined that a line connecting 2 contact points is parallel to the Y axis direction (orthogonal to the X axis direction). In a case where the potential measured by the potential detection part ADX1 in Step S110 is lower than the initial potential measured by the potential detection part ADX1 and the potential measured by the potential detection part ADY1 in Step S112 is lower than the initial potential measured by the potential detection part ADY1, it is determined that 2 contact points are oriented in a diagonal direction (neither the X axis direction nor the Y axis direction).

More specifically, in a case where the potential measured by the potential detection part ADX1 in Step S110 is lower than 2.5 V and the potential measured by the potential detection part ADY1 in Step S112 is 2.5 V, it is determined that a line connecting 2 contact points is parallel to the X axis direction. In a case where the potential measured by the potential detection part ADX1 in Step S110 is 2.5 V and the potential measured by the potential detection part ADY1 in Step S112 is lower than 2.5 V, it is determined that a line connecting 2 contact points is parallel to the Y axis direction (orthogonal to the X axis direction). In a case where the potential measured by the potential detection part ADX1 in Step S110 is lower than 2.5 V and the potential measured by the potential detection part ADY1 in Step S112 is lower than 2.5 V, it is determined that 2 contact points are oriented in a diagonal direction (neither the X axis direction nor the Y axis direction).

Accordingly, it can be determined whether a line connecting the 2 points is parallel to the X axis direction or parallel to the Y axis direction.

As for another method of performing the similar determination without measuring the initial potential, in a case where the potential measured by the potential detection part ADX1 is 2.5 V and the potential measured by the potential detection part ADY1 is lower than 2.5 V (i.e. a case where the potential detected by the potential detection part ADY1 is lower than the potential detected by the potential detection part ADX1), it is determined that the contact points are two points that are parallel to the Y axis direction. Further, in a case where the potential measured by the potential detection part ADX1 is lower than 2.5 V and the potential measured by the potential detection part ADY1 is 2.5 V (i.e. a case where the potential detected by the potential detection part ADY1 is higher than the potential detected by the potential detection part ADX1), it is determined that the contact points are two points that are parallel to the X axis direction.

Figure 16:
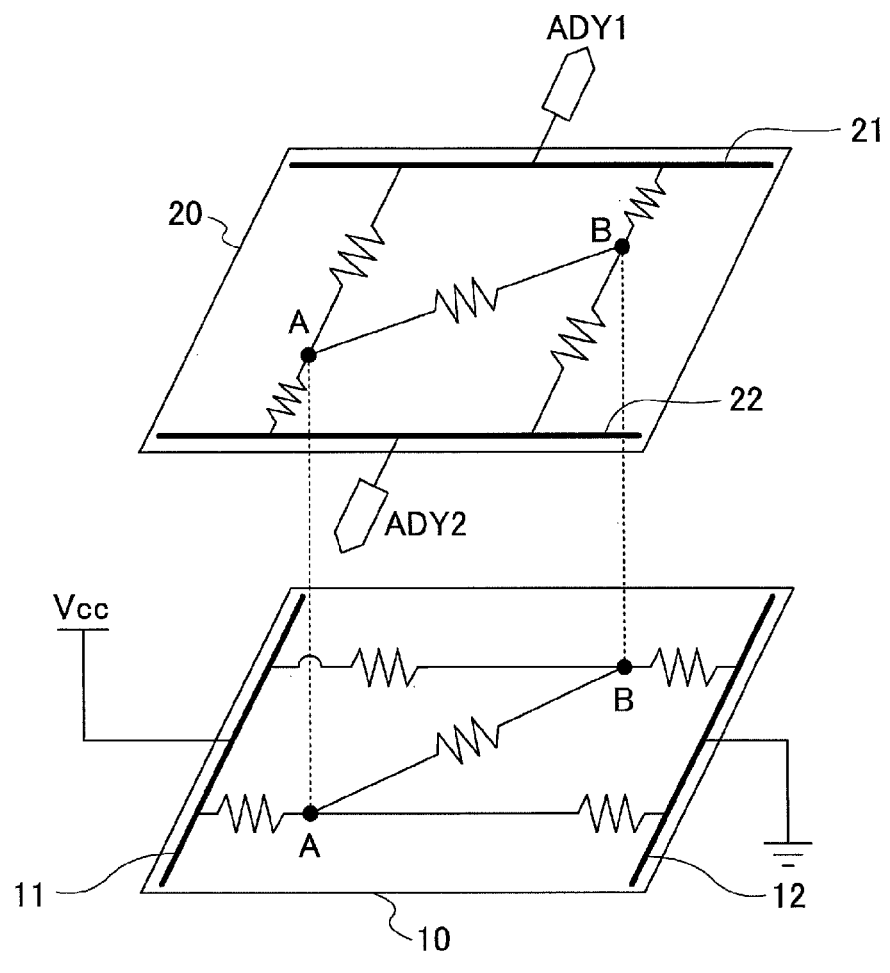
FIG. 16 is a diagram (1) for describing the position detection method in the touch panel of the first embodiment.
Figure 17B:
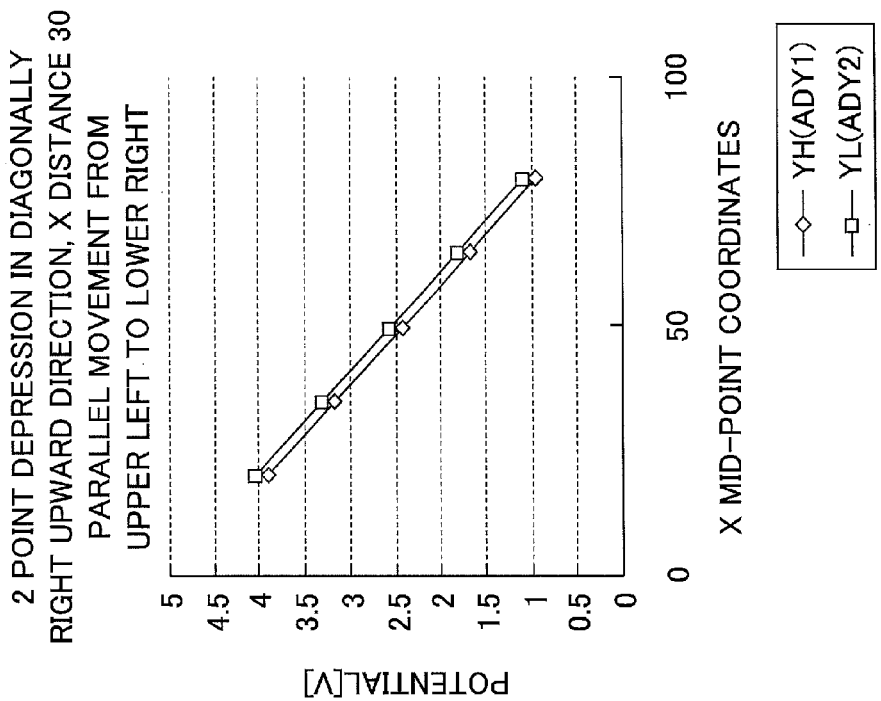
FIGS. 17A-17B are diagrams (9) illustrating an analysis of the touch panel by using the finite element method.
Figure 17A:
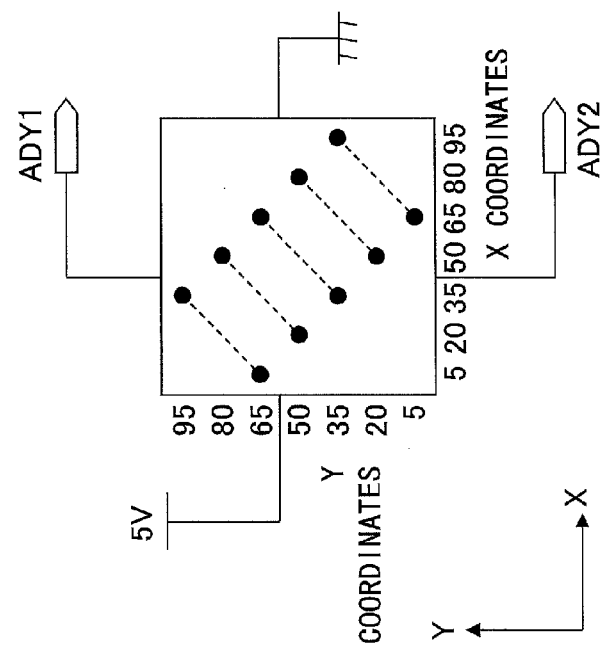

In a case where the line is not parallel in Step S110, that is, among points A and B illustrated in FIG. 16, which are two contact points of the touch panel, point B is closer to the XL electrode 12 and the YH electrode 21 than point A, the potential detected by the potential detection part ADY2 is higher than the potential detected by the potential detection part ADY1 as illustrated in FIGS. 17A-17B.

FIGS. 17A-17B illustrates a case where changing the contact positions of 2 points in the touch panel have a predetermined space therebetween and are positioned on a straight line oriented upward to the right while applying voltage in an X axis direction, that is, applying a potential of 5 V to the XH electrode 11 and grounding the XL electrode 12. FIG. 17A illustrates coordinate positions of 2 contact points of the touch panel in this state. FIG. 17B illustrates a relationship between the position of X coordinates at the mid-point of the 2 contact points and the potentials detected by the potential detection parts ADY1, ADY2.

Because point A is positioned close to the XH electrode 11 to which a potential of 5 V is applied, point A is significantly affected by the XH electrode 11. Thus, a relatively high potential is detected by the potential detection part ADY2 connected to the YL electrode 22 positioned close to point A. Because point B is positioned close to the grounded XL electrode 12, point B is significantly affected by the XL electrode 12. Thus, a relatively low potential is detected by the potential detection part ADY1 connected to the YH electrode 21 positioned close to point B.

Figure 19B:
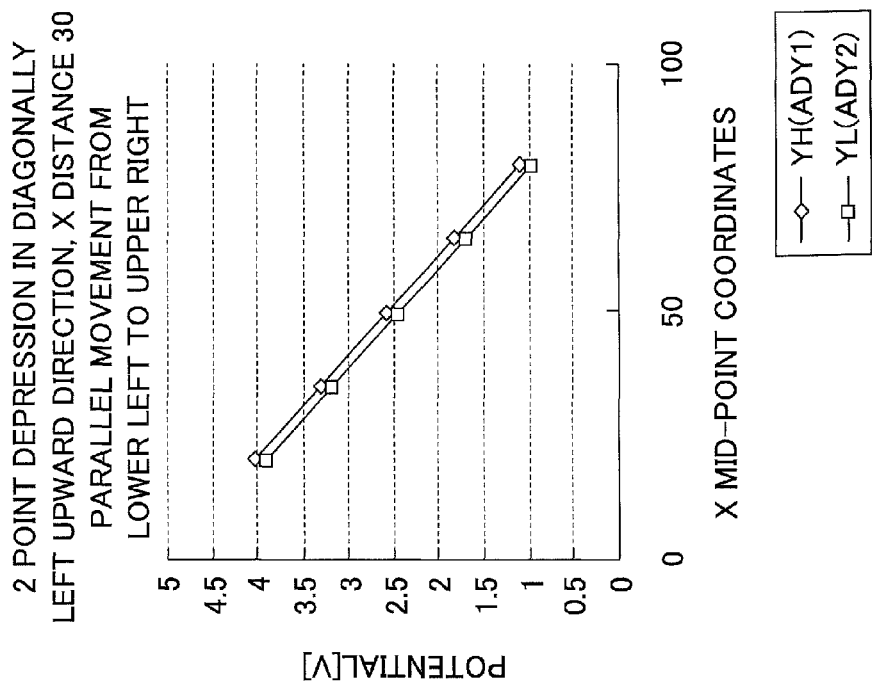
FIGS. 19A-19B are diagrams (10) illustrating an analysis of the touch panel by using the finite element method.
Figure 19A:
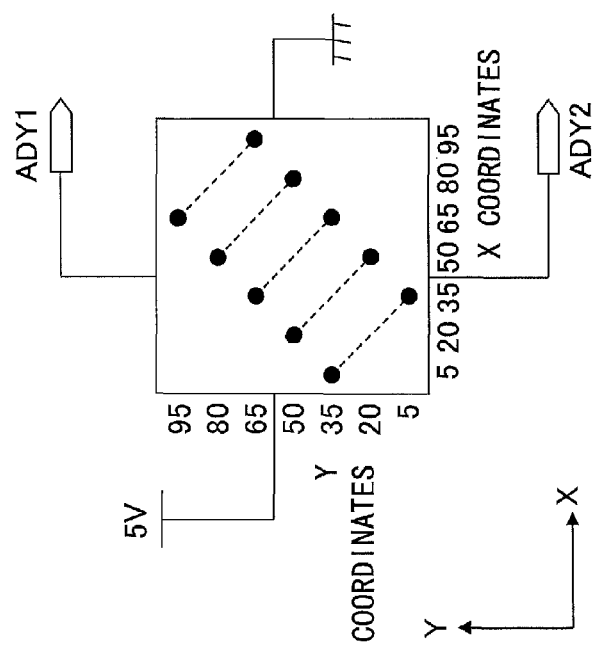

On the other hand, in a case where point A, which is a contact point of the touch panel is closer to the XH electrode 11 and the YH electrode 21 than point B, which the other contact point, as illustrated in, in Step S110, the potential detected by the potential detection part ADY2 is lower than the potential detected by the potential detection part ADY1 as illustrated in FIGS. 19A-19B.

FIGS. 19A-19B illustrate a case where changing the contact positions of 2 points in the touch panel in which the contact points have a predetermined space therebetween and are positioned on a straight line oriented upward to the left while applying voltage in an X axis direction, that is, a case of applying a potential of 5 V to the XH electrode 11 and grounding the XL electrode 12. FIG. 19A illustrates coordinate positions of 2 contact points of the touch panel in this state. FIG. 19B illustrates a relationship between the position of X coordinates at the mid-point of the 2 contact points and the potentials detected by the potential detection parts ADY1, ADY2.

Because point A is positioned close to the XH electrode 11 to which a potential of 5 V is applied, point A is significantly affected by the XH electrode 11. Thus, a relatively high potential is detected by the potential detection part ADY1 connected to the YH electrode 21 positioned close to point A. Because point B is positioned close to the grounded XL electrode 12, point B is significantly affected by the XL electrode 12. Thus, a relatively low potential is detected by the potential detection part ADY2 connected to the YL electrode 22 positioned close to point B.

Accordingly, it can be determined whether the inclination of the line connecting the 2 contact points on the touch panel is oriented upward to the right or upward to the left.

Further, based on the potential detected in Step S110, it can be determined whether the 2 contact points are parallel to the X axis direction or parallel to the Y axis direction.

More specifically, in a case where 2 contact points are positioned parallel to the X axis direction (to which voltage is applied), or in a case where 2 contact points are positioned parallel to the Y axis direction which is orthogonal to the direction to which voltage is applied, the potential detected by the potential detection part ADY1 and the potential detected by the potential detection part ADY2 become equal as described below. Therefore, in a case where the potential detected by the potential detection part ADY1 and the potential detected by the potential detection part ADY2 are equal, it can be determined that the positions of the 2 contact points in the touch panel are parallel to the X axis direction or parallel to the Y axis direction.

Figure 20B:
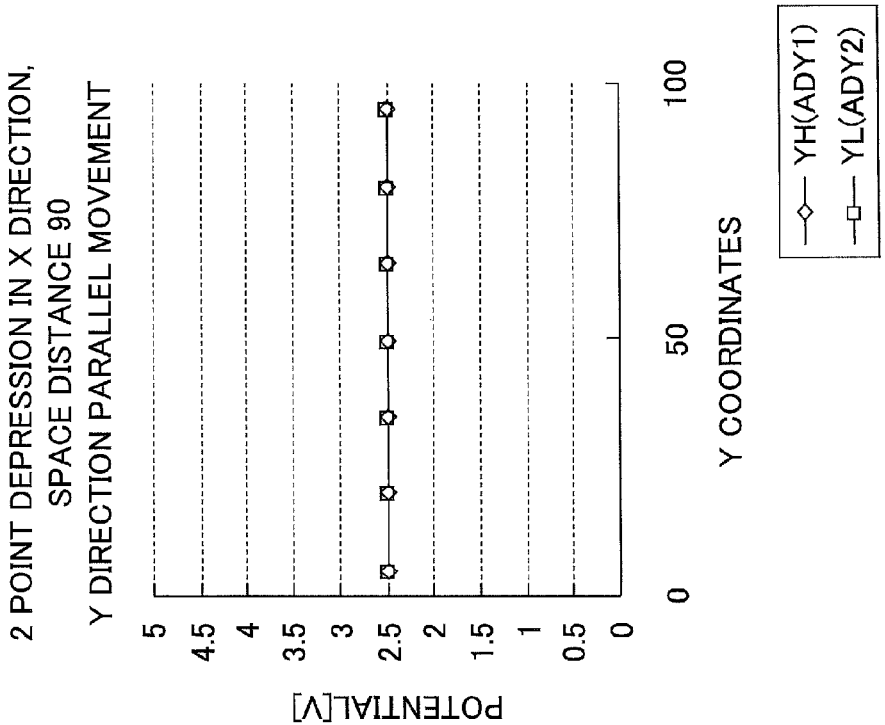
FIGS. 20A-20B are diagrams (11) illustrating an analysis of the touch panel by using the finite element method.
Figure 20A:
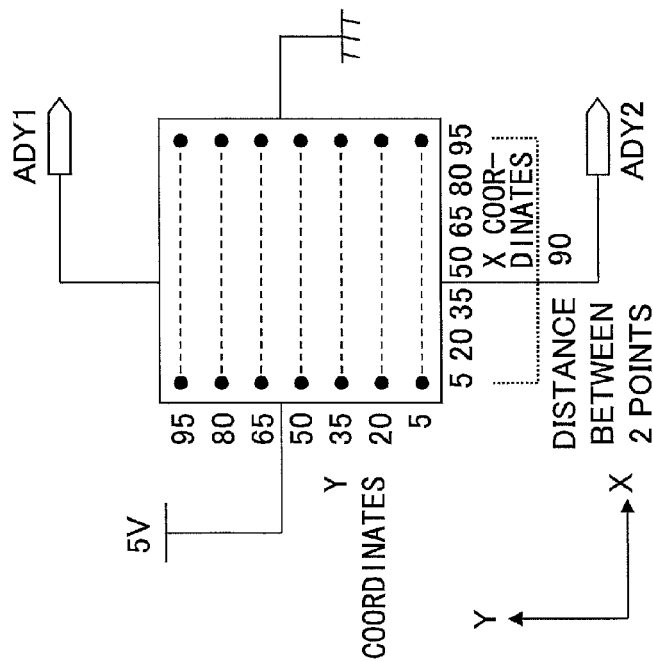

FIGS. 20A-20B illustrate a case where changing the contact positions of 2 points in the touch panel which are positioned with the same Y axis coordinates and have a constant space of 90 therebetween in the X axis direction (X coordinates of the two contact points being position 5 and position 95), while applying voltage in an X axis direction, that is, applying a potential of 5 V to the XH electrode 11 and grounding the XL electrode 12 in which the contact points. FIG. 20A illustrates coordinate positions of 2 contact points of the touch panel in this state. FIG. 20B illustrates a relationship between the position of Y coordinates of the contact points and the potentials detected by the potential detection parts ADY1, ADY2.

Figure 21B:
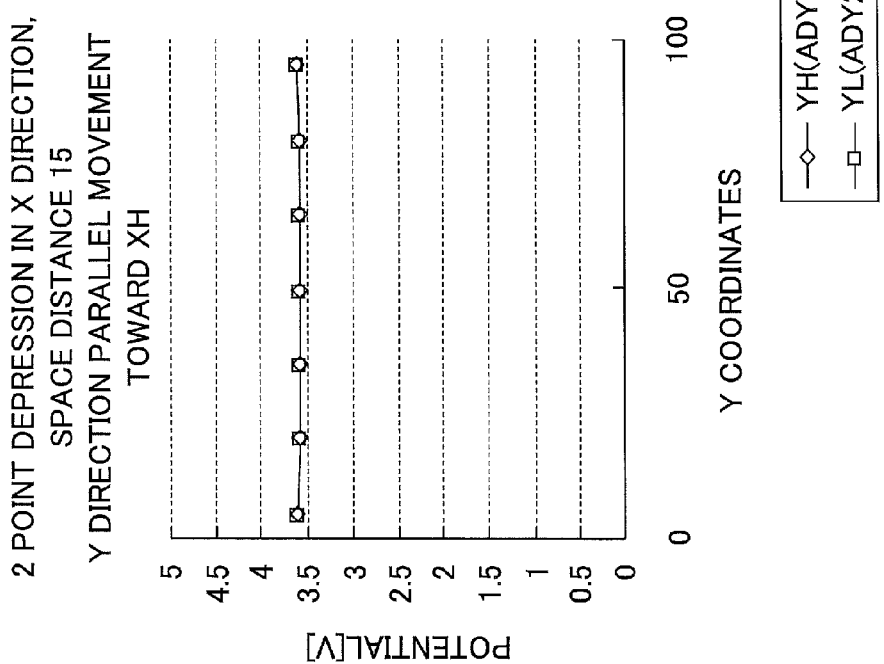
FIGS. 21A-21B are diagrams (12) illustrating an analysis of the touch panel by using the finite element method.
Figure 21A:
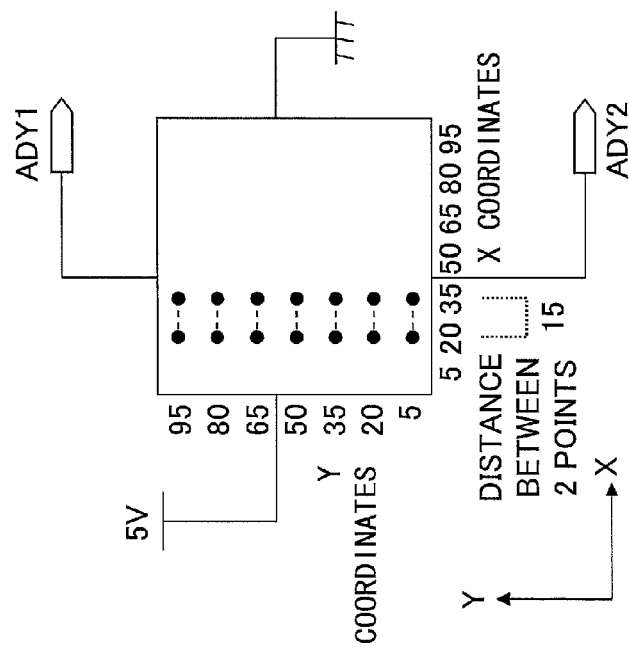

FIGS. 21A-21B illustrate changing the contact positions of 2 points in the touch panel in a case of applying voltage in an X axis direction, that is, a case of applying a potential of 5 V to the XH electrode 11 and grounding the XL electrode 12 in which the contact points are positioned with the same Y axis coordinates and have a constant space of 15 therebetween in the X axis direction (X coordinates of the two contact points being position 20 and position 35). FIG. 21A illustrates coordinate positions of 2 contact points of the touch panel in this state. FIG. 21B illustrates a relationship between the position of Y coordinates of the contact points and the potentials detected by the potential detection parts ADY1, ADY2.

Figure 22B:
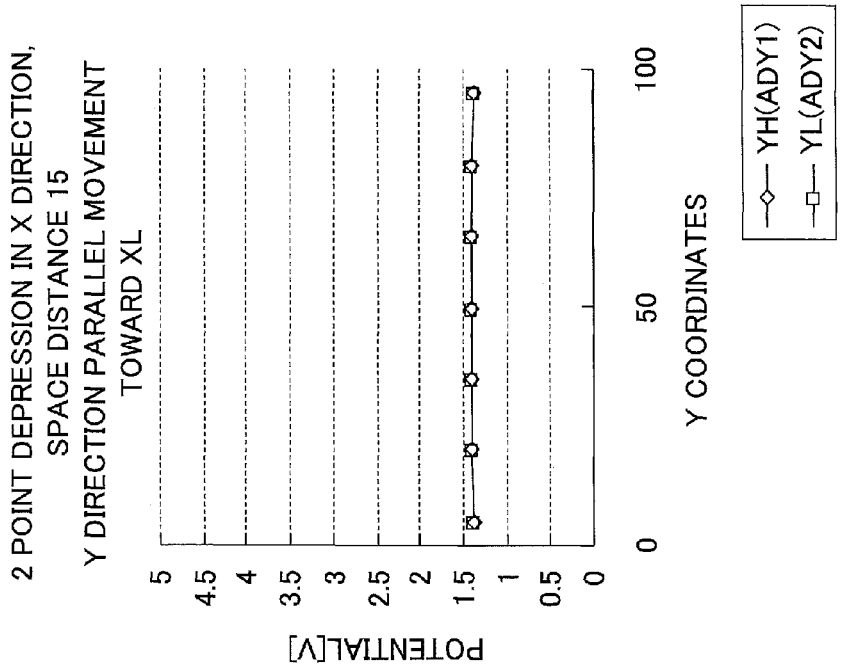
FIGS. 22A-22B are diagrams (13) illustrating an analysis of the touch panel by using the finite element method.
Figure 22A:
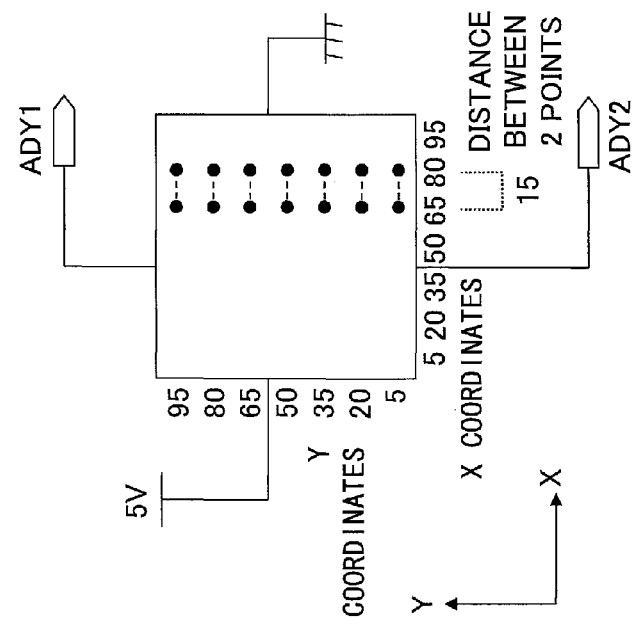

FIGS. 22A-22B illustrate changing the contact positions of 2 points in the touch panel in a case of applying voltage in an X axis direction, that is, a case of applying a potential of 5 V to the XH electrode 11 and grounding the XL electrode 12 in which the contact points are positioned with the same Y axis coordinates and have a constant space of 15 therebetween in the X axis direction (X coordinates of the two contact points being position 65 and position 80). FIG. 22A illustrates coordinate positions of 2 contact points of the touch panel in this state. FIG. 22B illustrates a relationship between the position of Y coordinates of the contact points and the potentials detected by the potential detection parts ADY1, ADY2.

As illustrated in FIGS. 20A to 22B, in a case where the Y coordinates of 2 points are both the same, the potentials detected by the potential detection parts ADY1, ADY2 are of equal values. This value is a potential corresponding to the mid-point of points A and B. For example, in the case of FIGS. 20A-20B, a value of 2.5 V (half of the applied potential (5V)) is detected by the potential detection parts ADY1, ADY2. Further, in the case of FIGS. 21A-21B, the position of the X coordinates of the mid-point corresponds to position 27.5. In the case of FIGS. 22A-22B, the position of the X coordinates of the mid-point corresponds to position 72.5. The potentials corresponding to these positions are detected by the potential detection parts ADY1, ADY2.

Figure 23B:
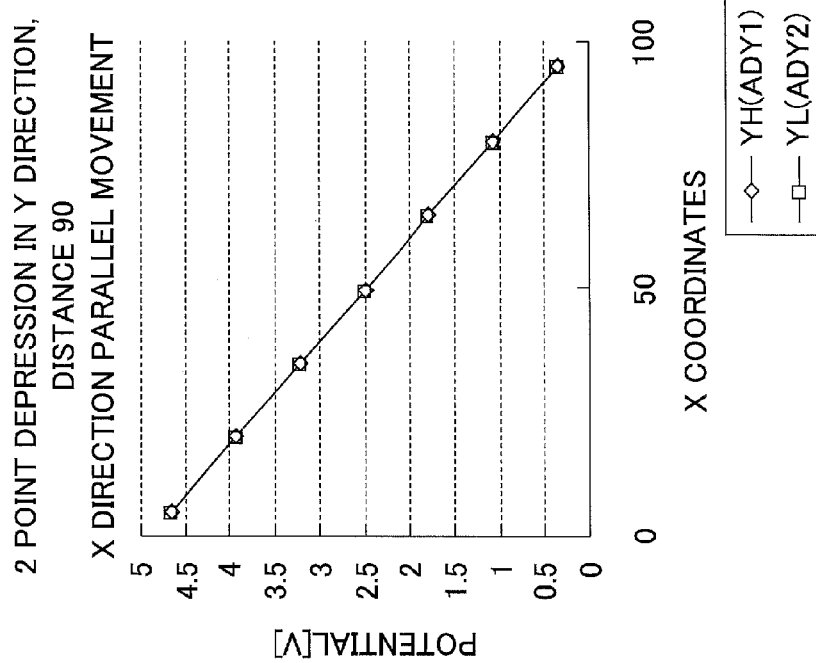
FIGS. 23A-23B are diagrams (14) illustrating an analysis of the touch panel by using the finite element method.
Figure 23A:
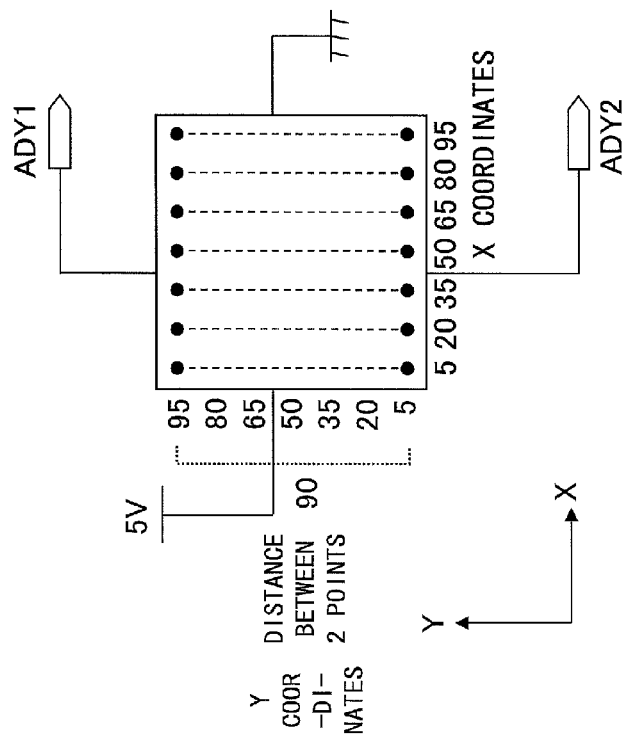

Further, FIGS. 23A-23B illustrate changing the contact positions of 2 points in the touch panel in a case of applying voltage in an X axis direction, that is, a case of applying a potential of 5 V to the XH electrode 11 and grounding the XL electrode 12 in which the contact points are positioned with the same X axis coordinates and have a constant space of 15 therebetween in the Y axis direction (Y coordinates of the two contact points being position 5 and position 95). FIG. 23A illustrate coordinate positions of 2 contact points of the touch panel in this state. FIG. 23B illustrates a relationship between the position of X coordinates of the contact points and the potentials detected by the potential detection parts ADY1, ADY2.

Figure 24B:
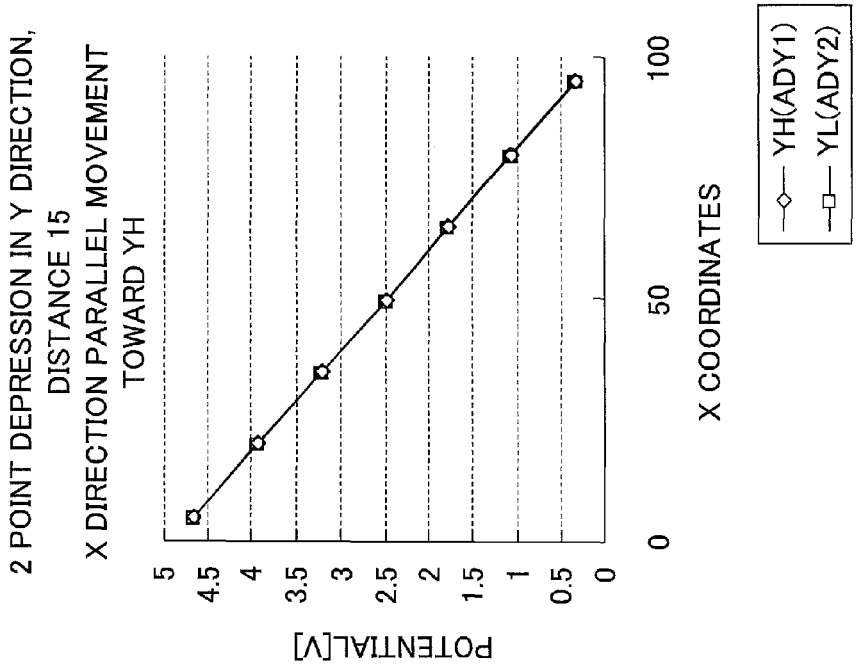
FIGS. 24A-24B are diagrams (15) illustrating an analysis of the touch panel by using the finite element method.
Figure 24A:
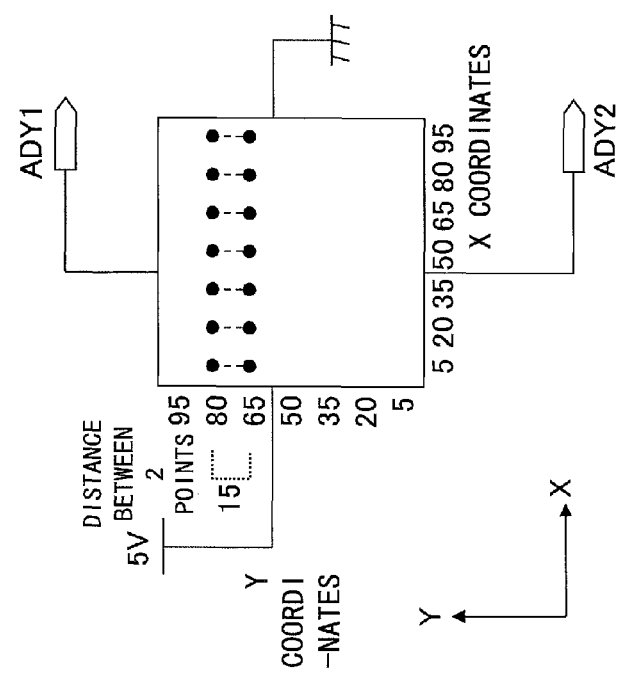

Further, FIGS. 24A-24B illustrate changing the contact positions of 2 points in the touch panel in a case of applying voltage in an X axis direction, that is, a case of applying a potential of 5 V to the XH electrode 11 and grounding the XL electrode 12 in which the contact points are positioned with the same X axis coordinates and have a constant space of 15 therebetween in the Y axis direction (Y coordinates of the two contact points being position 65 and position 80). FIG. 24A illustrates coordinate positions of 2 contact points of the touch panel in this state. FIG. 24B illustrates a relationship between the position of X coordinates of the contact points and the potentials detected by the potential detection parts ADY1, ADY2.

Figure 25B:
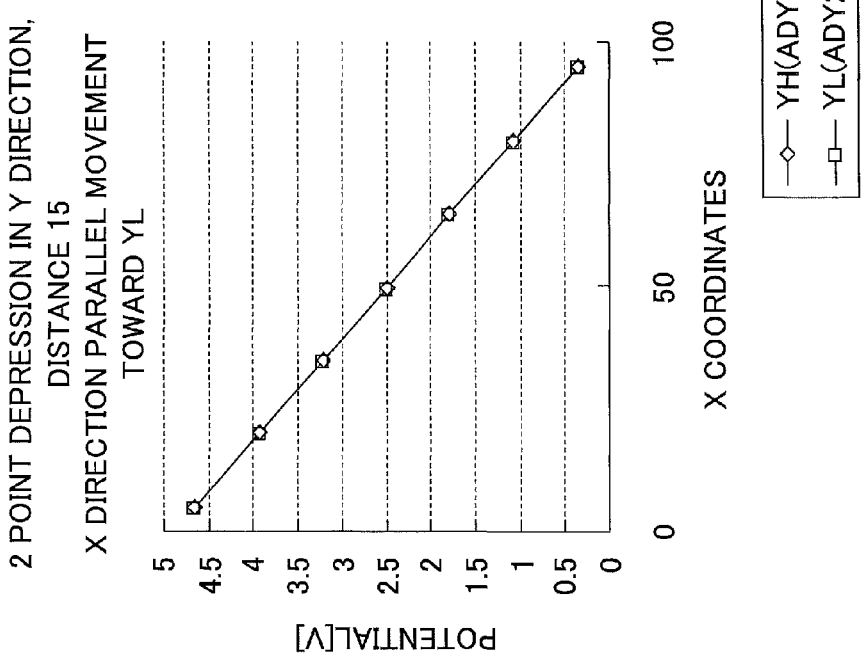
FIGS. 25A-25B are diagrams (16) illustrating an analysis of the touch panel by using the finite element method.
Figure 25A:
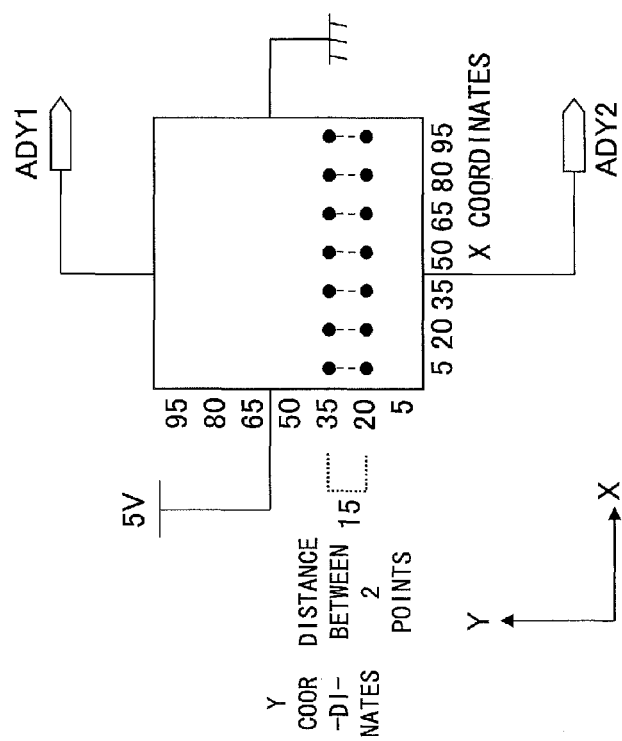

Further, FIGS. 25A-25B illustrates changing the contact positions of 2 points in the touch panel in a case of applying voltage in an X axis direction, that is, a case of applying a potential of 5 V to the XH electrode 11 and grounding the XL electrode 12 in which the contact points are positioned with the same X axis coordinates and have a constant space of 15 therebetween in the Y axis direction (Y coordinates of the two contact points being position 20 and position 35). FIG. 25A illustrates coordinate positions of 2 contact points of the touch panel in this state. FIG. 25B illustrates a relationship between the position of X coordinates of the contact points and the potentials detected by the potential detection parts ADY1, ADY2.

As illustrated in FIGS. 23A to 25B, in a case where the Y coordinates of the contact positions of 2 points are both the same, the potentials detected by the potential detection parts ADY1, ADY2 are of equal values. The potentials corresponding to the X coordinates of points A and B are detected by the potential detection parts ADY1, ADY2. That is, in a case where there are 2 contact points in a direction parallel to the Y axis direction, the potentials corresponding to the X coordinates of points A and B are detected by the potential detection parts ADY1, ADY2 without relying on the space between points A and B.

Although a case of applying voltage in the X axis direction has been described above, the line connecting 2 points contacting the touch panel can be determined whether it is parallel to the X axis direction or the Y axis direction by using the same method where voltage is applied in the Y axis direction.

Therefore, depending on whether the potentials are detected by the potential detection parts ADY1, ADY2, whether the 2 contact points in the touch panel are parallel to the X axis direction or the Y axis direction can be determined on based on the potential detected by the potential detection part ADY1 in Step S102 and the potential detected by the potential detection part ADY2. Depending on the relationship of the amounts of the potentials detected by the potential detection parts ADY1, ADY2, whether the inclination of the line connecting the 2 contact points is a right upward inclination or a left upward inclination can be determined.

That is, the inclination of the line connecting the 2 points is determined to be oriented upward to the right in a case where the potential detected by the potential detection part ADY1 is lower than the potential detected by the potential detection part ADY2. Further, the inclination of the line connecting the 2 points is determined to be oriented upward to the left in a case where the potential detected by the potential detection part ADY1 is higher than the potential detected by the potential detection part ADY2. Further, the line connecting the 2 points is determined to be parallel to the X axis direction or the Y axis direction in a case where the potential detected by the potential detection part ADY1 and the potential detected by the potential detection part ADY2 are equal.

Although the above describes a case of determining whether the 2 contact points in the touch panel are parallel to the X axis direction or the Y axis direction based on the potentials detected in Steps S110 and S112 (i.e. information obtained in the third and fourth measurement steps), determination can be performed based on the potentials detected in Steps S102 and S104 (i.e. information obtained in the first and second measurement steps).

Further, although the above describes a case of determining whether the inclination of the line connecting the 2 contact points in the touch panel is oriented upward to the right or upward to the left, the same applies to a case where voltage is applied to the Y axis direction.

Figure 26:
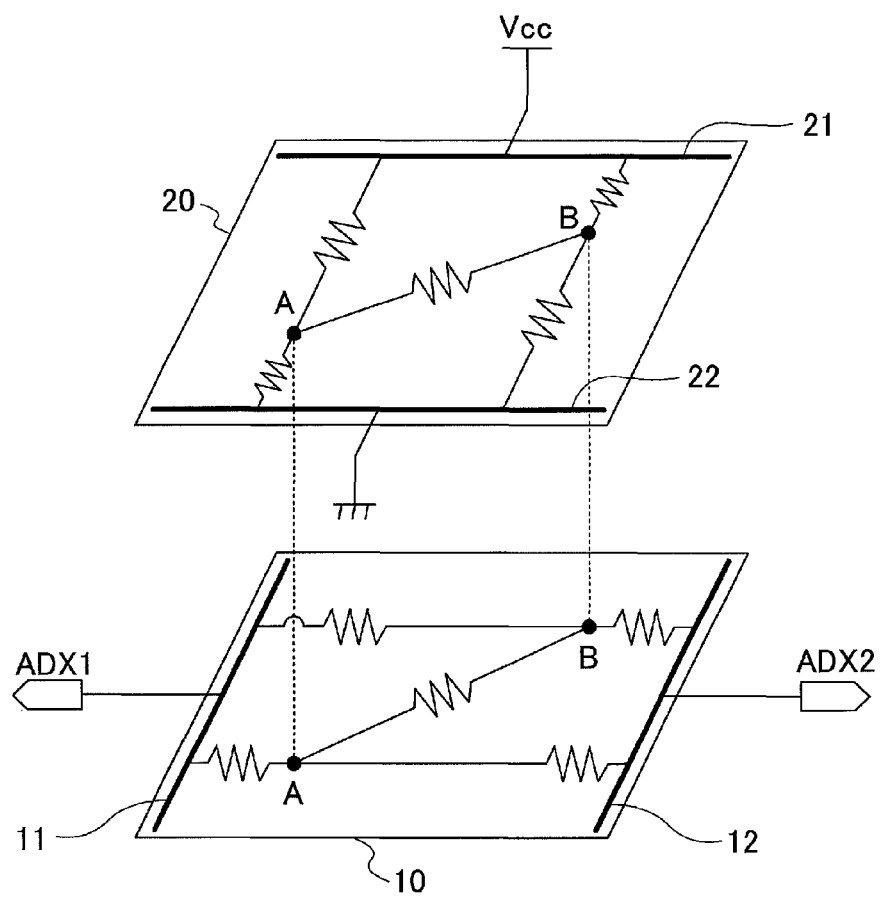
FIG. 26 is a diagram (3) for describing the position detection method in the touch panel of the first embodiment.

More specifically, in a case of applying a potential (Vcc) of 5 V to the YH electrode 21 and grounding (0 V) the YL electrode 22 in a case where points A and B are contact points as illustrated in FIG. 26, the potential detected by the potential detection part ADX2 is higher than the potential detected by the potential detection part ADX1 as illustrated in FIGS. 27A-27B when point A is closer to the XH electrode 11 and the YL electrode 22 than point B.

FIGS. 27A-27B illustrate changing the contact positions of 2 points in the touch panel in a case of applying voltage in an Y axis direction, that is, a case of applying a potential of 5 V to the YH electrode 21 and grounding the YL electrode 22 in which the contact points have a predetermined space therebetween and are positioned on a straight line oriented upward to the right. FIG. 27A illustrates coordinate positions of 2 contact points of the touch panel in this state. FIG. 27B illustrates a relationship between the position of X coordinates at the mid-point of the 2 contact points and the potentials detected by the potential detection parts ADX1, ADX2.

Because point A is positioned close to the grounded YL electrode 22, point A is significantly affected by the YL electrode 22. Thus, a relatively low potential is detected by the potential detection part ADX1 connected to the YH electrode 11 positioned close to point A. Because point B is positioned close to the YH electrode 21 to which a potential of 5 V is applied, point B is significantly affected by the YH electrode 21. Thus, a relatively high potential is detected by the potential detection part ADX2 connected to the XL electrode 12 positioned close to point B.

Figure 28:
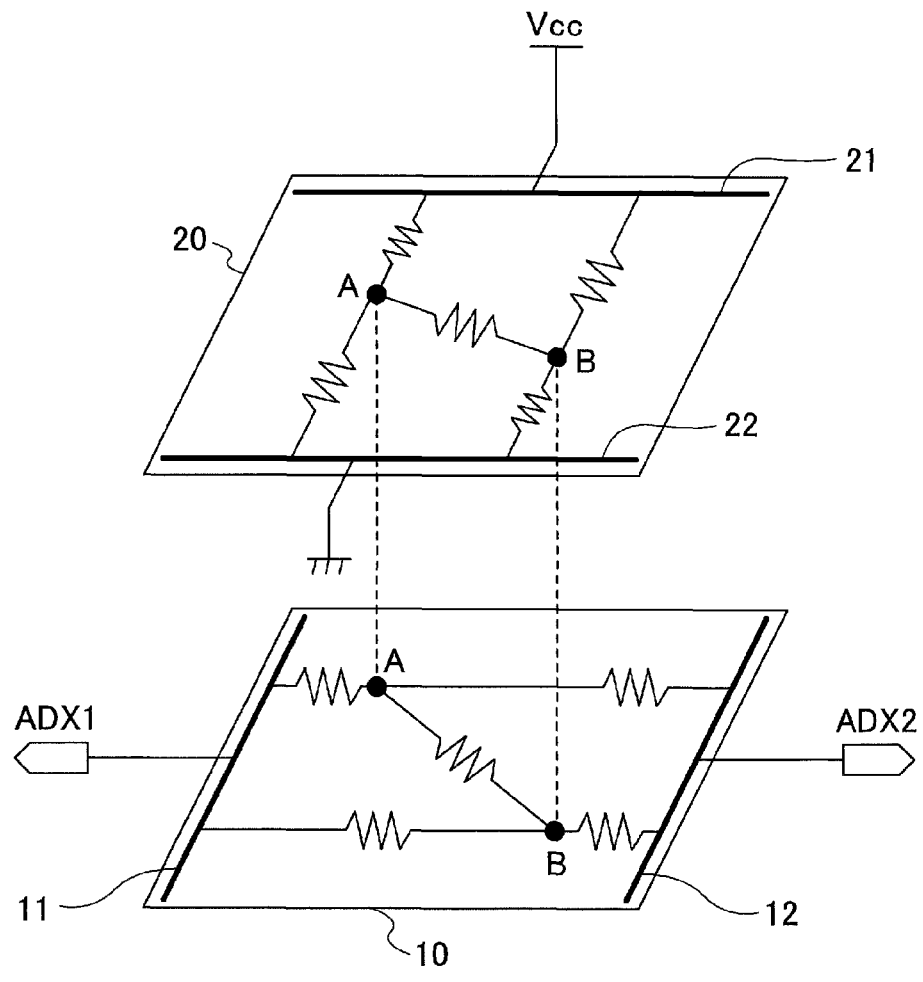
FIG. 28 is a diagram (4) for describing the position detection method in the touch panel of the first embodiment.
Figure 29B:
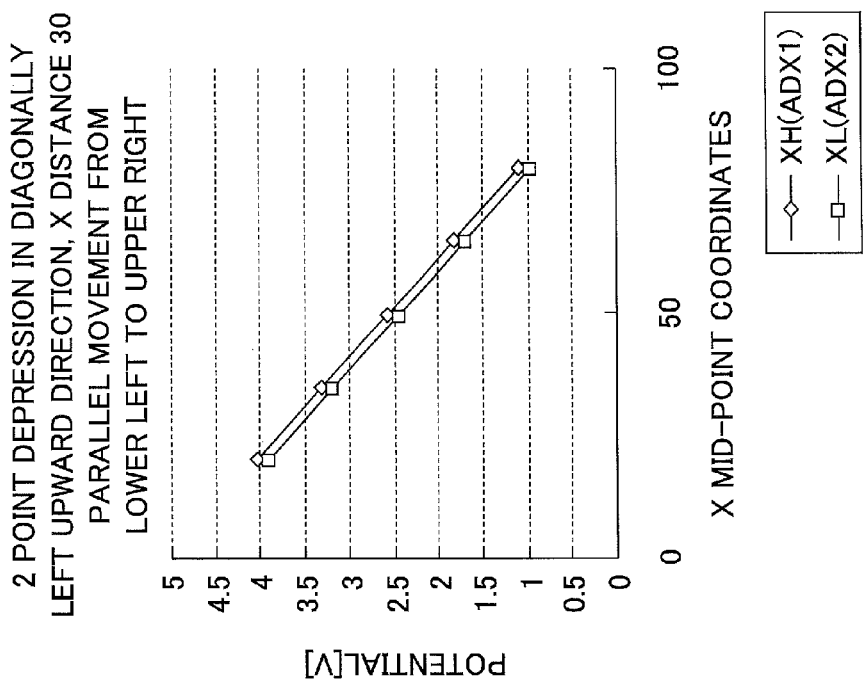
FIGS. 29A-29B are diagrams (18) illustrating an analysis of the touch panel by using the finite element method.
Figure 29A:
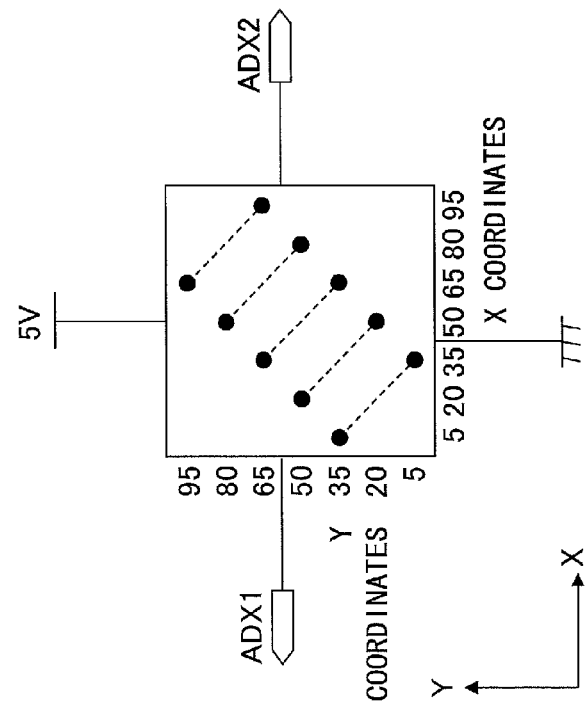

In a case of applying a potential (Vcc) of 5 V to the YH electrode 21 and grounding (0 V) the YL electrode 22 as illustrated in FIG. 28, the potential detected by the potential detection part ADX2 is lower than the potential detected by the potential detection part ADX1 as illustrated in FIGS. 29A-29B when point A is closer to the XH electrode 11 and the YH electrode 21 than point B.

FIGS. 29A-29B illustrate changing the contact positions of 2 points in the touch panel in a case of applying voltage in an Y axis direction, that is, a case of applying a potential of 5 V to the YH electrode 21 and grounding the YL electrode 22 in which the contact points have a predetermined space therebetween and are positioned on a straight line oriented upward to the left. FIG. 29A illustrates coordinate positions of 2 contact points of the touch panel in this state. FIG. 29B illustrates a relationship between the position of X coordinates at the mid-point of the 2 contact points and the potentials detected by the potential detection parts ADX1, ADX2.

Because point A is positioned close to the YH electrode 21 to which a potential of 5 V is applied, point A is significantly affected by the YH electrode 21. Thus, a relatively high potential is detected by the potential detection part ADX1 connected to the XH electrode 11 positioned close to point A. Because point B is positioned close to the grounded YL electrode 22, point B is significantly affected by the YL electrode 22. Thus, a relatively low potential is detected by the potential detection part ADX2 connected to the XL electrode 12 positioned close to point B.

Thus, even in a case of applying voltage in the X axis direction, the line connecting the 2 contact points on the touch panel can be determined whether it is oriented upward to the right or upward to the left.

Then, as illustrated in Step S116, the mid-point of two contact points in the touch panel is calculated. More specifically, a mid-point of each potential is calculated based on the potentials measured in Steps S110 and S112 (potentials measured in the third and fourth measurement steps). Thereby, the mid-point of the 2 contacts points in the touch panel can be calculated.

This is described by referring to FIGS. 30 and 31.

Figure 30B:
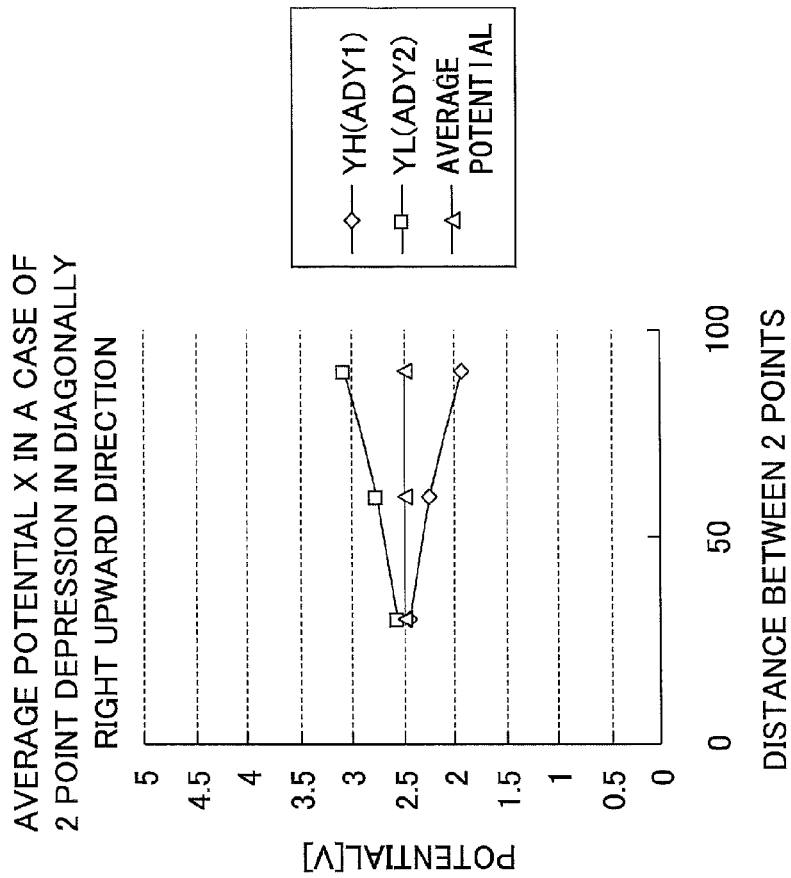
FIGS. 30A-30B are diagrams (19) illustrating an analysis of the touch panel by using the finite element method.
Figure 30A:
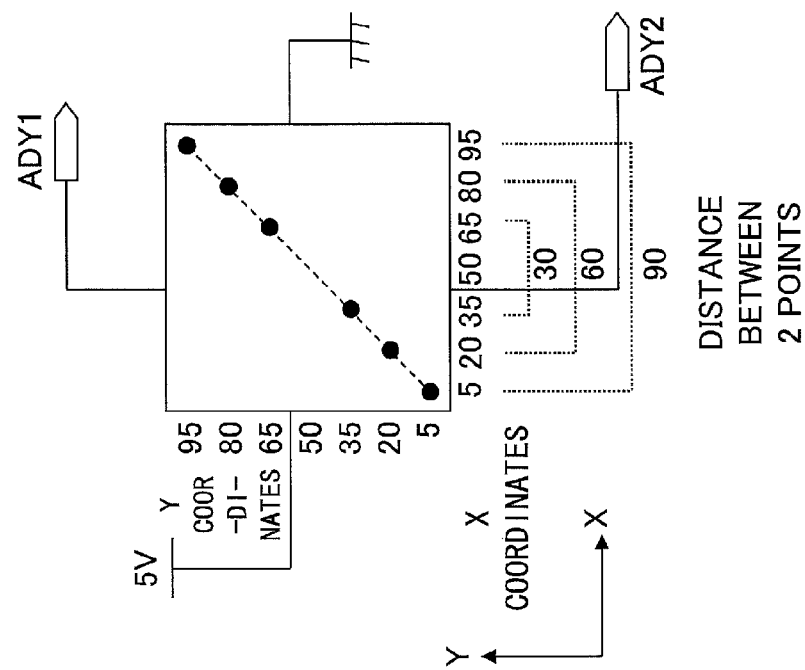

FIGS. 30A-30B illustrate a case of changing the space between 2 contact points in the touch panel positioned on a straight line oriented upward to the right, so that the mid-point of the 2 points is located at position 50 while applying voltage in an X axis direction, that is, applying a potential of 5 V to the XH electrode 11 and grounding the XL electrode 12. FIG. 30A illustrates coordinate positions of 2 contact points of the touch panel in this state. FIG. 30B illustrates a relationship between the distance between the X coordinates of the 2 points (or the distance between the Y coordinates of the 2 points) and the potentials detected by the potential detection parts ADY1, ADY2 along with the average of the potentials.

Figure 31A:
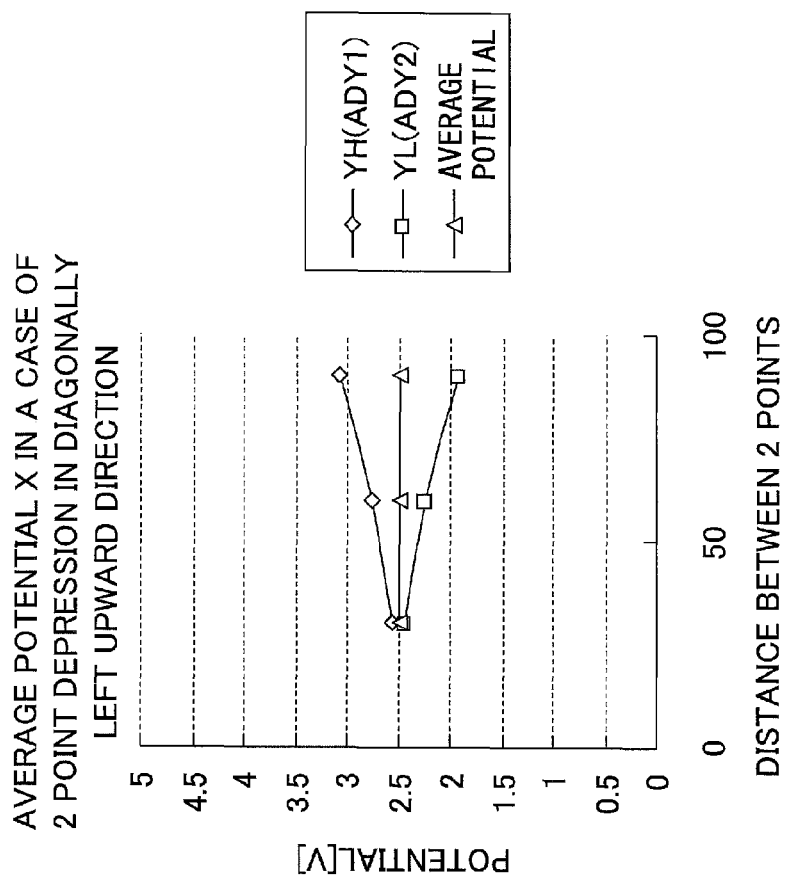
FIGS. 31A-31B are diagrams (20) illustrating an analysis of the touch panel by using the finite element method.
Figure 31B:
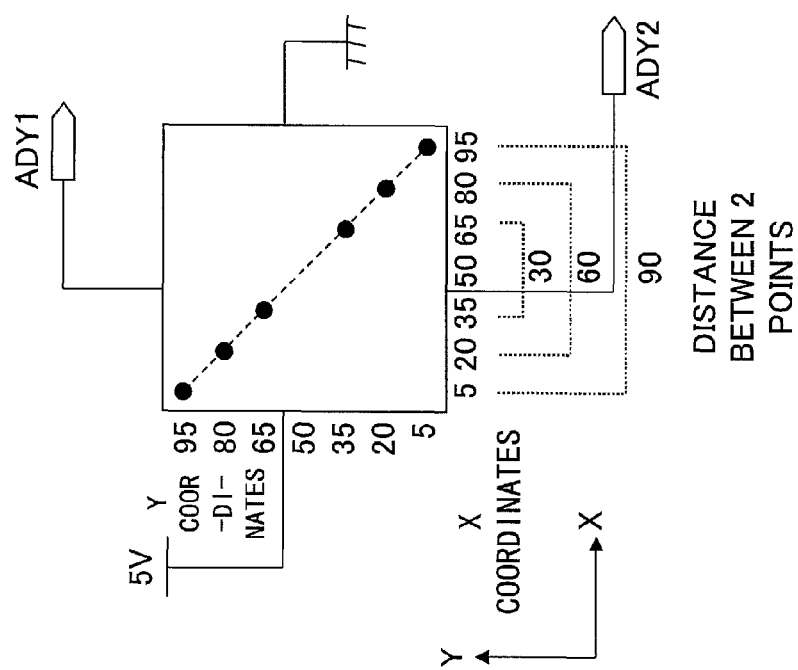

FIGS. 31A-31B illustrate a case of changing the space between 2 contact points in the touch panel positioned on a straight line oriented upward to the left, so that the mid-point of the 2 points is located at position 50 while applying voltage in an X axis direction, that is, applying a potential of 5 V to the XH electrode 11 and grounding the XL electrode 12. FIG. 31A illustrates coordinate positions of 2 contact points of the touch panel in this state. FIG. 31B illustrates a relationship between the distance between the X coordinates of the 2 points (or the distance between the Y coordinates of the 2 points) and the potentials detected by the potential detection parts ADY1, ADY2 along with the average of the potentials.

As illustrated in FIGS. 30 and 31, the difference of the potentials detected by the potential detection parts ADY1, ADY2 tends to increase as the space between the 2 points increases. However, the average of the potentials detected by the potential detection parts ADY1, ADY2 indicate a constant value. This value represents a value of the mid-point of the 2 contact points in the touch panel.

Accordingly, by calculating the average value of the potentials detected by the potential detection parts ADY1, ADY2, the potential corresponding to the mid-point of the X coordinates of the 2 contact points can be obtained. Based on the obtained potential, the X coordinates of the mid-point can be obtained.

FIGS. 30 and 31 illustrate a case of calculating the X coordinates of the mid-point of 2 contact points in the touch panel. Similarly, the Y coordinates of the mid-point of 2 contact points in the touch panel can be obtained based on the potentials detected by the potential detection parts ADX1, ADX2 in a case of applying voltage in the Y axis direction, that is, a case of applying a potential of 5 V to the YH electrode 21 and grounding the YL electrode 22.

Thereby, the coordinates of the mid-point of 2 contact points in the touch panel can be obtained.

Then, in Step S118, the distance between 2 contact points in the touch panel is calculated. More specifically, the distance between 2 contact points in the touch panel is calculated based on the potentials measured in Steps S102 and S104 (potentials measured in the first and second measurement steps).

Figure 32:
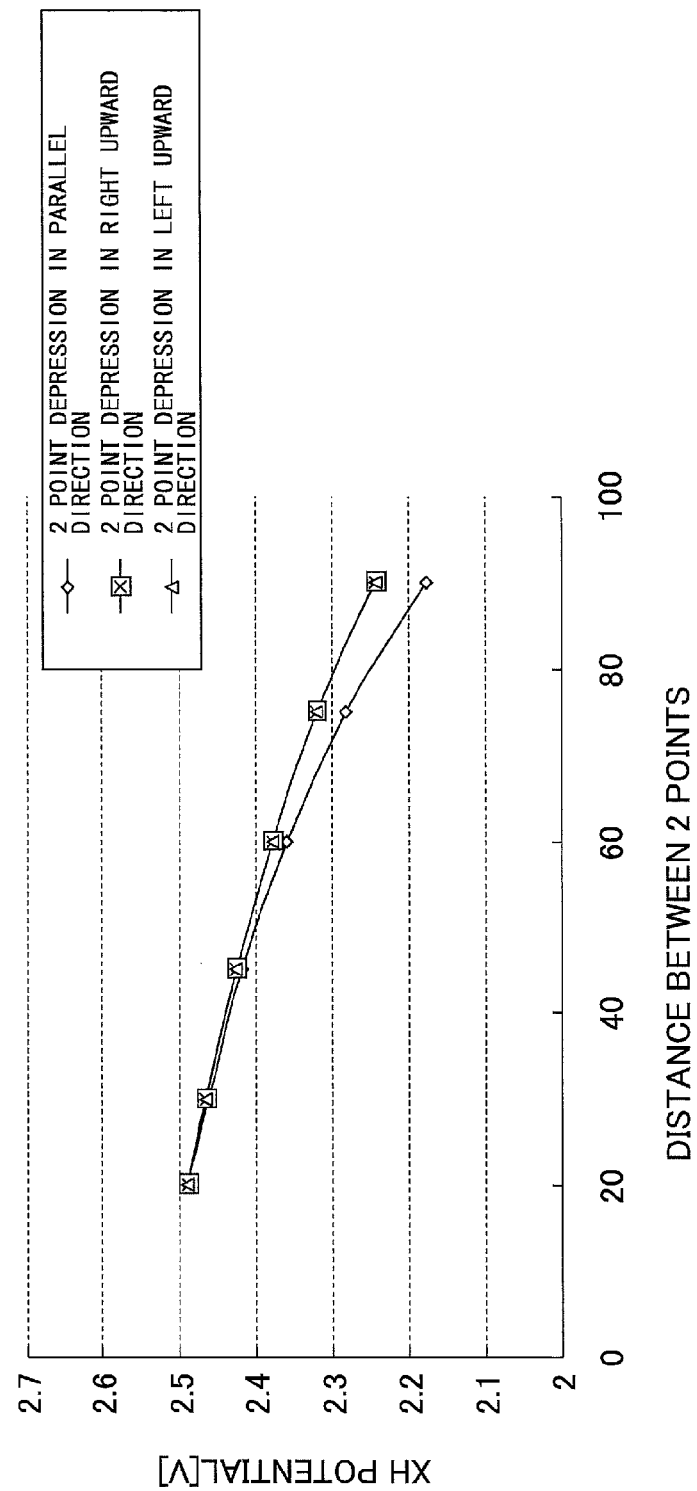
FIG. 32 is a diagram illustrating a correlation between a distance of 2 points in an axial direction and a potential of an XH electrode.

The calculation of the distance between 2 contacts points is described with FIG. 32. FIG. 32 illustrates a relationship between the distance of the X coordinates of 2 points and the potential detected by the potential detection part ADX1 connected to the XH electrode 11 in a state of Step S102, that is, a state illustrated in FIG. 5. As illustrated in FIG. 32, the value of the potential detected by the potential detection part ADX1 becomes lower as the distance between the 2 points increases. Further, the relationship between the distance between the 2 points and the potential detected by the potential detection part ADX1 is different in a case where the 2 points are oriented in a direction parallel to the direction in which voltage is applied (i.e. direction parallel to X axis direction) and in a case where the 2 points are not oriented in the direction parallel to the X axis direction (i.e. direction oriented upward to the right or upward to the left).

Therefore, a relationship between the distance between 2 points illustrated in FIG. 32 and the potential detected by the potential detection part ADX1 in Step S102 is selected according to the positional relationship of the 2 contact points detected in Step S114 (i.e. according to whether the 2 points are oriented in a direction parallel to the X axis direction). The distance between 2 points in the X axis direction can be obtained based on the selected relationship.

More specifically, in a case where 2 contact points in the touch panel are positioned on a straight line parallel to the X axis direction, the distance between the 2 contact points in the X axis direction can be calculated based on the potential detected by the potential detection part ADX1 in Step S102 by using a curved line 32A of FIG. 32. Further, in a case where 2 contact points in the touch panel are not positioned on the straight line parallel to the X axis direction (i.e. a case where 2 contact points are positioned on a straight line oriented upward to the right or upward to the left), the distance between the 2 contact points in the X axis direction can be calculated based on the potential detected by the potential detection part ADX1 in Step S102 by using a curved line 32B of FIG. 32.

Figure 33:
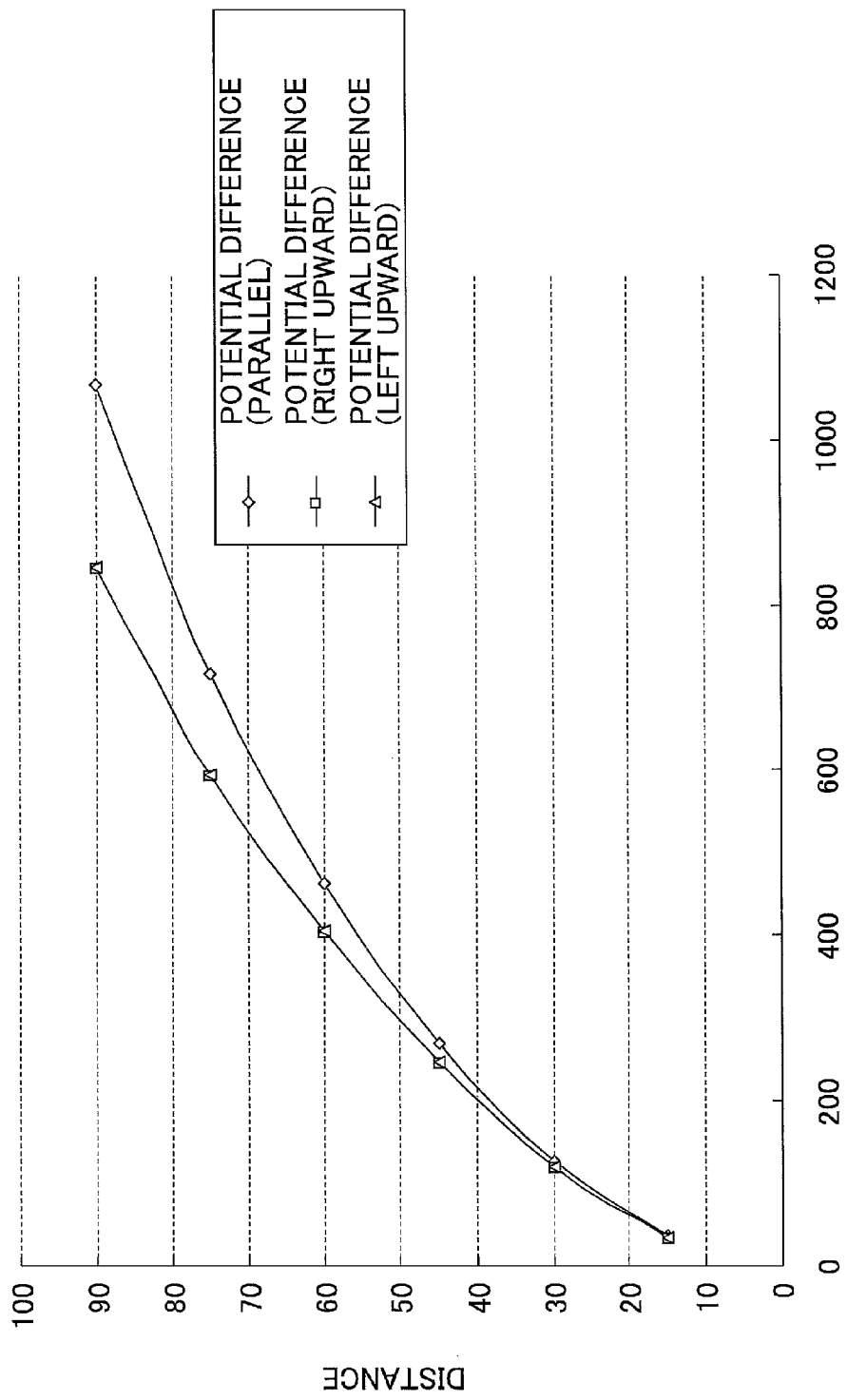
FIG. 33 is a diagram illustrating a correlation between a distance of 2 points in an axial direction and (reference potential-measured potential)

FIG. 33 illustrates a relationship between the difference between 2.5 V and a potential detected by, for example, the potential detection part ADX1 and the distance between 2 points in the X axis direction. Similarly, based on this correlation, the distance in the X axis direction can be obtained according to the difference between 2.5 V and the potential detected by, for example, the potential detection part ADX1.

By using the similar method, the distance in the Y axis direction can also be obtained based on the potential detected by the potential detection part ADY1 in Step S104.

Expression 1 illustrates a relationship between the difference of voltage V with respect to 2.5 V and the distances $L_1$-$L_4$ with respect to each of the X and Y axis directions (note that: distances $L_1$-$L_4$ may also be referred to as distance Lx in the X axis direction, and distance Ly in the Y axis direction).

The formula used in Expression 1 may be used to calculate the distance L in each axis direction. The following $\alpha_1$ to $\alpha_8$, $\beta_1$ to $\beta_8$, $\gamma_1$ to $\gamma_8$, and $\delta_5$ to $\delta_8$ may be calculated beforehand based on FIG. 32 or 33, or defined by way of, for example, an experiment. Further, these values may be stored in, for example, the control part 30.

PARALLEL DIRECTION APPROXIMATION:
$L_1 = \alpha_1 V^2 + \beta_1 V + \gamma_1$

DIAGONAL X DIRECTION APPROXIMATION:
$L_2 = \alpha_2 V^2 + \beta_2 V + \gamma_2$

ORTHOGONAL DIRECTION APPROXIMATION:
$L_3 = \alpha_3 V^2 + \beta_3 V + \gamma_3$

DIAGONAL Y DIRECTION APPROXIMATION:
$L_4 = \alpha_4 V^2 + \beta_4 V + \gamma_4$     [Expression 1]

A cubic expression illustrated in Expression 2 may also be used for the calculation.

PARALLEL DIRECTION APPROXIMATION:
$L_1 = \delta_5 V^3 + \alpha_5 V^2 + \beta_5 V + \gamma_5$ DIAGONAL X DIRECTION APPROXIMATION:
$L_2 = \delta_6 V^3 + \alpha_6 V^2 + \beta_6 V + \gamma_6$ ORTHOGONAL DIRECTION APPROXIMATION:
$L_3 = \delta_7 V^3 + \alpha_7 V^2 + \beta_7 V + \gamma_7$ DIAGONAL Y DIRECTION APPROXIMATION:
$L_4 = \delta_8 V^3 + \alpha_8 V^2 + \beta_8 V + \gamma_8$     [Expression 2]

Then, in Step S120, the coordinates of the 2 contact points in the touch panel are calculated.

More specifically, the coordinates of the 2 contact points in the touch panel are calculated based on the positional relationship of the 2 contact points in the touch panel, position of the mid-point between the 2 contact points, and the distance in each axis direction.

More specifically, the positional coordinates of the 2 contact points in the touch panel are calculated based on the position of the mid-point between the 2 contact points in the touch panel and the distance between the 2 contact points in each axis direction. More specifically, the coordinates of the 2 contact points are represented by the formulas indicated in Expressions 3 and 4 in a case of calculating Lx as the distance in the X axis direction, calculating Ly as the distance in the Y axis, and calculating the position (Xc, Yc) of the mid-point between the 2 contact points. Expression 3 indicates a case where the 2 contact points are oriented upward to the right, Expression 4 indicates a case where the 2 contact points are oriented upward to the left, Expression 5 indicates a case where the 2 contact points are oriented parallel to the X axis direction, and Expression 6 indicates the 2 contact points oriented parallel to the Y axis direction.

$(Xc+Lx/2, Yc+Ly/2), (Xc-Lx/2, Yc-Ly/2)$     [Expression 3]

$(Xc+Lx/2, Yc-Ly/2), (Xc-Lx/2, Yc+Ly/2)$     [Expression 4]

$(Xc+Lx/2, Yc), (Xc-Lx/2, Yc)$     [Expression 5]

$(Xc, Yc+Ly/2), (Xc, Yc-Ly/2)$     [Expression 6]

The method for detecting a position in the touch panel of this embodiment has been described above. With the method for detecting position with the touch panel of this embodiment, position coordinates can be easily and accurately calculated even in a case where there are 2 contact points in the touch panel.

<Second Embodiment>

Next, a second embodiment is described. This embodiment, which is a position detection method in a touch panel, includes a process that is partly different from the first embodiment.

Figure 34:
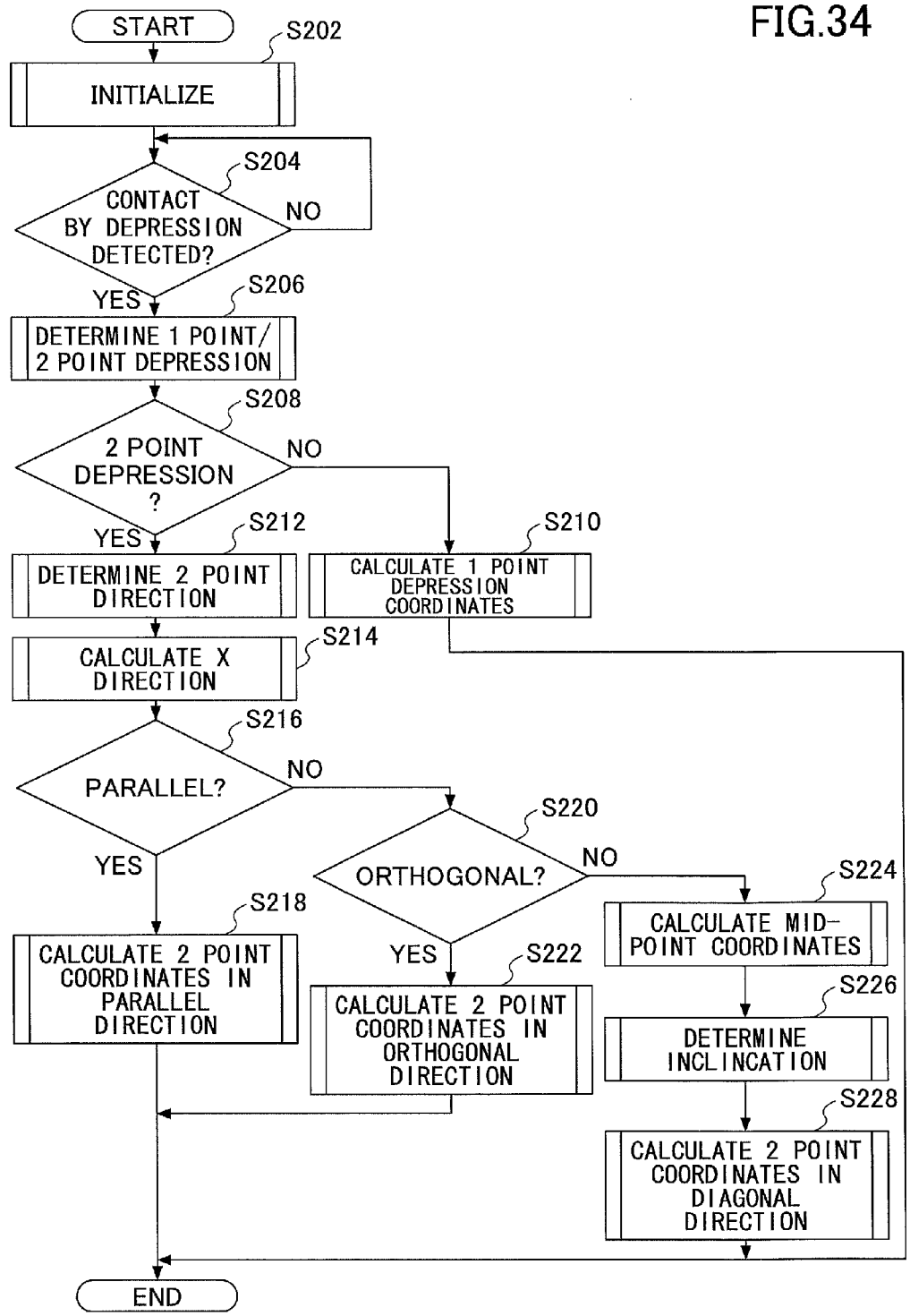
FIG. 34 is a flowchart of a position detection method according to a second embodiment of the present invention.

The position detection method in the touch panel of this embodiment is described with reference to FIG. 34.

First, in Step S202, initialization of the touch panel is performed. Details of the initialization are described below.

Then, in Step S204, it is determined whether there is contact to the touch panel by depression of a finger or the like. When there is contact by the finger or the like, the process proceeds to Step S206. When there is no contact by a finger or the like, Step S204 is repeated until there is contact by a finger or the like. More specifically, the process proceeds to Step S206 when it is assumed that there is contact by a finger or the like when a potential is detected through the second resistance film 20 in a state where voltage is applied to the first resistance film 10, or a potential is detected through the first resistance film in a state where voltage is applied to the second resistance film 20.

Then, in Step S206, a process of determining 1 point depression or 2 point depression is performed. Details of this step are described below.

Then, in Step S208, determination of 2 point depression is performed. More specifically, 1 point or 2 point is determined based on information indicating determination of 1 point/2 point depression of Step S206. In a case of 1 point depression, the process proceeds to Step S210. In a case of 2 point depression, the process proceeds to Step S212.

Then, in Step S210, position coordinates are calculated. More specifically, because 1 point depression is determined in Step S208, the coordinates of the 1 point depression is calculated by position detection with a regular four-line type touch panel. Then, position detection of FIG. 34 ends.

In Step S212, a direction (inclination) of a line connecting 2 points depressed in the touch panel is determined. Details of a process of Step S212 are described below.

Then, in Step S214, a distance between 2 points depressed in the touch panel is calculated.

Then, in Step S216, it is determined whether the line connecting 2 points depressed in the touch panel is parallel to the X axis direction. More specifically, it is determined whether the line connecting 2 points depressed in the touch panel is parallel to the X axis direction based on information obtained in Step S212. The process proceeds to Step S218 in a case where the line connecting 2 points depressed in the touch panel is determined to be parallel to the X axis direction. The process proceeds to Step S220 in a case where the line connecting 2 points depressed in the touch panel is not parallel to the X axis direction.

Then, in Step S218, the position coordinates of the 2 depressed points oriented in the parallel direction are calculated. Then, the position detection operation of FIG. 34 ends. Details of this process are described below.

On the other hand, in the case of "NO" in Step S216, it is determined whether the line connecting 2 depressed points oriented in the orthogonal direction are orthogonal to the X axis direction in Step S220. More specifically, it is determined whether the line connecting 2 depressed points is orthogonal to the X axis direction based on information obtained in Step S212. In a case where the line connecting 2 depressed points is determined to be orthogonal (orthogonal direction) to the X axis direction, the process proceeds to Step S222. In a case where the line connecting 2 depressed points is determined to not be orthogonal to the X axis direction, the process proceeds to Step S224.

Then, in Step S222, the position coordinates of the 2 depressed points are calculated. Then, the position detection operation of FIG. 34 ends. Details of this process are described below.

Then, in Step S224, the coordinates of a mid-point of the 2 points depressed in the touch panel are detected. Details of this process are described below.

Then, in Step S226, an inclination direction of the line connecting the 2 points depressed in the touch panel is detected. Details of this process are described below.

Then, in Step S228, the position coordinates of the 2 points depressed in the touch panel are calculated. Details of this process are described below.

Then the position detection in the touch panel of this embodiment ends.

Figure 35:
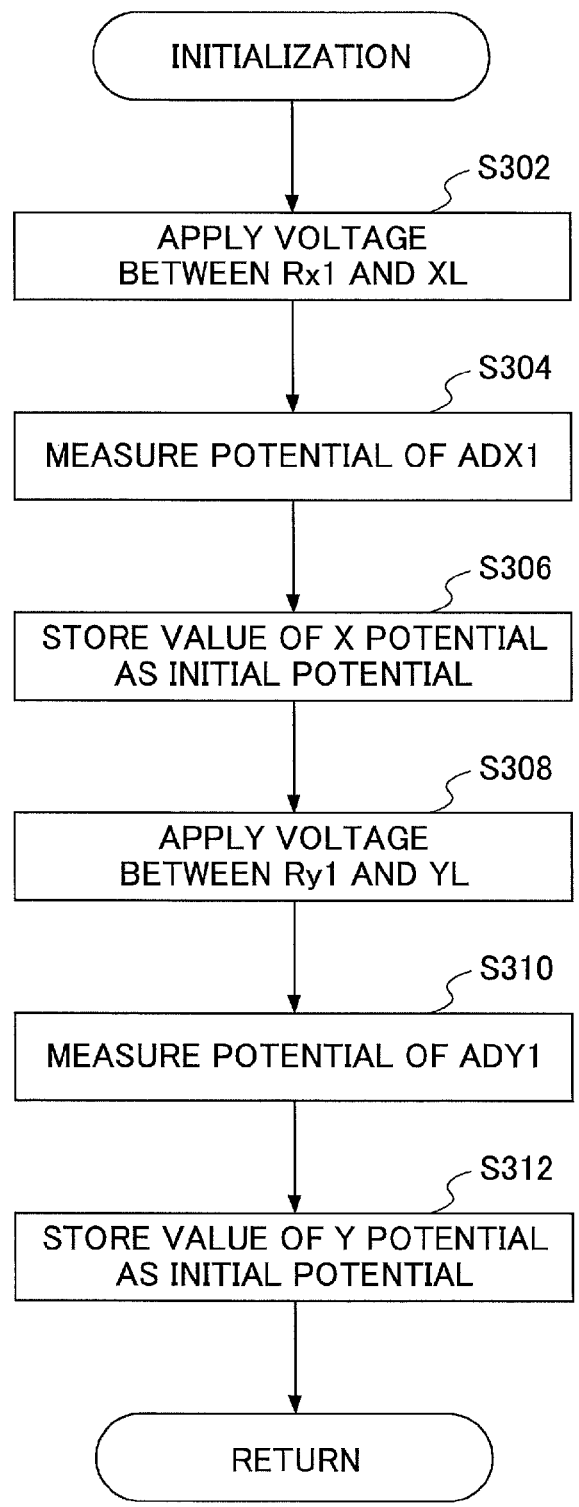
FIG. 35 illustrates a sub-routine (1) of the position detection method of the second embodiment.

Next, a sub-routine of the initialization of Step S202 is described based on FIG. 35.

First, in Step S302, a power supply voltage is applied to the XH electrode 11 in a state where the resistor Rx1 and the first resistance film 10 between the XH electrode 11 and the XL electrode 12 are connected in series. That is, as illustrated in FIG. 3, a power supply voltage Vcc is applied to the XH electrode 11 via the resistor Rx1, and the XL electrode 12 is grounded. In this state, it is assumed that the touch panel is either contacted at 1 point or not contacted.

Then, in Step S304, the potential detection part ADX1 connected to the XH electrode 11 detects potential.

Then, in Step S306, the potential detected by the potential detection parts ADX1 is stored in, for example, the memory 32 of the control part 30 as an initial potential of the X axis.

Then, in Step S308, a power supply voltage is applied in a state where the resistor Ry1 and the second resistance film 20 between the YH electrode 21 and the YL electrode 22 are connected in series. That is, as illustrated in FIG. 4, a power supply voltage Vcc is applied to the YH electrode 21 via the resistor Ry1, and the YL electrode 22 is grounded. In this state, it is assumed that the touch panel is either contacted at 1 point or not contacted.

Then, in Step S310, the potential detection part ADY1 connected to the YH electrode 21 detects potential.

Then, in Step S312, the potential detected by the potential detection parts ADY1 is stored in, for example, the memory 32 of the control part 30 as an initial potential of the Y axis.

The order for performing the set of Steps S302-S306 and the set of Steps S308-S312 may be switched.

Figure 36:
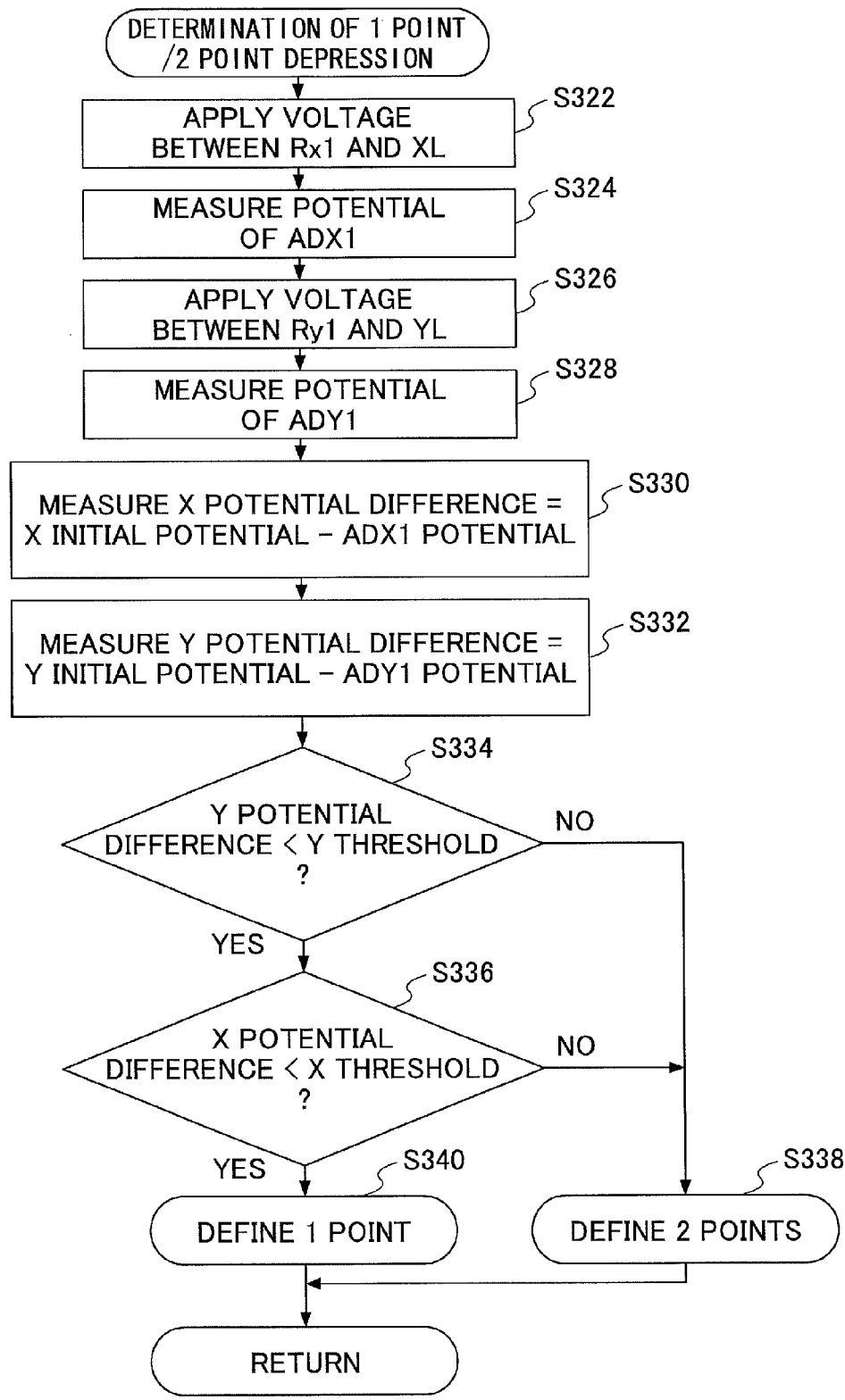
FIG. 36 illustrates a sub-routine (2) of the position detection method of the second embodiment.

Then, the sub-routine of FIG. 36 ends.

Next, a sub-routine of Step S206 for identifying 1 point depression or 2 point depression is described based on FIG. 36.

First, in Step S322, a power supply voltage is applied to the resistance Rx1 in a state where the resistor Rx1 and the first resistance film 10 between the XH electrode 11 and the XL electrode 12 are connected in series. That is, as illustrated in FIGS. 3-5, a power supply voltage Vcc is applied to a side of the resistor Rx1 that is not connected to the XH electrode 11, and the XL electrode 12 is grounded. In this state, it is assumed that the touch panel is either contacted at 1 point or 2 points.

Then, in Step S324, the potential detection part ADX1 connected to the XH electrode 11 detects potential.

Then, in Step S326, a power supply voltage is applied in a state where the resistor Ry1 and the second resistance film 20 between the YH electrode 21 and the YL electrode 22 are connected in series. That is, as illustrated in FIGS. 4-6, a power supply voltage Vcc is applied to a side of the resistor Ry1 that is not connected to the YH electrode 21, and the YL electrode 22 is grounded. In this state, it is assumed that the touch panel is either contacted at 1 point or 2 points.

Then, in Step S328, the potential detection part ADY1 connected to the YH electrode 21 detects potential.

Then, in Step S330, an X potential difference, which is a difference between an initial potential of an X axis obtained at initialization and the potential detected in Step S324, is calculated.

Then, in Step S332, a Y potential difference, which is a difference between an initial potential of a Y axis obtained at initialization and the potential detected in Step S328, is calculated.

Then, in Step S334, it is determined whether the Y potential difference calculated in Step S332 is less than a predetermined Y threshold. In a case where the Y potential difference is less than the predetermined Y threshold, the process proceeds to Step S336. In a case where the Y potential difference is not less than the predetermined Y threshold, the process proceeds to Step S338. The Y threshold is set beforehand for identifying 1 point contact or 2 point contact with respect to the touch panel, and is set taking error or the like into consideration.

Then, in Step S336, it is determined whether the X potential difference calculated in Step S330 is less than a predetermined X threshold. In a case where the X potential difference is less than the predetermined X threshold, the process proceeds to Step S340. In a case where the X potential difference is not less than the predetermined X threshold, the process proceeds to Step S338. The X threshold is set beforehand for identifying 1 point contact or 2 point contact with respect to the touch panel, and is set taking error or the like into consideration.

Then, in Step S338, information indicating the 2 point contact is stored in, for example, the memory 32 of the control part 30 when it is determined that the touch panel is being contacted by a finger or the like at 2 points.

Then, in Step S340, information indicating the 1 point contact is stored in, for example, the memory 32 of the control part 30 when it is determined that the touch panel is being contacted by a finger or the like at 1 point.

Then, the sub-routine of FIG. 36 ends.

Figure 37:
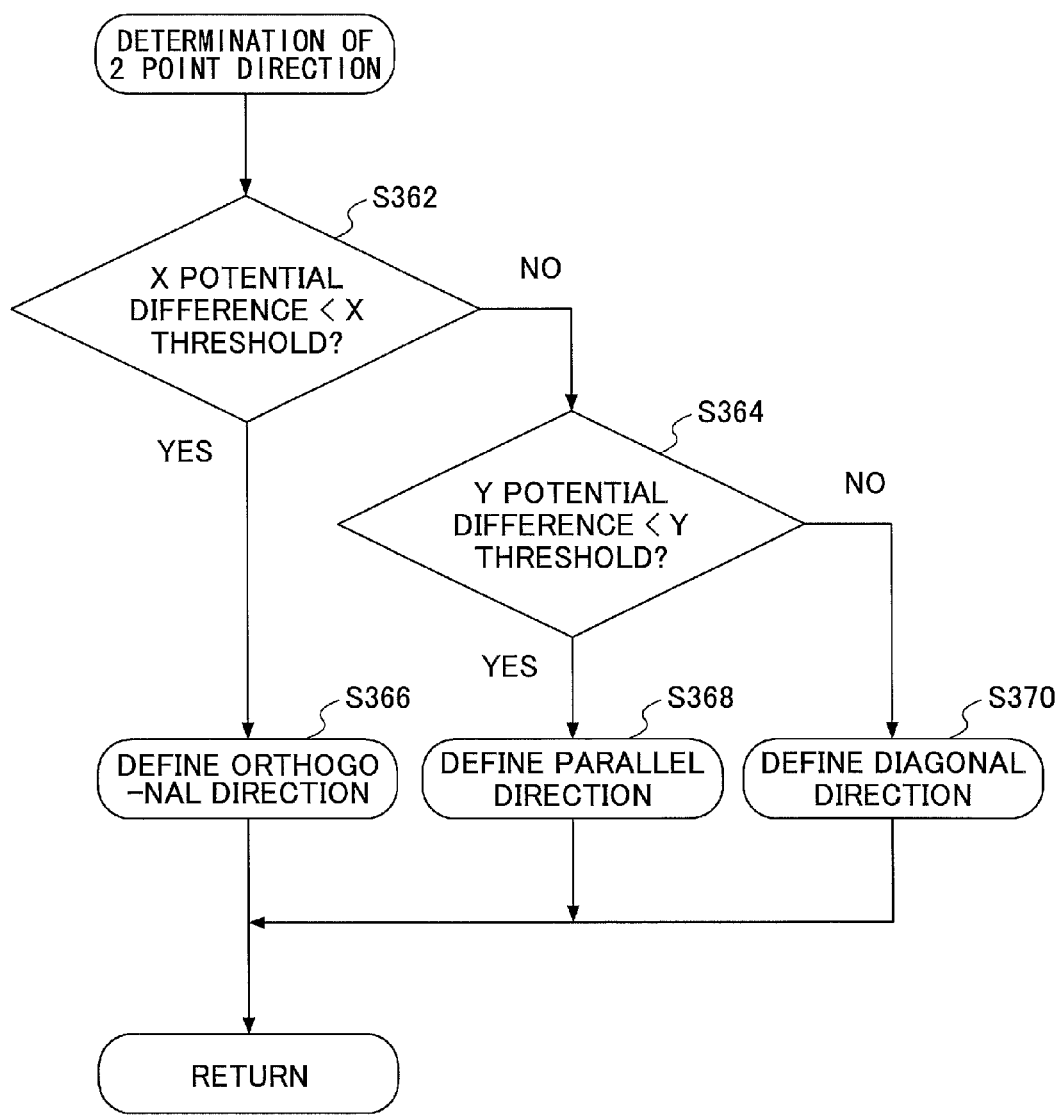
FIG. 37 illustrates a sub-routine (3) of the position detection method of the second embodiment.

Next, a sub-routine of Step S212 for identifying the direction (inclination) of the line connecting the 2 depressed points of the touch panel is described based on FIG. 37.

First, in Step S362, it is determined whether the X potential difference calculated in Step S330 is less than a predetermined X threshold. In a case where the X potential difference is less than the predetermined X threshold, the process proceeds to Step S366. In a case where the X potential difference is not less than the predetermined X threshold, the process proceeds to Step S648.

Then, in Step S364, it is determined whether the Y potential difference calculated in Step S332 is less than a predetermined Y threshold. In a case where the Y potential difference is less than the predetermined Y threshold, the process proceeds to Step S368. In a case where the Y potential difference is not less than the predetermined Y threshold, the process proceeds to Step S370.

In a case of YES in Step S362, the 2 points of the touch panel being contacted by a finger or the like are determined to be positioned on a straight line parallel to the Y axis direction that is orthogonal to the X axis direction. Thus, the 2 points are assumed to be oriented in the orthogonal direction. In Step S366, information indicating that the 2 points are oriented in the orthogonal direction is stored in, for example, the memory 32 of the control part 30.

In Step S368, it is determined that the 2 points of the touch panel being contacted by a finger or the like are determined to be positioned on a straight line of a direction orthogonal to the X axis direction (parallel to the Y axis direction). Thus, the 2 points are assumed to be oriented in a parallel direction. Information indicating that the 2 points are oriented in the parallel direction is stored in, for example, the memory 32 of the control part 30.

In Step S370, it is determined that the 2 points of the touch panel being contacted by a finger or the like are determined to be positioned on a straight line of a direction diagonal to the X axis direction (neither parallel nor orthogonal to the X axis direction). Thus, the 2 points are assumed to be oriented in a diagonal direction. Information indicating that the 2 points are oriented in the diagonal direction is stored in, for example, the memory 32 of the control part 30.

Then, the sub-routine of FIG. 37 ends.

Figure 38:
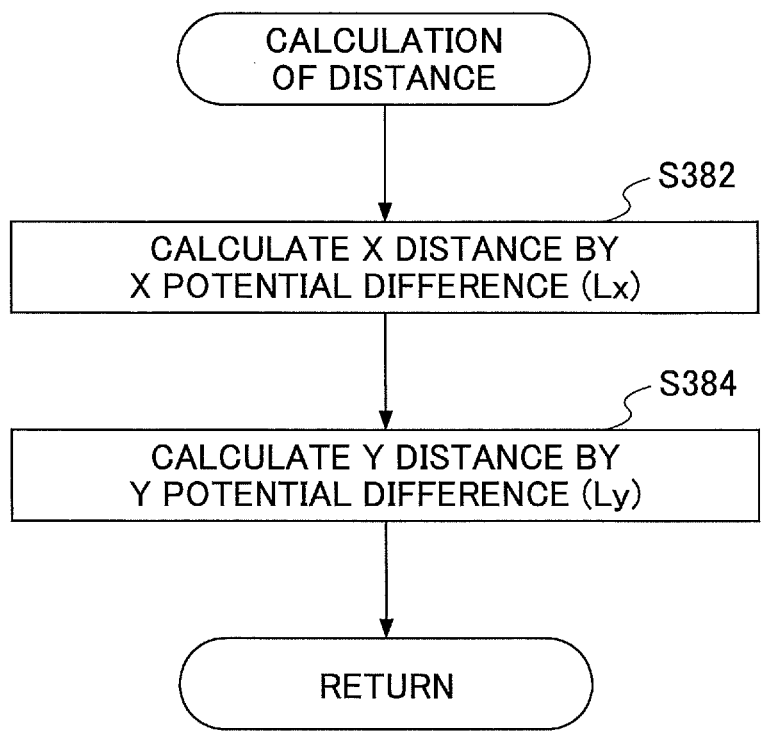
FIG. 38 illustrates a sub-routine (4) of the position detection method of the second embodiment.

Next, a sub-routine of Step S214 for calculating the distance of 2 contact points is described based on FIG. 38.

First, in Step S382, the distance of the X coordinates of 2 contact points in the touch panel, that is, the difference of the X coordinates of 2 contact points is calculated. More specifically, the distance Lx of the X coordinates corresponding to the X potential difference calculated in Step S330 is calculated based on FIGS. 32-33 and the formulas of Expressions 1 and 2.

In Step S384, the distance of the Y coordinates of 2 contact points in the touch panel, that is, the difference of the Y coordinates of 2 points is calculated. More specifically, the distance Ly of the Y coordinates corresponding to the Y potential difference calculated in Step S332 is calculated based on FIGS. 32-33 and the formulas of Expressions 1 and 2.

Then, the sub-routine of FIG. 38 ends.

Figure 39:
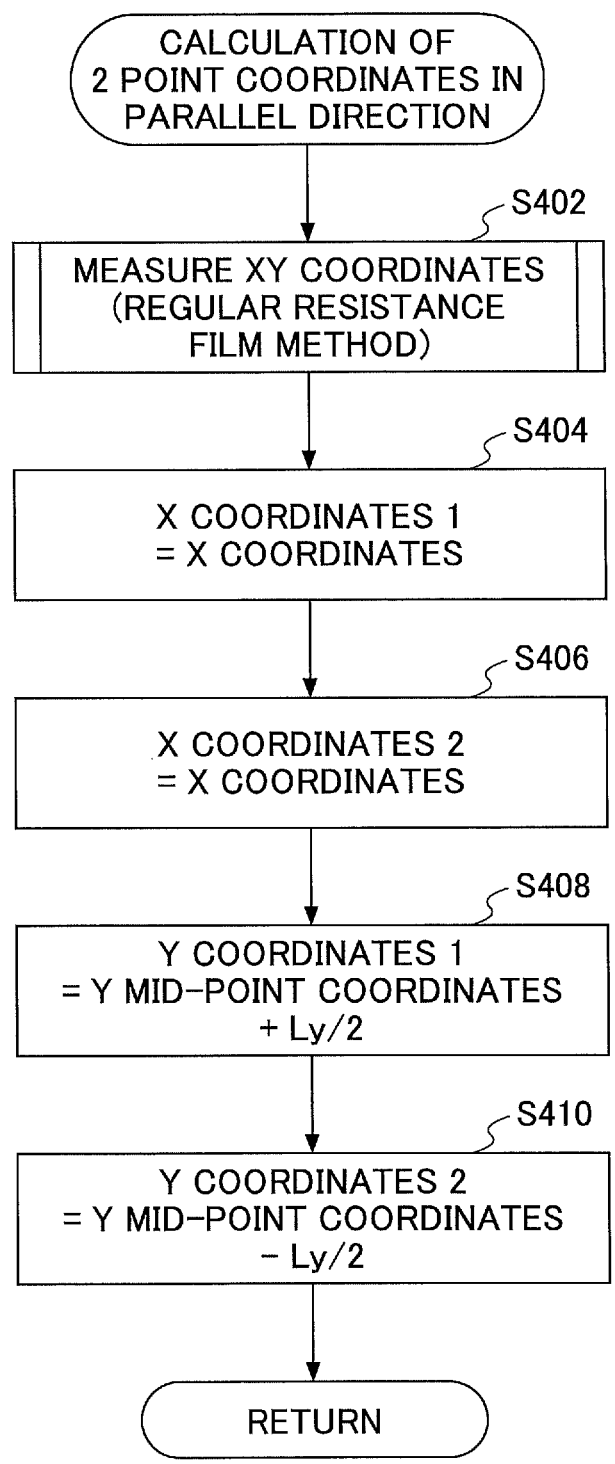
FIG. 39 illustrates a sub-routine (5) of the position detection method of the second embodiment.

Next, a sub-routine of Step S218 for calculating the position coordinates of 2 contact points oriented in the parallel direction is described based on FIG. 39.

First, in Step S402, coordinate detection is performed by using a regular four-line type position detection method. Thereby, X coordinates Xa and Y coordinates Ya are obtained. Because 2 depression points are oriented in the orthogonal direction, that is, a direction orthogonal to the X axis direction, the X coordinates of both of the 2 depression points are the same. Therefore, the X coordinates of the 2 depression points are X1, X2. Further, the Y coordinates Ya is the mid-point of the 2 depression points.

In Step S404, the coordinates Xa detected in Step S402 is assumed to be the X coordinates X1 of one of the 2 depression points of the touch panel.

In Step S406, the coordinates Xa detected in Step S402 is assumed to be the X coordinates X2 of the other one of the 2 depression points of the touch panel.

In Step S408, the Y coordinates of one of the 2 depression points of the touch panel is calculated. More specifically, the Y coordinates of one of the depression points is calculated as Y1=Ya+Ly/2 based on the distance Ly between the Y coordinates of 2 points obtained in Step S384.

In Step S410, the Y coordinates of the other one of the 2 depression points of the touch panel is calculated. More specifically, the Y coordinates of the other one of the depression points is calculated as Y2=Ya−Ly/2 based on the distance Ly between the Y coordinates of 2 points obtained in Step S384.

Then, this routine ends.

Figure 40:
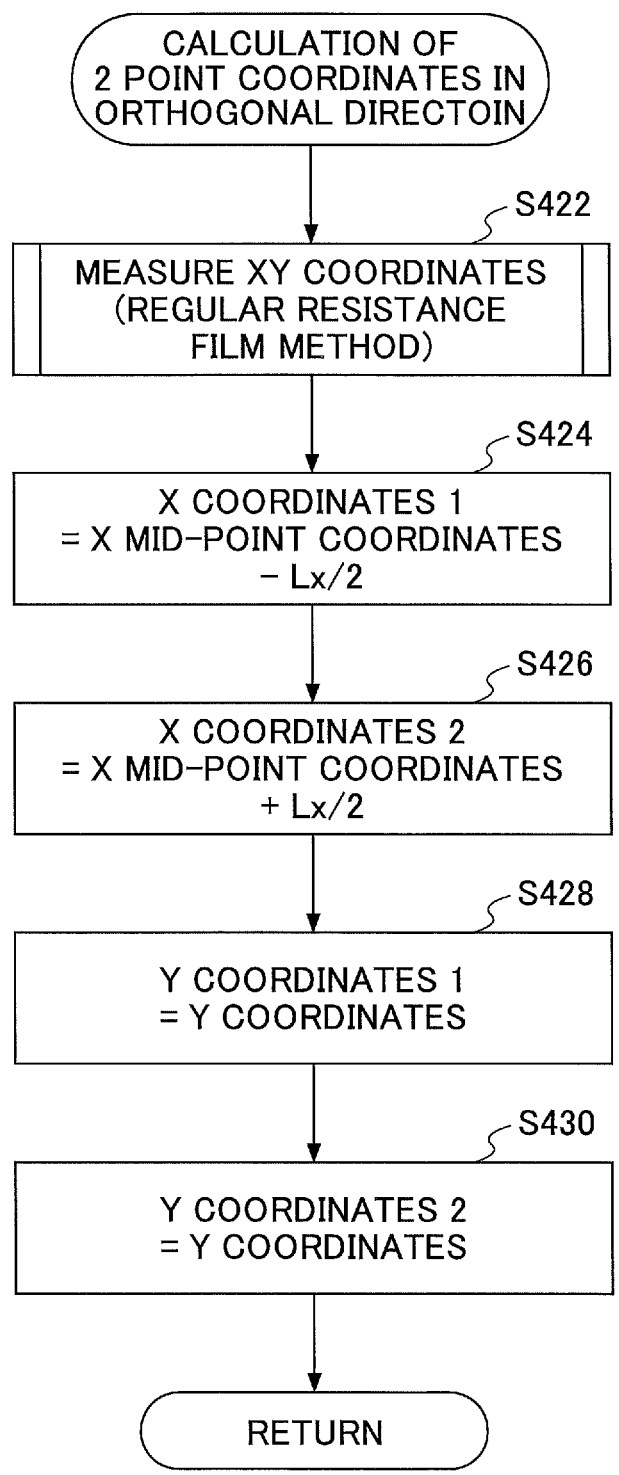
FIG. 40 illustrates a sub-routine (6) of the position detection method of the second embodiment.

Next, a sub-routine of Step S222 for calculating the position coordinates of 2 points oriented in the orthogonal direction is described based on FIG. 40.

First, in Step S422, coordinate detection is performed by using a regular four-line type position detection method. Thereby, X coordinates Xa and Y coordinates Ya are obtained. Because 2 depression points are oriented in the parallel direction, that is, a direction parallel to the X axis direction, the Y coordinates of both of the 2 depression points are the same. Therefore, the Y coordinates of the 2 depression points are Y1, Y2. Further, the X coordinates Xa is the mid-point of the 2 depression points.

In Step S424, the X coordinates of one of the 2 depression points of the touch panel is calculated. More specifically, the X coordinates of one of the depression points is calculated as X1=Xa+Lx/2 based on the distance Lx obtained in Step S382.

In Step S426, the X coordinates of the other one of the 2 depression points of the touch panel is calculated. More specifically, the X coordinates of the other one of the depression points is calculated as X2=Xa−Lx/2 based on the distance Lx between the X coordinates of 2 points obtained in Step S382.

In Step S428, the coordinates Ya detected in Step S422 is assumed to be the Y coordinates Y1 of one of the 2 depression points of the touch panel.

In Step S430, the coordinates Ya detected in Step S422 is assumed to be the Y coordinates Y2 of the other one of the 2 depression points of the touch panel.

Then, this routine ends.

Figure 41:
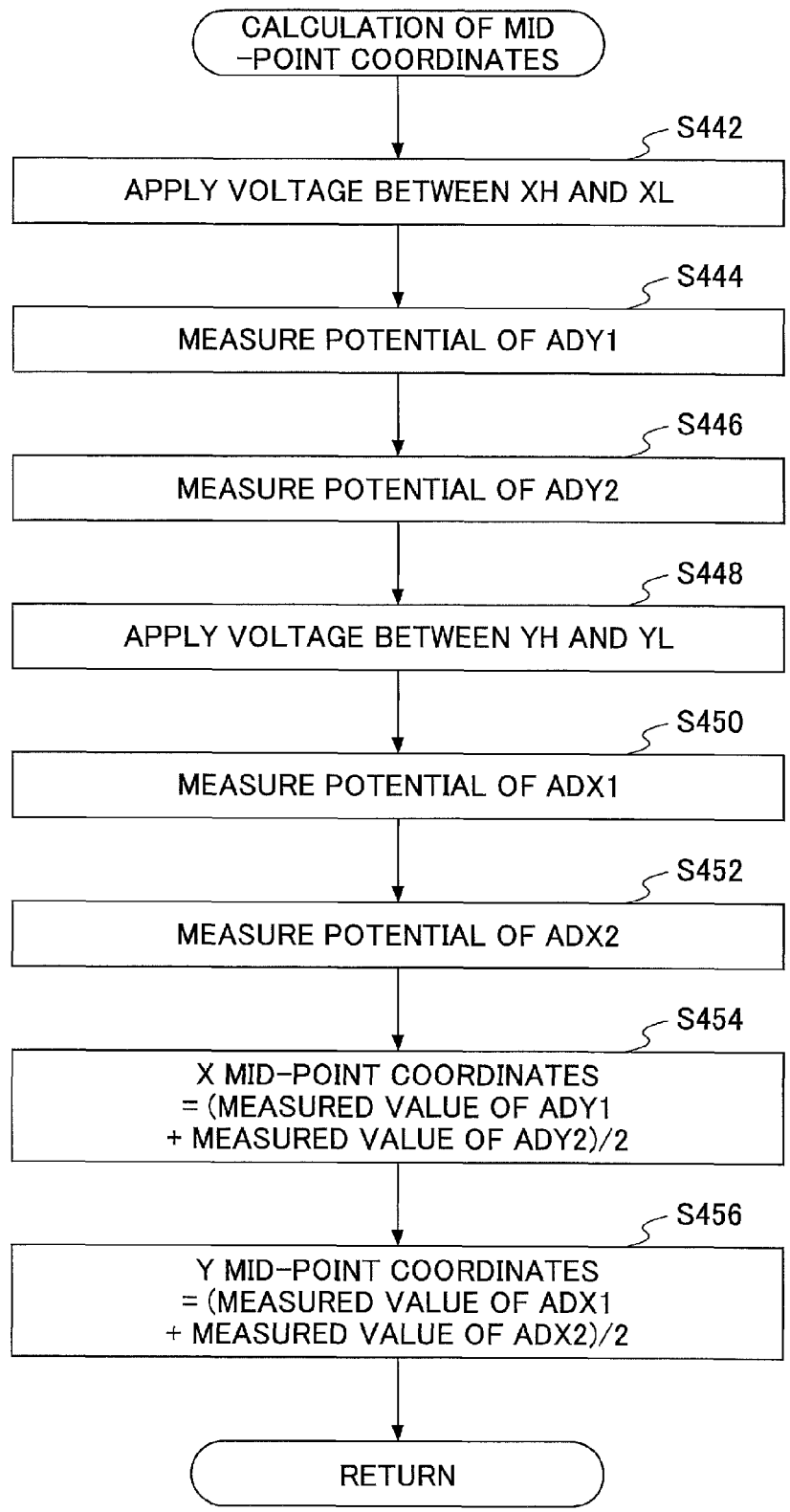
FIG. 41 illustrates a sub-routine (7) of the position detection method of the second embodiment.

Next, in a case where the contact points are 2 points, a sub-routine of Step S224 for calculating the mid-point of the 2 points is described based on FIG. 41.

Figure 18:
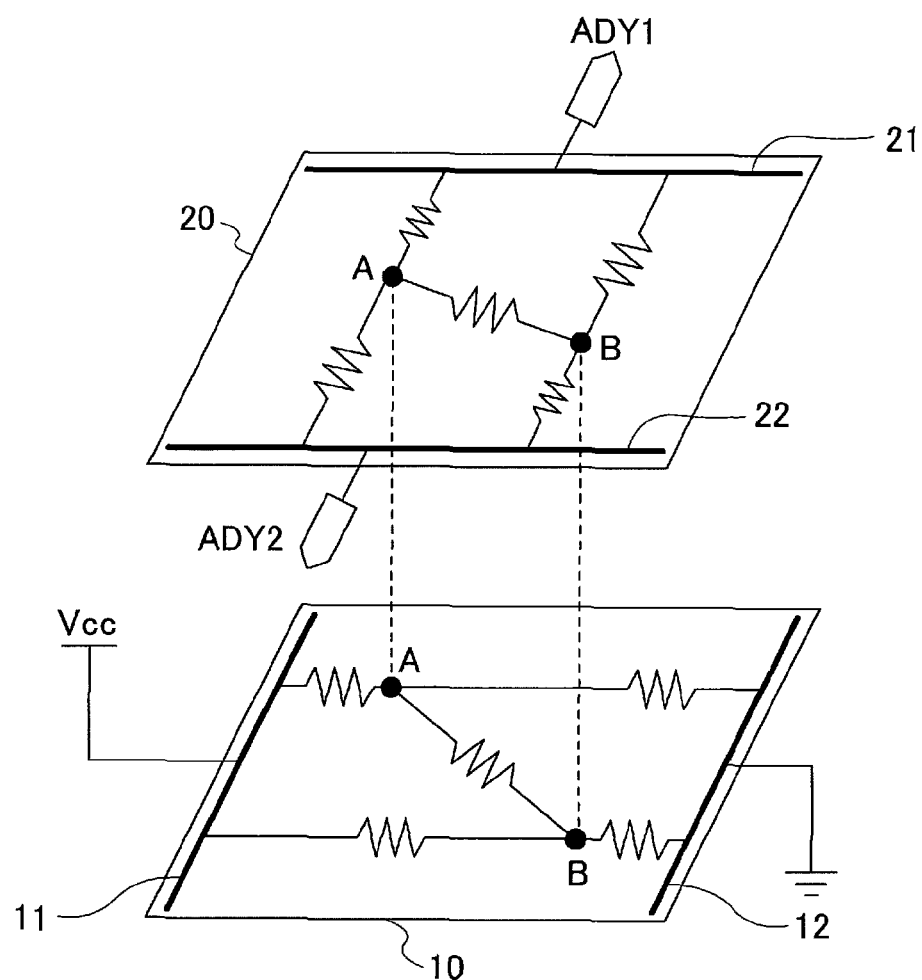
FIG. 18 is a diagram (2) for describing the position detection method in the touch panel of the first embodiment.

First, in Step S442, power supply voltage is applied to the first resistance film 10 between the XH electrode 11 and the XL electrode 12. That is, as illustrated in FIG. 16 or FIG. 18, a power supply voltage Vcc is applied to the XH electrode 11, and the XL electrode 12 is grounded.

In Step S444, the potential detection part ADY1 connected to the YH electrode 21 of the second resistance film 20 calculates potential.

In Step S446, the potential detection part ADY2 connected to the YL electrode 22 of the second resistance film 20 calculates potential.

In Step S448, a power supply voltage is applied to the second resistance film 20 between the YH electrode 21 and the YL electrode 22. That is, as illustrated in FIGS. 26-28, the power supply voltage Vcc is applied to the YH electrode 21, and the YL electrode 22 is grounded.

In Step S450, the potential detection part ADX1 connected to the XH electrode 11 of the first resistance film 10 detects potential.

In Step S452, the potential detection part ADX2 connected to the XL electrode 12 of the first resistance film 10 detects potential.

In Step S454, the average value of the potential detected by the potential detection part ADX1 in Step S450 and the potential detected by the potential detection part ADX2 in Step S452 is calculated. Based on the average value of the potentials, the X coordinates Xc of the mid-point is calculated.

In Step S456, the average value of the potential detected by the potential detection part ADY1 in Step S444 and the potential detected by the potential detection part ADY2 in Step S446 is calculated. Based on the average value of the potentials, the Y coordinates Yc of the mid-point is calculated.

Then, the sub-routine ends.

Figure 42:
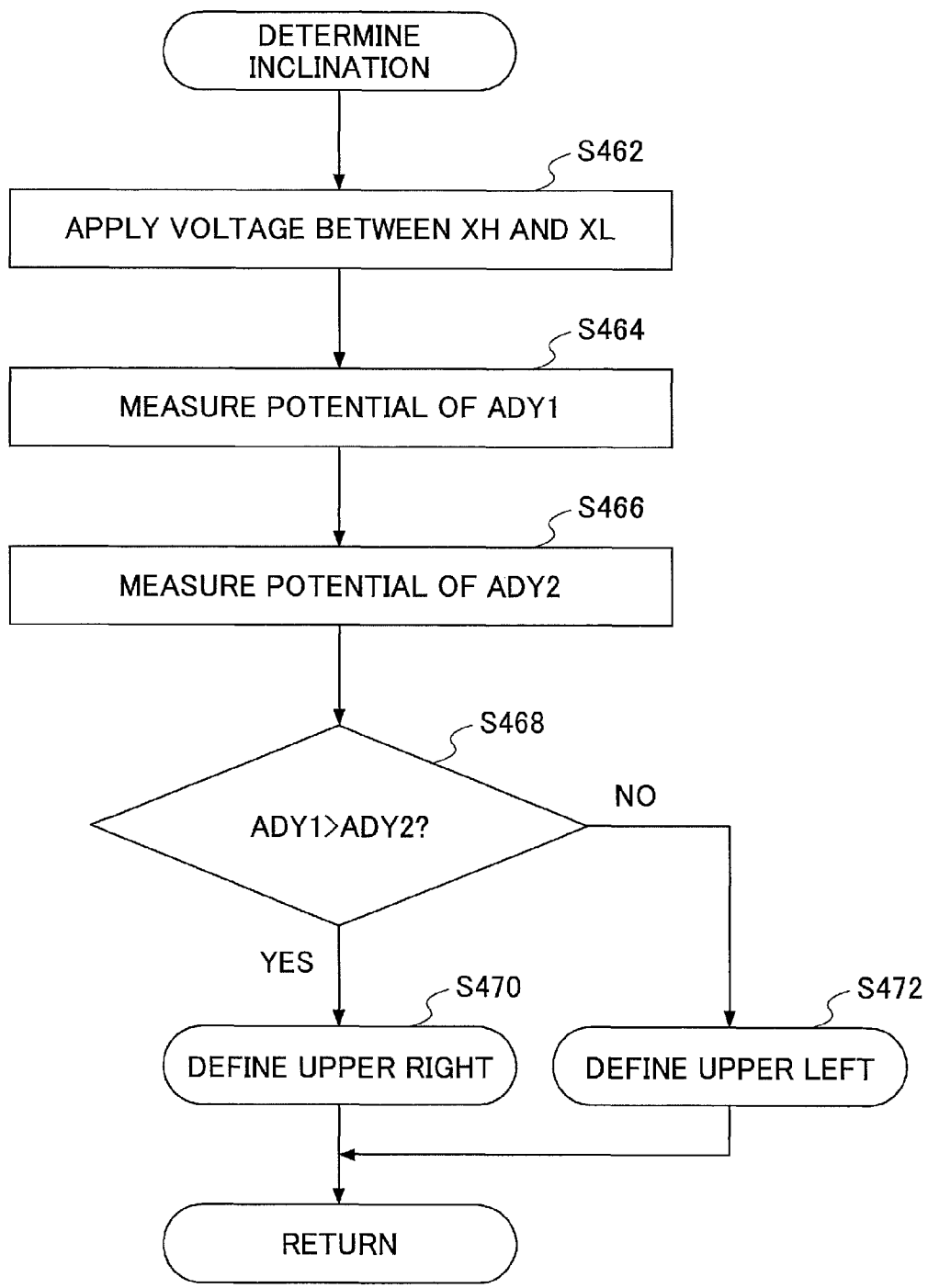
FIG. 42 illustrates a sub-routine (8) of the position detection method of the second embodiment.

Next, a sub-routine of Step S226 for inspecting the direction of the inclination of the line connecting 2 contact points is described based on FIG. 42.

First, in Step 462, a power supply voltage is applied to the first resistance film between the XH electrode 11 and the XL electrode 12. That is, as illustrated in FIGS. 16-18, the power supply voltage Vcc is applied to the XH electrode 11, and the XL electrode 12 is grounded.

In Step S464, the potential detection part ADY1 connected to the YH electrode 21 of the second resistance film 20 detects potential.

In Step S466, the potential detection part ADY2 connected to the YL electrode 22 of the second resistance film 20 detects potential.

In Step S468, the relationship of the amount of the potential detected by the potential detection part ADY1 and the amount of the potential detection part ADY2 is determined. More specifically, in a case where the potential detected by the potential detection part ADY1 is larger than the potential detected by the potential detection part ADY2, the process proceeds to Step S470. Further, in a case where the potential detected by the potential detection part ADY2 is less than the potential detected by the potential detection part ADY2, the process proceeds to Step S472.

In Step S470, because the line connecting the 2 contact points is determined to be oriented upward to the right, information indicating that the line connecting the 2 contact points is oriented upward to the right is stored in the memory 32 of the control part 30.

In Step S472, because the line connecting the 2 contact points is determined to be oriented upward to the right, information indicating that the line connecting the 2 contact points is oriented upward to the left is stored in the memory 32 of the control part 30.

Then, the sub-routine ends.

Steps S462-466 of the sub-routine overlap with those of the sub-routine illustrated in FIG. 41. Therefore, the potential detected by the potential detection part ADY1 and the potential detected by the ADY2 in the sub-routine of FIG. 41 may be stored in, for example, the memory 32, so that the information may be used in Step S468 or after.

Figure 43:
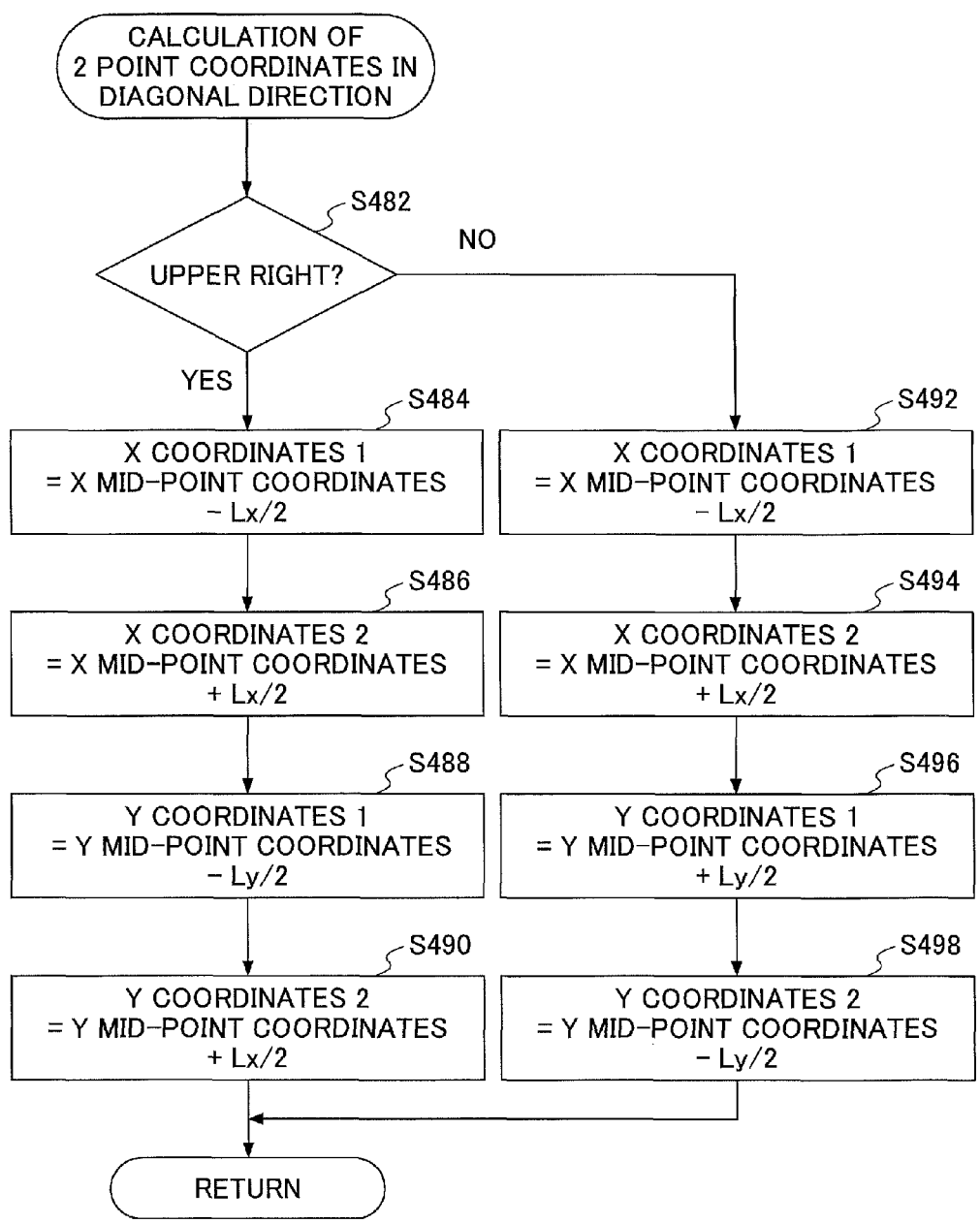
FIG. 43 illustrates a sub-routine (9) of the position detection method of the second embodiment.

Next, a sub-routine of Step S228 for calculating the position coordinates of 2 contact points is described based on FIG. 43.

In Step S482, it is determined whether the line connecting the 2 contact points is oriented upward to the right based on the information stored in the memory 32. In a case where the line is determined to have an inclination oriented upward to the right, the process proceeds to Step S484. In a case where the line is not determined to have an inclination oriented upward to the right, the process proceeds to Step S492.

In Step S484, the X coordinates of one of the 2 depression points of the touch panel is calculated. More specifically, the X coordinates of one of the depression points is calculated as $X1=Xc-Lx/2$ based on the X coordinates Xc of the 2 contact points obtained in Step S454 and the distance Lx between the X coordinates of 2 points obtained in Step S382.

In Step S486, the X coordinates of the other one of the 2 depression points of the touch panel is calculated. More specifically, the X coordinates of the other one of the depression points is calculated as $X2=Xc+Lx/2$ based on the X coordinates Xc of the 2 contact points obtained in Step S454 and the distance Lx between the X coordinates of 2 points obtained in Step S382 (i.e., distance Lx of X coordinates corresponding to the X potential difference calculated in Step S330).

In Step S488, the Y coordinates of one of the 2 depression points of the touch panel is calculated. More specifically, the Y coordinates of one of the depression points is calculated as $Y1=Yc-Ly/2$ based on the Y coordinates Yc of the mid-point between the 2 contact points obtained in Step S456 and the distance Ly of the Y coordinates obtained in Step S384.

In Step S490, the Y coordinates of the other one of the 2 depression points of the touch panel is calculated. More specifically, the Y coordinates of the other one of the depression points is calculated as $Y2=Yc+Ly/2$ based on the Y coordinates Yc of the mid-point between the 2 contact points obtained in Step S456 and the distance Ly of the Y coordinates obtained in Step S384.

In Step S492, the X coordinates of one of the 2 depression points of the touch panel is calculated. More specifically, the X coordinates of one of the depression points is calculated as $X1=Xc-Lx/2$ based on the X coordinates Xc of the 2 contact points obtained in Step S454 and the distance Lx between the X coordinates of 2 points obtained in Step S382.

In Step S494, the X coordinates of the other one of the 2 depression points of the touch panel is calculated. More specifically, the X coordinates of the other one of the depression points is calculated as $X2=Xc+Lx/2$ based on the X coordinates Xc of the 2 contact points obtained in Step S454 and the distance Lx between the X coordinates of 2 points obtained in Step S382.

In Step S496, the Y coordinates of one of the 2 depression points of the touch panel is calculated. More specifically, the Y coordinates of one of the depression points is calculated as $Y1=Yc-Ly/2$ based on the Y coordinates Yc of the mid-point between the 2 contact points obtained in Step S456 and the distance Ly of the Y coordinates obtained in Step S384.

In Step S498, the Y coordinates of the other one of the 2 depression points of the touch panel is calculated. More specifically, the Y coordinates of the other one of the depression points is calculated as $Y2=Yc+Ly/2$ based on the Y coordinates Yc of the mid-point between the 2 contact points obtained in Step S456 and the distance Ly of the Y coordinates obtained in Step S384.

Then, the sub-routine ends.

Figure 44:
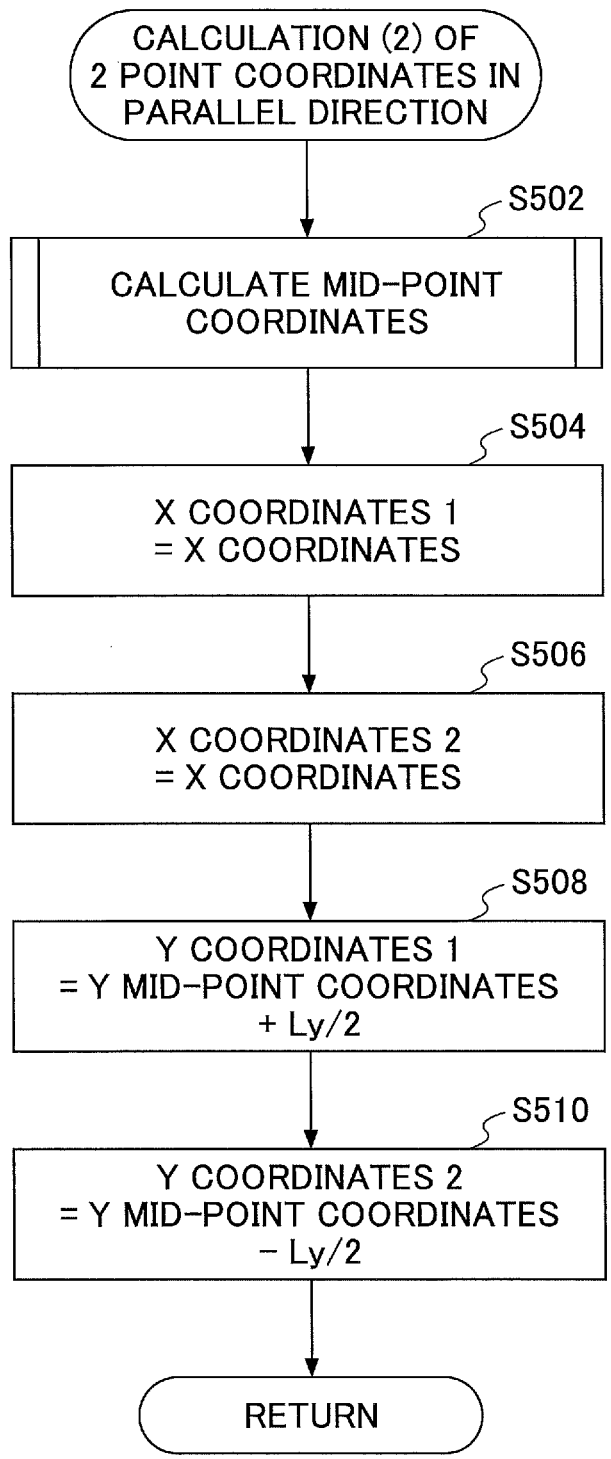
FIG. 44 illustrates a sub-routine (10) of the position detection method of the second embodiment.
Figure 45:
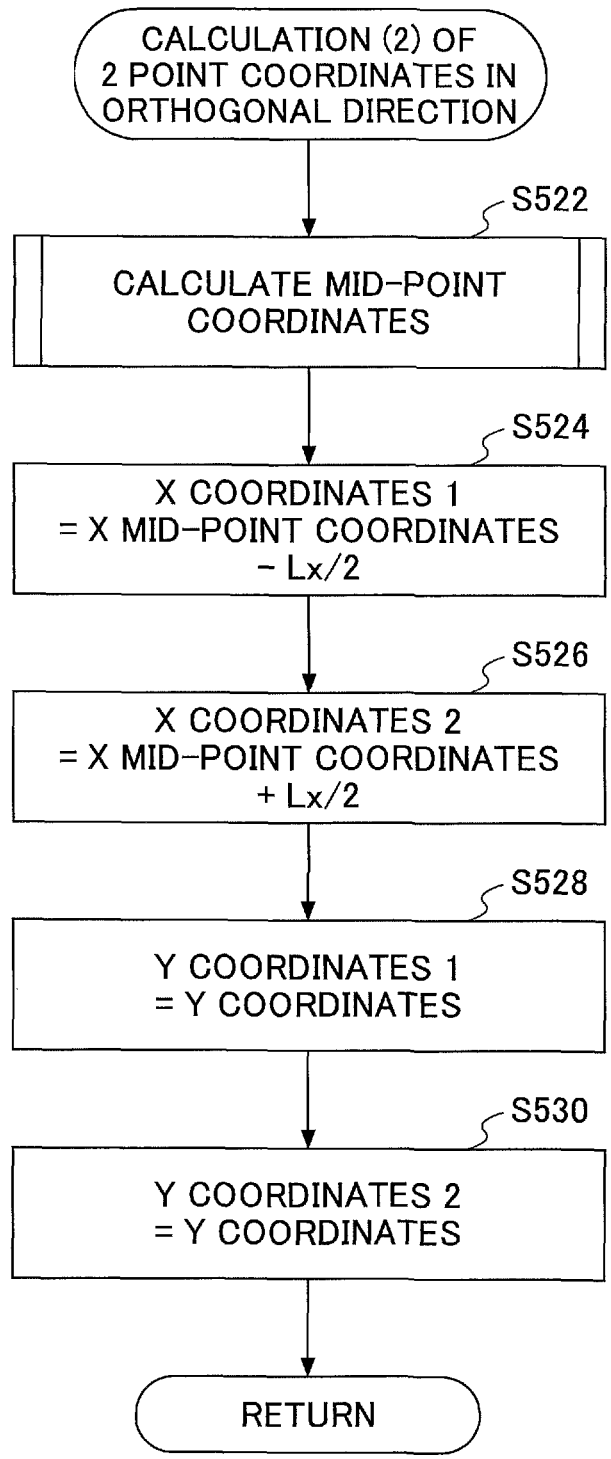
FIG. 45 illustrates a sub-routine (11) of the position detection method of the second embodiment.

The sub-routines illustrated in FIGS. 44 and 45 may be performed instead of performing the sub-routines of Steps S218 and S222 illustrated in FIGS. 39 and 40.

Next, a sub-routine of Step S218 for calculating the position coordinates of 2 contact points oriented in the parallel direction is described based on FIG. 44.

In Step S502, a sub-routine of detecting the mid-point between the 2 contact points in the touch panel illustrated in FIG. 41 is performed, and X coordinates Xc and Y coordinates Yc are obtained. Because 2 depression points are oriented in the orthogonal direction, that is, a direction orthogonal to the X axis direction, the X coordinates of both of the 2 depression points are the same. Therefore, the X coordinates Xc of the 2 depression points are X1, X2. Further, the Y coordinates Yc is the mid-point of the 2 depression points.

In Step S504, the coordinates Xc detected in Step S502 is assumed to be the X coordinates X1 of one of the 2 depression points of the touch panel.

In Step S506, the coordinates Xc detected in Step S502 is assumed to be the X coordinates X2 of the other one of the 2 depression points of the touch panel.

In Step S508, the Y coordinates of one of the 2 depression points of the touch panel is calculated. More specifically, the Y coordinates of one of the depression points is calculated as Y1=Yc+Ly/2 based on the distance Ly of the Y coordinates obtained in Step S384.

In Step S510, the Y coordinates of the other one of the 2 depression points of the touch panel is calculated. More specifically, the Y coordinates of the other one of the depression points is calculated as Y2=Yc−Ly/2 based on the distance Ly of the Y coordinates obtained in Step S384.

Then, the routine ends.

Next, a sub-routine of Step S222 for calculating the position coordinates of 2 contact points oriented in the orthogonal direction is described based on FIG. 45.

First, in Step S522, a sub-routine of detecting the mid-point between the 2 contact points in the touch panel illustrated in FIG. 41 is performed, and X coordinates Xc and Y coordinates Yc are obtained. Because 2 depression points are oriented in the parallel direction, that is, a direction parallel to the X axis direction, the Y coordinates of both of the 2 depression points are the same. Therefore, the Y coordinates Yc of the 2 depression points are Y1, Y2. Further, the Y coordinates Xc is the mid-point of the 2 depression points.

In Step S524, the X coordinates of one of the 2 depression points of the touch panel is calculated. More specifically, the X coordinates of one of the depression points is calculated as X1=Xc−Lx/2 based on the distance Lx of the X coordinates obtained in Step S382.

In Step S526, the X coordinates of the other one of the 2 depression points of the touch panel is calculated. More specifically, the X coordinates of the other one of the depression points is calculated as X2=Xc+Ly/2 based on the distance Lx of the X coordinates obtained in Step S382.

In Step S528, the coordinates Yc detected in Step S422 is assumed to be the Y coordinates Y1 of one of the 2 depression points of the touch panel.

In Step S530, the coordinates Yc detected in Step S422 is assumed to be the Y coordinates Y2 of the other one of the 2 depression points of the touch panel.

Then, the sub-routine ends.

Similar to the first embodiment, the method for detecting a position in the touch panel of this embodiment allows a position to be easily and accurately detected even in a case where there are 2 contacts points in the touch panel.

Details other than those described above are the same as the first embodiment.

<Third Embodiment>

Next, a third embodiment is described. This embodiment is an example of a touch panel that can be used for the position detection methods of the first and second embodiments.

First, a relationship of the first/second resistance films 10, 20 and the resistors Rx1, Ry1 of the touch panel illustrated in FIG. 1 is described. With the touch panel, it becomes easier to determine whether the contact of the touch panel is 1 point depression or 2 point depression as the difference between the potential detected in a case of 1 point depression and the potential detected in a case of 2 point depression becomes larger.

<First Touch Panel>

As the touch panel illustrated in FIG. 1, a first touch panel includes first and second resistance films 10, 20 having a length of 91.0 mm in the X axis direction and a length of 75.0 mm in the Y axis direction. The resistance value between the XH electrode 11 and the XL electrode 12 of the first resistance film 10 is 351.4Ω, and the resistance value between the YH electrode 21 and the YL electrode 22 of the second resistance film 20 is 210.0Ω. Results of inspecting the values of the resistors Rx1, Ry1 of the first touch panel and the potentials detected in the cases of 1 point depression and 2 point depression are described.

Table 1 illustrates: the values of the resistors Rx1, Ry1 of the first touch panel; the proportion of the values of the resistors Rx1, Ry1 on the basis of the resistance values between the electrodes of each of the resistance films; and the detected potentials and potential differences in the cases of 1 point depression and 2 point depression. Vcc is 5 V.

TABLE 1

RESISTANCE UNIT(Ω) VOLTAGE UNIT(V)

| PROPORTION TO RESISTANCE OF RESISTANCE FILM | Rx1 | Ry1 | X AXIS DIRECTION | | | Y AXIS DIRECTION | | |
|---|---|---|---|---|---|---|---|---|
| | | | 1 POINT DEPRESSION POTENTIAL | 2 POINT DEPRESSION POTENTIAL | POTENTIAL DIFFERENCE | 1 POINT DEPRESSION POTENTIAL | 2 POINT DEPRESSION POTENTIAL | POTENTIAL DIFFERENCE |
| APPROX. 1/8 | 43 | 27 | 4.49 | 4.2 | 0.29 | 4.44 | 4.27 | 0.17 |
| APPROX. 1/4 | 91 | 51 | 4.04 | 3.60 | 0.44 | 4.08 | 3.84 | 0.24 |
| APPROX. 1/2 | 180 | 100 | 3.36 | 2.80 | 0.56 | 3.44 | 3.12 | 0.32 |
| APPROX. 3/4 | 270 | 160 | 2.88 | 2.28 | 0.60 | 2.92 | 2.52 | 0.40 |
| APPROX. 1 TIMES | 360 | 220 | 2.50 | 1.90 | 0.60 | 2.48 | 2.12 | 0.36 |
| APPROX. 1.5 TIMES | 510 | 330 | 2.08 | 1.51 | 0.57 | 1.92 | 1.60 | 0.32 |
| APPROX. 2 TIMES | 680 | 430 | 1.72 | 1.22 | 0.50 | 1.68 | 1.38 | 0.30 |
| APPROX. 3 TIMES | 1K | 620 | 1.32 | 0.96 | 0.36 | 1.25 | 1.03 | 0.22 |
| APPROX. 4 TIMES | 1.5K | 820 | 0.96 | 0.65 | 0.31 | 0.63 | 0.42 | 0.21 |

Figure 46:
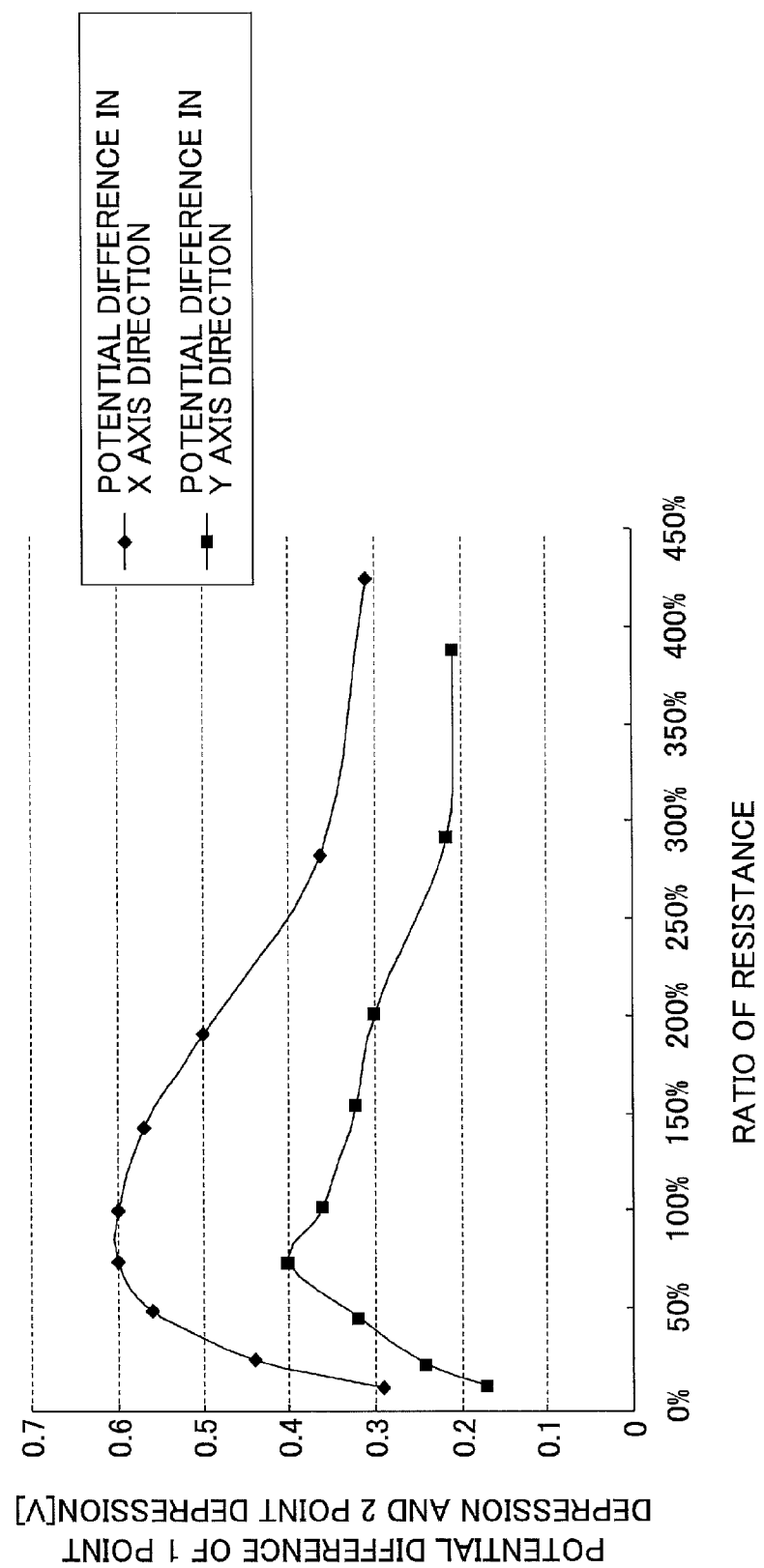
FIG. 46 illustrates a proportion of resistance values and a difference of potentials according to a first touch panel.

FIG. 46 illustrates a relationship of the proportion of the values of the resistors Rx1 and Ry1 on the basis of the resistance values between the electrodes of each of the resistance films, and the difference of detected potentials in the cases of 1 point depression and 2 point depression according to the results of Table 1.

In the X axis direction, the difference of the potential detected in 1 point depression and the potential detected in 2 point depression becomes largest when the resistance value of the resistor Rx1 is 75%-100% with respect to the resistance value of the first resistance film 10, in which the difference is approximately 0.6 V. In the Y axis direction, the difference of the potential detected in a case of 1 point depression and the potential detected in a case of 2 point depression becomes largest in a case where the resistance value of the resistor Ry1 is approximately 75% with respect to the resistance value of the second resistance film 20, in which the difference is approximately 0.4 V.

When the difference of the potential detected in a case of 1 point depression and the potential detected in 2 point depression is greater than or equal to 0.2 V, it is easy to determine whether the touch panel is depressed at 1 point or 2 points. Therefore, the values of the resistances Rx1, Ry1 are preferred to be greater than or equal to 25% but less than or equal to 400% with respect to the resistance value of the resistance film of the touch panel. Further, in order to determine 1 point and 2 point depression more consistently, the potential difference is preferably greater than or equal to 0.3 V. In this case, the values of the resistances Rx1, Ry1 are preferred to be greater than or equal to 50% but less than or equal to 200% with respect to the resistance values of the resistance films of the touch panel.

<Second Touch Panel>

Next, as the touch panel illustrated in FIG. 1, a second touch panel includes first and second resistance films 10, 20 having a length of 164.0 mm in the X axis direction and a length of 101.0 mm in the Y axis direction. The resistance value between the XH electrode 11 and the XL electrode 12 of the first resistance film 10 is 866.0Ω, and the resistance value between the YH electrode 21 and the YL electrode 22 of the second resistance film 20 is 47.5Ω. Results of inspecting the values of the resistors Rx1, Ry1 of the second touch panel and the potentials detected in the cases of 1 point depression and 2 point depression are described.

Table 2 illustrates: the values of the resistors Rx1, Ry1 of the second touch panel; the proportion of the values of the resistors Rx1, Ry1 on the basis of the resistance values between the electrodes of each of the resistance films; and the detected potentials and potential differences in the cases of 1 point depression and 2 point depression. Vcc is 5 V.

TABLE 2

| | | | RESISTANCE UNIT(Ω) VOLTAGE UNIT(V) | | | | | |
|---|---|---|---|---|---|---|---|---|
| PROPORTION TO | | | X AXIS DIRECTION | | | Y AXIS DIRECTION | | |
| RESISTANCE OF RESISTANCE FILM | Rx1 | Ry1 | 1 POINT DEPRESSION POTENTIAL | 2 POINT DEPRESSION POTENTIAL | POTENTIAL DIFFERENCE | 1 POINT DEPRESSION POTENTIAL | 2 POINT DEPRESSION POTENTIAL | POTENTIAL DIFFERENCE |
| APPROX. ¼ | 220 | 62 | 4.08 | 3.56 | 0.52 | 4.02 | 3.78 | 0.24 |
| APPROX. ½ | 430 | 120 | 3.44 | 2.80 | 0.64 | 3.40 | 3.10 | 0.30 |
| APPROX. ¾ | 680 | 180 | 2.88 | 2.18 | 0.70 | 2.92 | 2.58 | 0.34 |
| APPROX. 1 TIMES | 910 | 240 | 2.52 | 1.86 | 0.66 | 2.56 | 2.26 | 0.30 |
| APPROX. 2 TIMES | 1.8K | 510 | 1.68 | 1.18 | 0.50 | 1.60 | 1.34 | 0.26 |
| APPROX. 4 TIMES | 3.3K | 1.0K | 1.08 | 0.68 | 0.40 | 0.96 | 0.74 | 0.22 |

Figure 47:
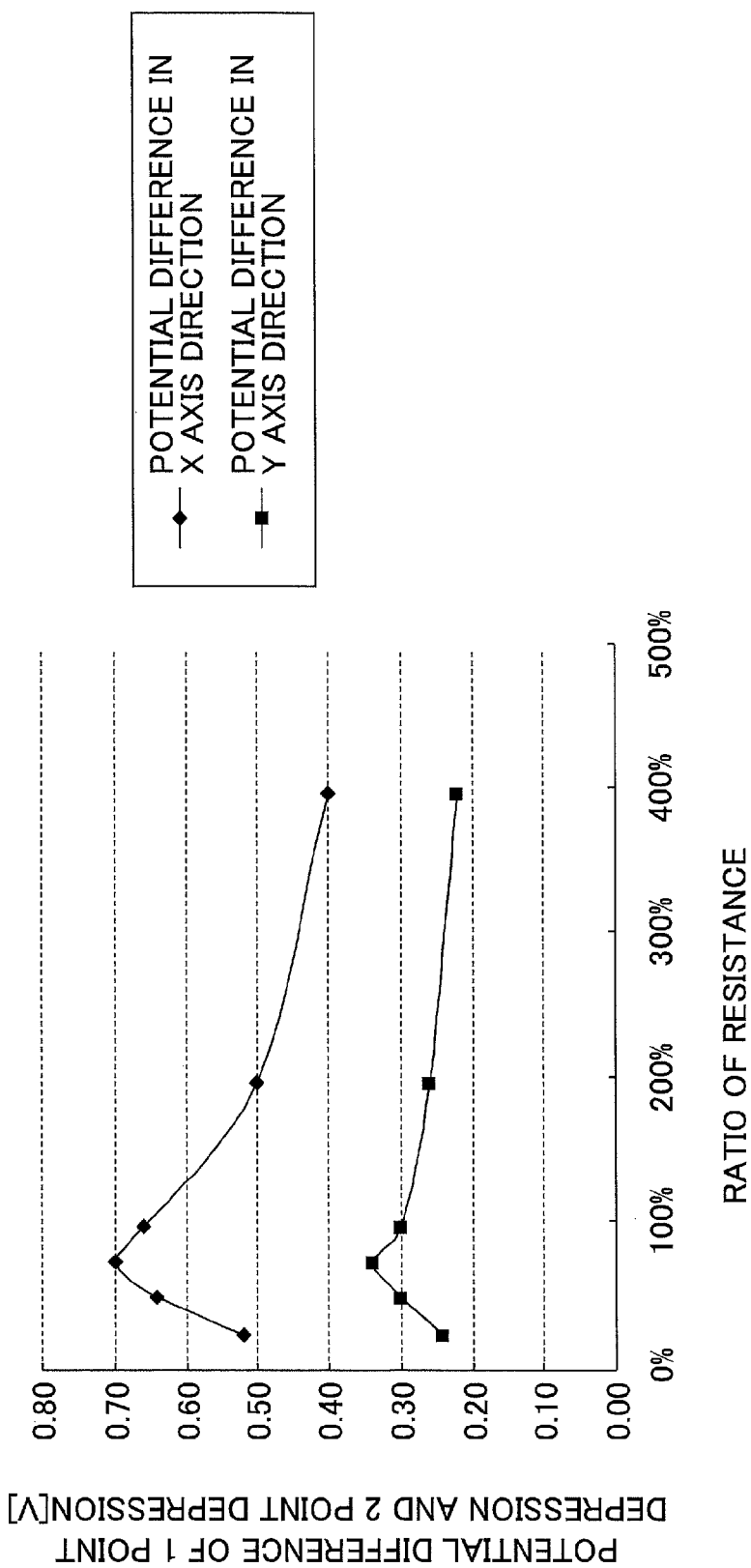
FIG. 47 illustrates a proportion of resistance values and a difference of potentials according to a second touch panel.

FIG. 47 illustrates a relationship of the values of the resistors Rx1, Ry1 of the second touch panel, the proportion of the values of the resistors Rx1, Ry1 on the basis of the resistance values between the electrodes of each of the resistance films, and the detected potentials and potential differences in the cases of 1 point depression and 2 point depression according to the results of Table 2.

In the X axis direction, the difference of the potential detected in a case of 1 point depression and the potential detected in a case of 2 point depression becomes largest in a case where the resistance value of the resistor Rx1 is approximately 75% with respect to the resistance value of the first resistance film 10, in which the difference is approximately 0.7 V. In the Y axis direction, the difference of the potential detected in a case of 1 point depression and the potential detected in a case of 2 point depression becomes largest in a case where the resistance value of the resistor Ry1 is approximately 75% with respect to the resistance value of the second resistance film 10, in which the difference is approximately 0.34 V.

In a case where the difference of the potential detected in a case of 1 point depression and the potential detected in a case of 2 point depression is greater than or equal to 0.2 V, it is easy to determine whether a contact point(s) in the touch panel is depressed at 1 point or 2 points. Therefore, the values of the resistances Rx1, Ry1 are preferred to be greater than or equal to 25% but less than or equal to 400% with respect to the resistance value of the resistance film of the touch panel. Further, in order to determine 1 point and 2 point depression more consistently, the potential difference is preferably greater than or equal to 0.3 V. In this case, the values of the resistances Rx1, Ry1 are preferred to be greater than or equal to 50% but less than or equal to 200% with respect to the resistance values of the resistance films of the touch panel.

<Third Touch Panel>

Next, as the touch panel illustrated in FIG. 1, a third touch panel includes first and second resistance films 10, 20 having a length of 183.0 mm in the X axis direction and a length of 143.0 mm in the Y axis direction. The resistance value between the XH electrode 11 and the XL electrode 12 of the first resistance film 10 is 580.0Ω, and the resistance value between the YH electrode 21 and the YL electrode 22 of the second resistance film 20 is 360.0Ω. Results of inspecting the values of the resistors Rx1, Ry1 of the third touch panel and the potentials detected in the cases of 1 point depression and 2 point depression are described.

Tables 3 and 4 illustrate: the values of the resistors Rx1, Ry1 of the third touch panel; the proportion of the values of the resistors Rx1, Ry1 on the basis of the resistance values between the electrodes of each of the resistance films; and the detected potentials and potential differences in the cases of 1 point depression and 2 point depression. Vcc is 5 V.

TABLE 3

RESISTANCE UNIT (Ω) VOLTAGE UNIT (V)

| PROPORTION TO RESISTANCE OF RESISTANCE FILM | Rx1 | X AXIS DIRECTION | | |
|---|---|---|---|---|
| | | 1 POINT DEPRESSION POTENTIAL | 2 POINT DEPRESSION POTENTIAL | POTENTIAL DIFFERENCE |
| APPROX. 0.17 | 100 | 4.39 | 4.28 | 0.11 |
| APPROX. 0.41 | 240 | 3.64 | 3.39 | 0.25 |
| APPROX. 0.47 | 270 | 3.50 | 3.23 | 0.27 |
| APPROX. 0.57 | 330 | 3.28 | 3.00 | 0.28 |
| APPROX. 0.74 | 430 | 2.96 | 2.64 | 0.32 |
| APPROX. 0.97 | 560 | 2.60 | 2.31 | 0.29 |
| APPROX. 1.31 | 760 | 2.23 | 1.97 | 0.26 |
| APPROX. 1.71 | 990 | 1.91 | 1.67 | 0.24 |

TABLE 4

RESISTANCE UNIT (Ω) VOLTAGE UNIT (V)

| PROPORTION TO RESISTANCE OF RESISTANCE FILM | Ry1 | Y AXIS DIRECTION | | |
|---|---|---|---|---|
| | | 1 POINT DEPRESSION POTENTIAL | 2 POINT DEPRESSION POTENTIAL | POTENTIAL DIFFERENCE |
| APPROX. 0.28 | 100 | 4.03 | 3.84 | 0.19 |
| APPROX. 0.67 | 240 | 3.09 | 2.87 | 0.22 |
| APPROX. 0.75 | 270 | 2.93 | 2.69 | 0.24 |
| APPROX. 0.92 | 330 | 2.66 | 2.43 | 0.23 |
| APPROX. 1.19 | 430 | 2.33 | 2.11 | 0.22 |
| APPROX. 1.56 | 560 | 2.00 | 1.79 | 0.21 |
| APPROX. 2.11 | 760 | 1.65 | 1.45 | 0.20 |
| APPROX. 2.75 | 990 | 1.36 | 1.19 | 0.17 |

Figure 48:
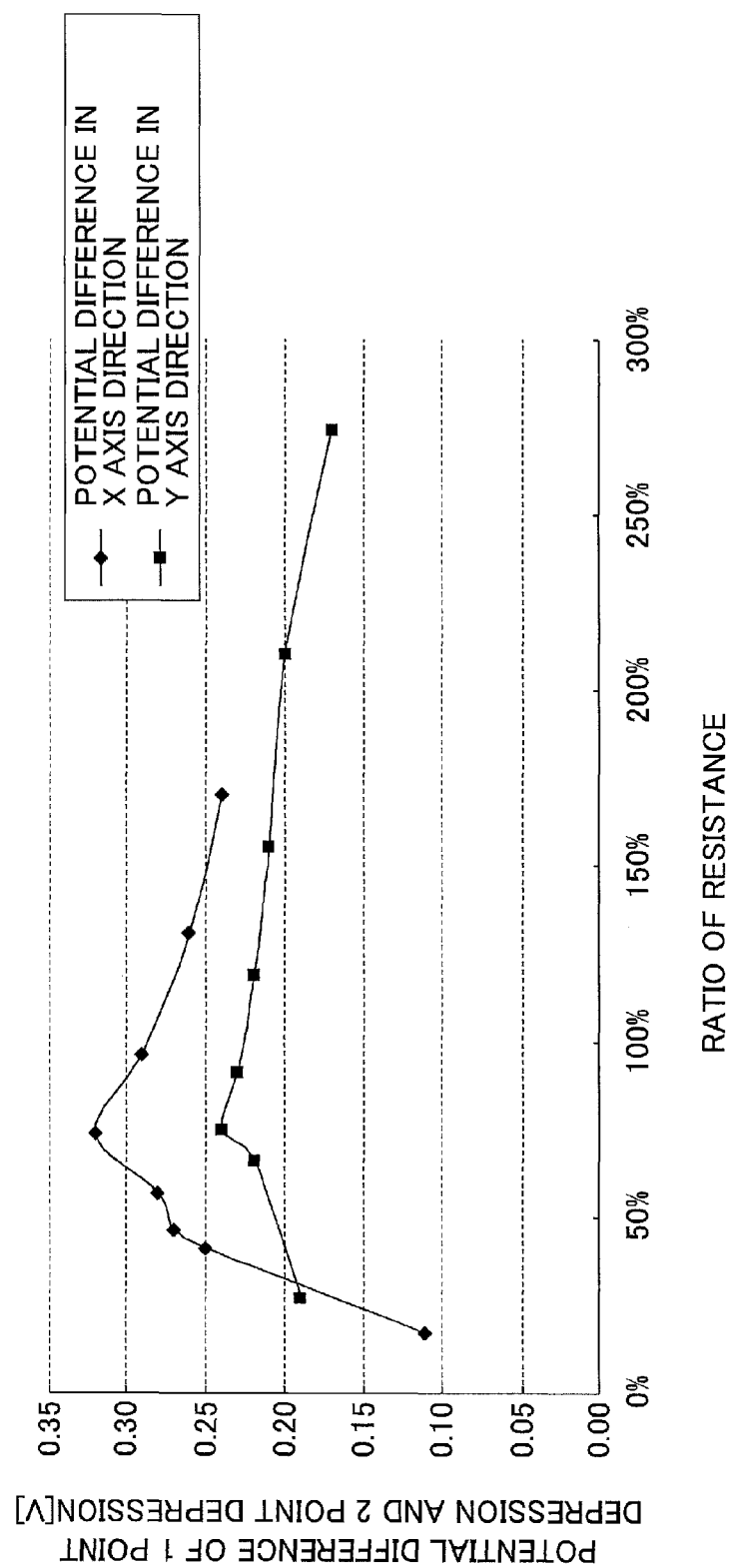
FIG. 48 illustrates a proportion of resistance values and a difference of potentials according to a third touch panel.

FIG. 48 illustrates a relationship of the values of the resistors Rx1, Ry1 of the third touch panel, the proportion of the values of the resistors Rx1, Ry1 on the basis of the resistance values between the electrodes of each of the resistance films, and the detected potentials and potential differences in the cases of 1 point depression and 2 point depression according to the results of Tables 3 and 4. In the X axis direction, the difference of the potential detected in a case of 1 point depression and the potential detected in a case of 2 point depression becomes largest in a case where the resistance value of the resistor Rx1 is approximately 75% with respect to the resistance value of the first resistance film 10, in which the difference is approximately 0.32 V. In the Y axis direction, the difference of the potential detected in a case of 1 point depression and the potential detected in a case of 2 point depression becomes largest in a case where the resistance value of the resistor Ry1 is approximately 75% with respect to the resistance value of the second resistance film 10, in which the difference is approximately 0.24 V.

In a case where the difference of the potential detected in a case of 1 point depression and the potential detected in a case of 2 point depression is greater than or equal to 0.2 V, it is easy to determine whether a contact point(s) in the touch panel is depressed at 1 point or 2 points. Therefore, the values of the resistances Rx1, Ry1 are preferred to be greater than or equal to 50% but less than or equal to 200% with respect to the resistance values of the resistance films of the touch panel.

Accordingly, with the touch panel of the above-described embodiment, the resistance values of the resistors Rx1, Ry1 are set to be greater than or equal to 25% but less than or equal to 400%, and more preferably, greater than or equal to 50% but less than or equal to 200% with respect to the resistance values of the first and second resistance films 10, 20. Further, it is preferable for the values of the resistances Rx1, Ry1 to be greater than or equal to 50% but less than or equal to 100%, and more preferably, approximately 75% with respect to the resistance values of the resistance films of the touch panel.

<Fourth Embodiment>

Next, a fourth embodiment is described. A touch panel according to this embodiment is described based on FIG. 49.

The touch panel of this embodiment includes multiple resistors Rx1, Rx2, and Rx3 that are connected in series with the first resistance film 10. By switching a first switch 110, one of the resistors Rx1, Rx2, Rx3 can be selected and connected in series with the first resistance film 10. Further, the touch panel also includes multiple resistors Ry1, Ry2, and Ry3 that are connected in series with the second resistance film 20. Similarly, by switching a second switch 120, one of the resistors Ry1, Ry2, and Ry3 can be selected and connected in series with the second resistance film 20. In this embodiment, the resistors Rx1, Rx2, and Rx3 are referred to as "first resistor group 130", and the resistors Ry1, Ry2, and Ry3 are referred to as "second resistor group 140". Further, the number of resistors included in each of the first and second resistor groups 130, 140 is not limited in particular as long as multiple resistors are included. The first switch 110 is connected to a first switch control terminal of the control part 30, and the second switch 120 is connected to a second switch control terminal of the control part 30.

In the touch panel of this embodiment, a resistor that is optimum for the first resistance film 10 can be selected from the resistors Rx1, Rx2, and Rx3 by switching the first switch 110. More specifically, a resistor having a resistance value that is closest to approximately 75% of the resistance value between the XH electrode 11 and the XL electrode 12 of the first resistance film 10 is selected from the resistors Rx1, Rx2, and Rx3.

Figure 50:
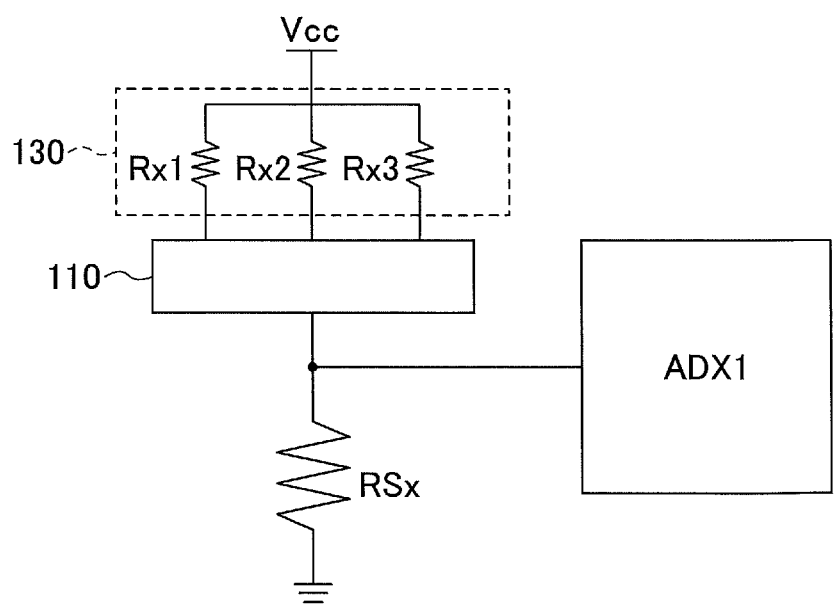
FIG. 50 is a diagram illustrating a configuration of the touch panel according to the fourth embodiment.

FIG. 50 illustrates the resistors Rx1, Rx2, and Rx3, the first switch 110, the first resistance film 10, and the potential detection part ADX1. As illustrated in FIG. 50, in a case of assuming that the resistance value between the XH electrode 11 and the XL electrode 12 of the first resistance film 10 is RSx, one of the resistors Rx1, Rx2, and Rx3 is connected to the first resistance film 10 by switching the first switch 110. In a case where the value of the potential detected by the potential detection part ADX1 is approximately 0.57 Vcc according to (RSx/(RSx+0.75 RSx))×Vcc, a resistor having a resistance value closest to 0.57 Vcc is selected and connected to the first resistance film 10 by switching the first switch 110.

Similarly, a resistor that is optimum for the second resistance film 20 is selected from the resistors Ry1, Ry2, and Ry3 by switching the second switch 120. More specifically, a resistor having a resistance value closest to approximately 75% of the resistance value between the YH electrode 21 and the YL electrode 22 of the second resistance film 20 is selected from the resistors Ry1, Ry2, and Ry3 by switching the second switch 120.

With this embodiment, a resistor having an optimum resistance value can be selected from the resistors Rx1, Rx2, and the Rx3 by the first switch 110, and a resistor having an optimum resistance value can be selected from the resistors Ry1, Ry2, and the Ry3 by the second switch 120. Therefore, even in a case where the first and second resistance films of the touch panel are inconsistent due to, for example, manufacturing error, an optimum resistor can be selected. Further, an optimum resistor can be selected for various touch panels having different shapes.

<Method for Selecting Resistor>

Figure 51:
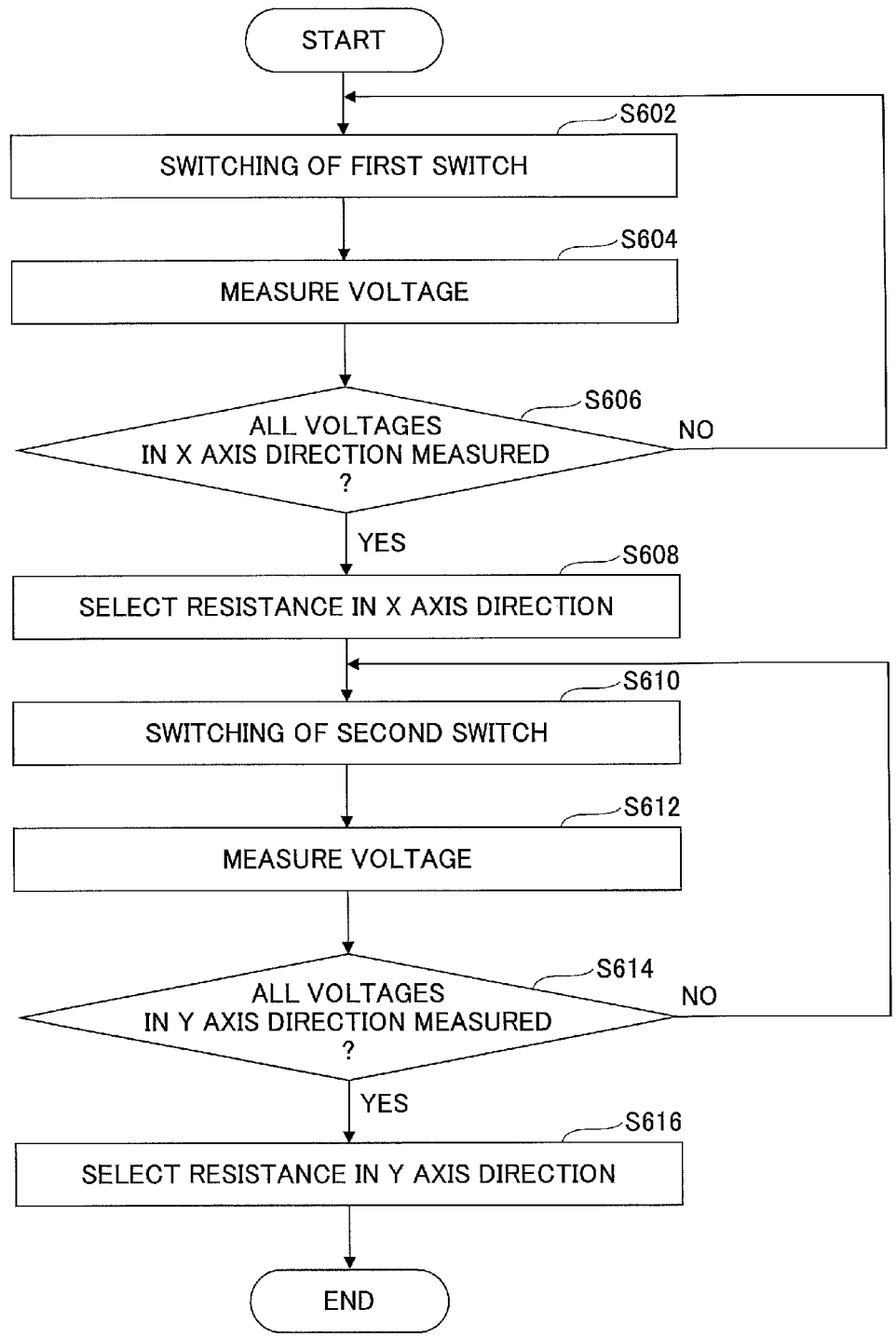
FIG. 51 is a flowchart of a method for setting resistance values of the touch panel of the fourth embodiment.

Next, a method for selecting a resistor to be connected to the first and second resistance films 10, 20 of the touch panel of this embodiment is described based on FIG. 51. The below-described controls may be partly or entirely performed according to the controls of the control part 30.

First, in Step S602, the first resistance film 10 is connected in series with, for example, the resistor Rx1 by switching the first switch 110.

In Step S604, the potential detection part ADX1 measures a potential in a state where the power supply potential Vcc is applied.

In Step S606, it is determined whether the potential detection part ADX1 has measured the potentials with respect to all of the resistors Rx1, Rx2, and Rx3 of the X axis direction that are to be connected to the first resistance film 10 by switching the first switch 110. In a case where the potentials of all of the resistors are measured by the potential detection part ADX1, the process proceeds to Step S608. On the other hand, in a case where the potentials of all of the resistors are not measured by the potential detection part ADX1, the process proceeds to Step S602. In Step S602, the first resistance film 10 is connected to the subsequent resistor Rx2 or Rx3 by switching the first switch 110.

In Step S608, a resistor having a detected potential that is closest to 0.57 Vcc according to the detection potential detection part ADX1 is selected from the resistors Rx1, Rx2, and Rx3 of the X axis direction and connected to the first resistance film 10 in series.

In Step S610, the second resistance film 20 is connected in series with, for example, the resistor Ry1 by switching the second switch 120.

In Step S612, the potential detection part ADY1 measures a potential in a state where the power supply potential Vcc is applied.

In Step S614, it is determined whether the potential detection part ADY1 has measured the potentials with respect to all of the resistors Ry1, Ry2, and Ry3 of the Y axis direction that are to be connected to the second resistance film 20 by switching the second switch 120. In a case where the potentials of all of the resistors are measured by the potential detection part ADY1, the process proceeds to Step S616. On the other hand, in a case where the potentials of all of the resistors are not measured by the potential detection part ADY1, the process proceeds to Step S610. In Step S610, the second resistance film 20 is connected to the subsequent resistor Ry2 or Ry3 by switching the second switch 120.

In Step S616, a resistor having a detected potential that is closest to 0.57 Vcc according to the detection potential detection part ADY1 is selected from the resistors Ry1, Ry2, and Ry3 of the Y axis direction and connected to the second resistance film 20 in series.

<Fifth Embodiment>

Next, a fifth embodiment is described. A touch panel according to this embodiment is described based on FIG. 52.

In the touch panel of this embodiment, a resistor Rcx1 connected in series with the first resistance film 10 and a resistor Rcy2 connected in series with the second resistance film 20 are variable resistors.

The resistance values of the resistors Rcx1, Rcx2 are adjusted, so that the resistance value of the resistor Rcx1 becomes closest to 75% of the resistance value between the XH electrode 11 and the XL electrode 12 of the first resistance film 10, and the resistance value of the resistor Rcy1 becomes closest to 75% of the resistance value between the YH electrode 21 and the YL electrode 22 of the second resistance film 20.

More specifically, the resistance value of the resistor Rcx1 is adjusted, so that the value of the potential detected by the potential detection part ADX1 becomes closest to approximately 0.57 Vcc. Similarly, the resistance value of the resistor Rcy1 is adjusted, so that the value of the potential detected by the potential detection part ADY1 becomes closest to approximately 0.57 Vcc.

With this embodiment, even in a case where the first and second resistance films 10, 20 of the touch panel are inconsistent due to, for example, manufacturing error, the resistance value can be adjusted to an optimum value. Further, the resistance value can be adjusted to an optimum value for various touch panels having different shapes.

Figure 53:
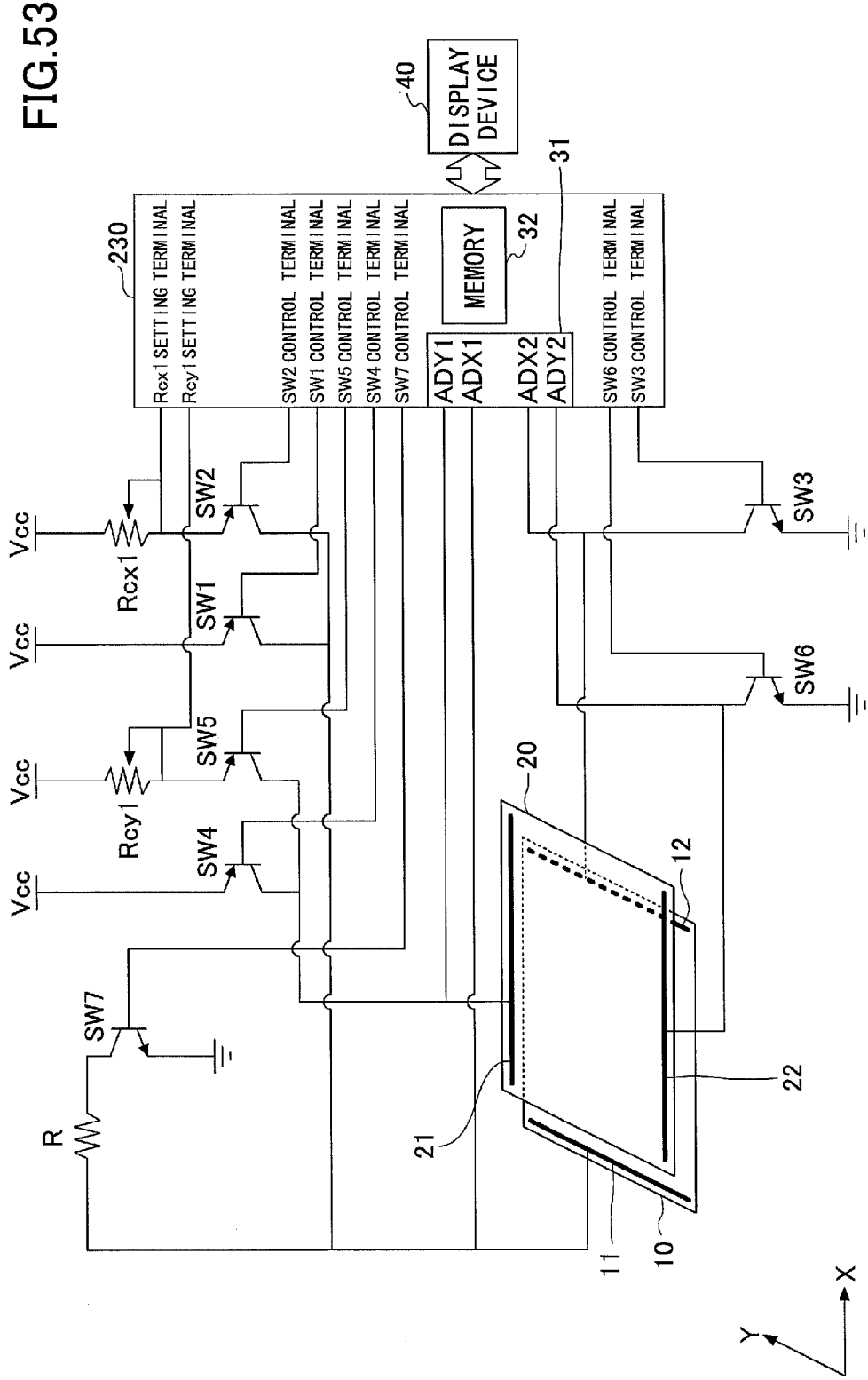
FIG. 53 is a diagram illustrating a configuration of another touch panel according to a fifth embodiment of the present invention.

FIG. 53 illustrates a touch panel according to an embodiment in which the resistance values of the resistors Rcx1, Rcy1 can be set by way of Rcx1 setting terminals, Rcy1 setting terminals of a control part 230.

<Method for Setting Resistance Values>

Figure 54:
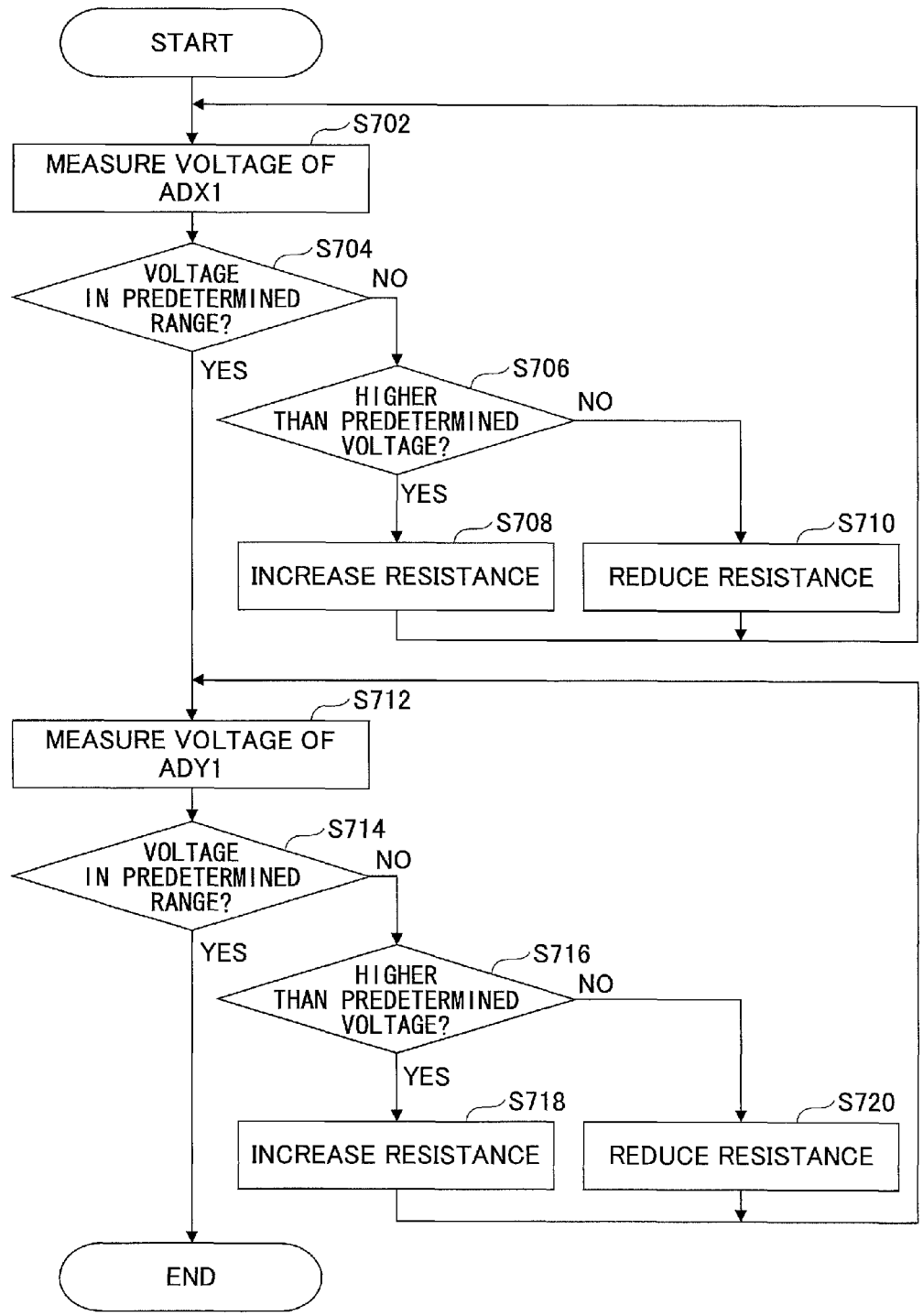
FIG. 54 is a flowchart of a method for setting resistance values of the touch panel of the fifth embodiment.

Next, a method for setting the resistance values of the resistors Rcx1, Rcy1 connected to the first and second resistance films 10, 20 of the touch panel according to this embodiment is described based on FIG. 54. The below-described controls may be partly or entirely performed according to the controls of the control part 230.

First, in Step S702, the potential detection part ADX1 measures a potential in a state where the power supply potential Vcc is applied.

In Step S704, it is determined whether the potential measured by the potential detection part ADX1 is a value close to 0.57 Vcc. For example, it is determined whether the potential measured by the potential detection part ADX1 is greater than or equal to 0.2 Vcc but less than or equal to 0.8 Vcc (in a case of setting the resistance value of the resistor Rcx1 to be greater than or equal to 25% but less than or equal to 400% with respect to the resistance value of the first resistance film 10). In a case where the potential measured by the potential detection part ADX1 is greater than or equal to 0.2 Vcc but less than or equal to 0.8 Vcc, the process proceeds to Step S712. In a case where the potential measured by the potential detection part ADX1 is not greater than or equal to 0.2 Vcc but less than or equal to 0.8 Vcc, the process proceeds to Step S706.

In a case of setting the resistance value of the resistor Rcx1 to be greater than or equal to 50% but less than or equal to 200% with respect to the resistance value of the first resistance film 10, it may be determined whether the potential measured by the potential detection part ADX1 is greater than or equal to 0.33 Vcc but less than or equal to 0.67 Vcc. Further, in a case of setting the resistance value of the resistor Rcx1 to be greater than or equal to 50% but less than or equal to 100% with respect to the resistance value of the first resistance film 10, it may be determined whether the potential measured by the potential detection part ADX1 is greater than or equal to 0.5 Vcc but less than or equal to 0.67 Vcc.

In Step S706, it is determined whether the potential measured by the potential detection part ADX1 is higher or lower than a predetermined potential range (e.g., 0.2 Vcc to 0.8 Vcc). In a case where the potential measured by the potential detection part ADX1 is higher than the predetermined range (e.g., 0.8 Vcc), the process proceeds to Step S708. In a case where the potential measured by the potential detection part ADX1 is lower than the predetermined range (e.g., 0.2 Vcc), the process proceeds to Step S710.

In Step S708, the resistance value of the resistor Rcx1 is adjusted, so that the resistance value of the Rcx1 becomes higher. Then, the process proceeds to Step S702.

In Step S710, the resistance value of the resistor Rcx1 is adjusted, so that the resistance value of the Rcx1 becomes lower. Then, the process proceeds to Step S702.

In Step S712, the potential detection part ADY1 measures a potential in a state where the power supply potential Vcc is applied.

In Step S714, it is determined whether the potential measured by the potential detection part ADY1 is a value close to 0.57 Vcc. For example, it is determined whether the potential measured by the potential detection part ADY1 is greater than or equal to 0.2 Vcc but less than or equal to 0.8 Vcc (in a case of setting the resistance value of the resistor Rcy1 to be greater than or equal to 25% but less than or equal to 400% with respect to the resistance value of the second resistance film 20). In a case where the potential measured by the potential detection part ADY1 is greater than or equal to 0.2 Vcc but less than or equal to 0.8 Vcc, the method of setting the resistance value of FIG. 54 is terminated. In a case where the potential measured by the potential detection part ADX1 is not greater than or equal to 0.2 Vcc but less than or equal to 0.8 Vcc, the process proceeds to Step S716.

In a case of setting the resistance value of the resistor Rcy1 to be greater than or equal to 50% but less than or equal to 200% with respect to the resistance value of the second resistance film 20, it may be determined whether the potential measured by the potential detection part ADY1 is greater than or equal to 0.33 Vcc but less than or equal to 0.67 Vcc. Further, in a case of setting the resistance value of the resistor Rcy1 to be greater than or equal to 50% but less than or equal to 100% with respect to the resistance value of the second resistance film 20, it may be determined whether the potential measured by the potential detection part ADY1 is greater than or equal to 0.5 Vcc but less than or equal to 0.67 Vcc.

In Step S716, it is determined whether the potential measured by the potential detection part ADY1 is higher or lower than a predetermined potential range (e.g., 0.2 Vcc to 0.8 Vcc). In a case where the potential measured by the potential detection part ADY1 is higher than the predetermined range (e.g., 0.8 Vcc), the process proceeds to Step S718. In a case where the potential measured by the potential detection part ADX1 is lower than the predetermined range (e.g., 0.2 Vcc), the process proceeds to Step S720.

In Step S718, the resistance value of the resistor Rcy1 is adjusted, so that the resistance value of the Rcy1 becomes higher. Then, the process proceeds to Step S712.

In Step S720, the resistance value of the resistor Rcy1 is adjusted, so that the resistance value of the Rcy1 becomes lower. Then, the process proceeds to Step S712.

Accordingly, with the touch panel of this embodiment, the resistance values of the resistors Rcx1, Rcy1 can be set to predetermined values.

In the third to fifth embodiments, the resistor Rx1, the resistor Rx2, the resistor Rx3, or the resistor Rcx1 has one side connected to the XH electrode 11 and another side connected to a power source, and the resistor Ry1, the resistor Ry2, the resistor Ry3, or the resistor Rcy1 has one side connected to the YH electrode 21 and another side connected to a power source. Alternatively, the resistor Rx1, the resistor Rx2, the resistor Rx3, or the resistor Rcx1 may have one side connected to the XL electrode 12 and another side that is grounded, and the resistor Ry1, the resistor Ry2, the resistor Ry3, or the resistor Rcy1 may have one side connected to the YL electrode 22 and another side that is grounded.

<Sixth Embodiment>

Next, a sixth embodiment is described. The touch panel of this embodiment includes a structure in which, for example, the resistors Rx1, Ry1 that are connected to the touch panel of the first embodiment, the fourth embodiment, and the fifth embodiment are connected to a ground side.

Figure 55:
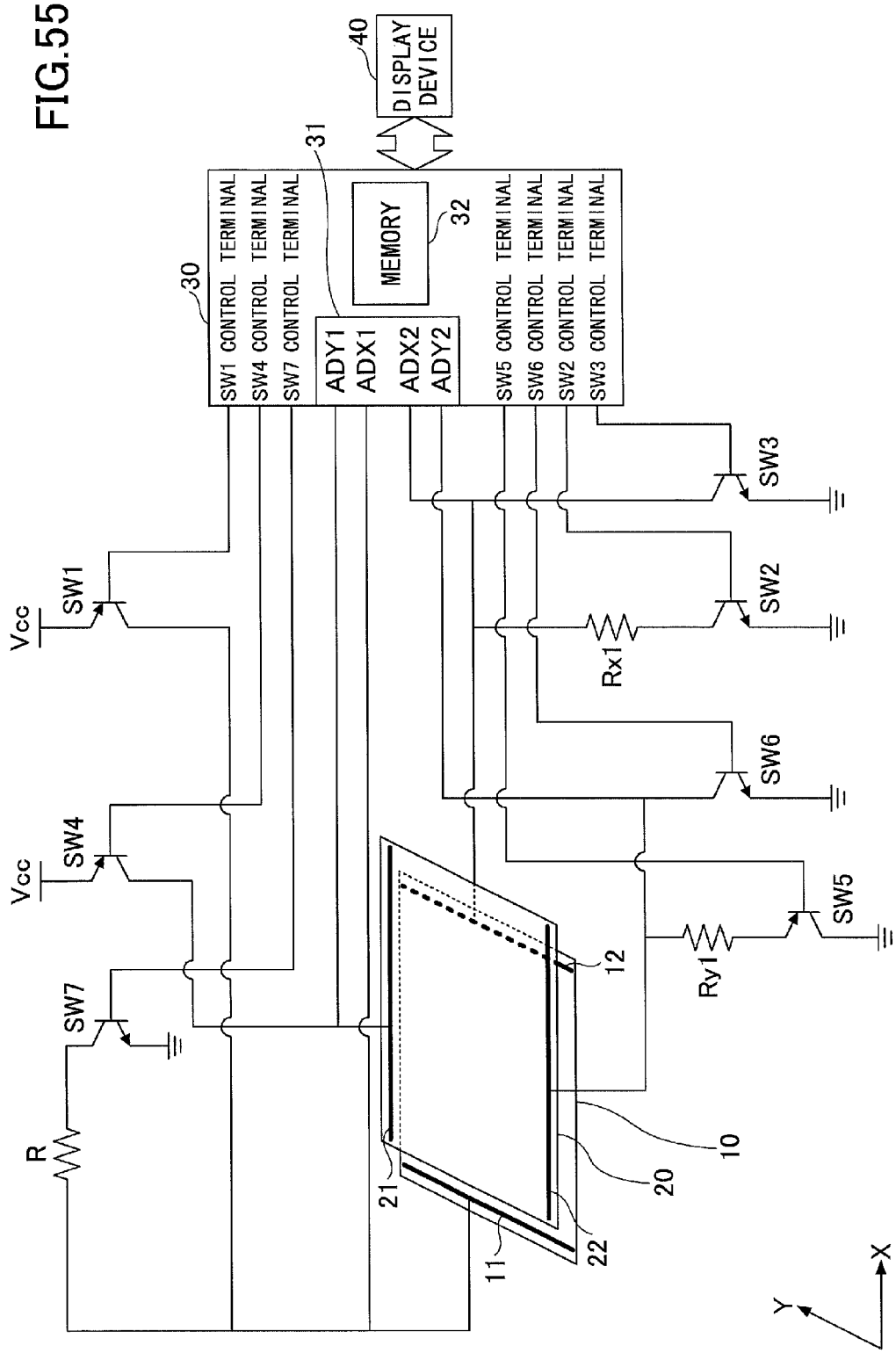
FIG. 55 is a diagram illustrating a configuration of a touch panel according to a sixth embodiment of the present invention.

First, a touch panel having a structure illustrated in FIG. 55 corresponds to the touch panel of FIG. 1, in which the structure has the resistors Rx1, Ry1 connected to the ground side. More specifically, the first and second resistance films 10 of the touch panel are formed of transparent conductive films such as ITO (Indium Tin Oxide). The XH electrode 11 is formed along the Y axis direction on one end of the first resistance film 10 in the X axis direction, and the X1 electrode 12 is formed along the Y axis direction on the other end of the first resistance film 10 in the X axis direction. Further, the YH electrode 21 is formed along the X axis direction on one end of the second resistance film 20 in the Y axis direction, and the YL electrode 22 is formed along the X axis direction on the other end of the second resistance film 20 in the Y axis direction.

The XH electrode 11, which is to be a first electrode, is connected to a switch SW1 including a transistor connected to the power supply Vcc. Further, the XH electrode 11 is connected to a switch SW7 (including a transistor connected to the power supply Vcc) via the resistor R. Further, the XH electrode 11 is connected to the potential detection part ADX1 for detecting the potential of an AD converter 31 provided in the control part 30.

The XL electrode 12, which is to be a second electrode, is connected to a switch SW3 including a transistor connected to the ground. Further, the XL electrode 12 is connected to a switch SW2 (including a transistor connected to the ground) via the resistor Rx1. Further, the XL electrode 12 is connected to the potential detection part ADX2 for detecting the potential of the AD converter 31 provided in the control part 30.

The YH electrode 21, which is to be a third electrode, is connected to a switch SW4 including a transistor connected to the power supply Vcc. Further, the YH electrode 21 is connected to the potential detection part ADY1 for detecting the potential of the AD converter 31 provided in the control part 30.

The YL electrode 22, which is to be a fourth electrode, is connected to a switch SW6 including a transistor connected to the ground. Further, the YL electrode 22 is connected to a switch SW5 (including a transistor connected to the ground) via the resistor Ry1. Further, the YL electrode 22 is connected to the potential detection part ADY2 for detecting the potential of the AD converter 31 provided in the control part 30.

The resistor Rx1, which is to be a first resistor, has a resistance value that is substantially equal to the resistance value between the XH electrode 11 and the XL electrode 12 of the first resistance film 10. The resistor Ry1, which is to be a second resistor, has a resistance value that is substantially equal to the resistance value between the YH electrode 21 and the YL electrode 22 of the second resistance film 20.

The switches SW1, SW2, SW3, SW4, SW5, SW6, and SW7 are connected to a SW1 control terminal, a SW2 control terminal, a SW3 control terminal, a SW4 control terminal, a SW5 control terminal, a SW6 control terminal, and a SW7 control terminal provided in the control part 30.

In the touch panel of the first embodiment, the potential detected in the AD converter 31 decreases as the distance between the 2 points increases as illustrated in FIGS. 8A-10B, FIGS. 14A-14B, FIGS. 15A-15B, and FIG. 32. However, with the touch panel having the structure illustrated in FIG. 55 according to this embodiment, the potential detected in the AD converter 31 increases as the distance between the 2 points increases.

Figure 49:
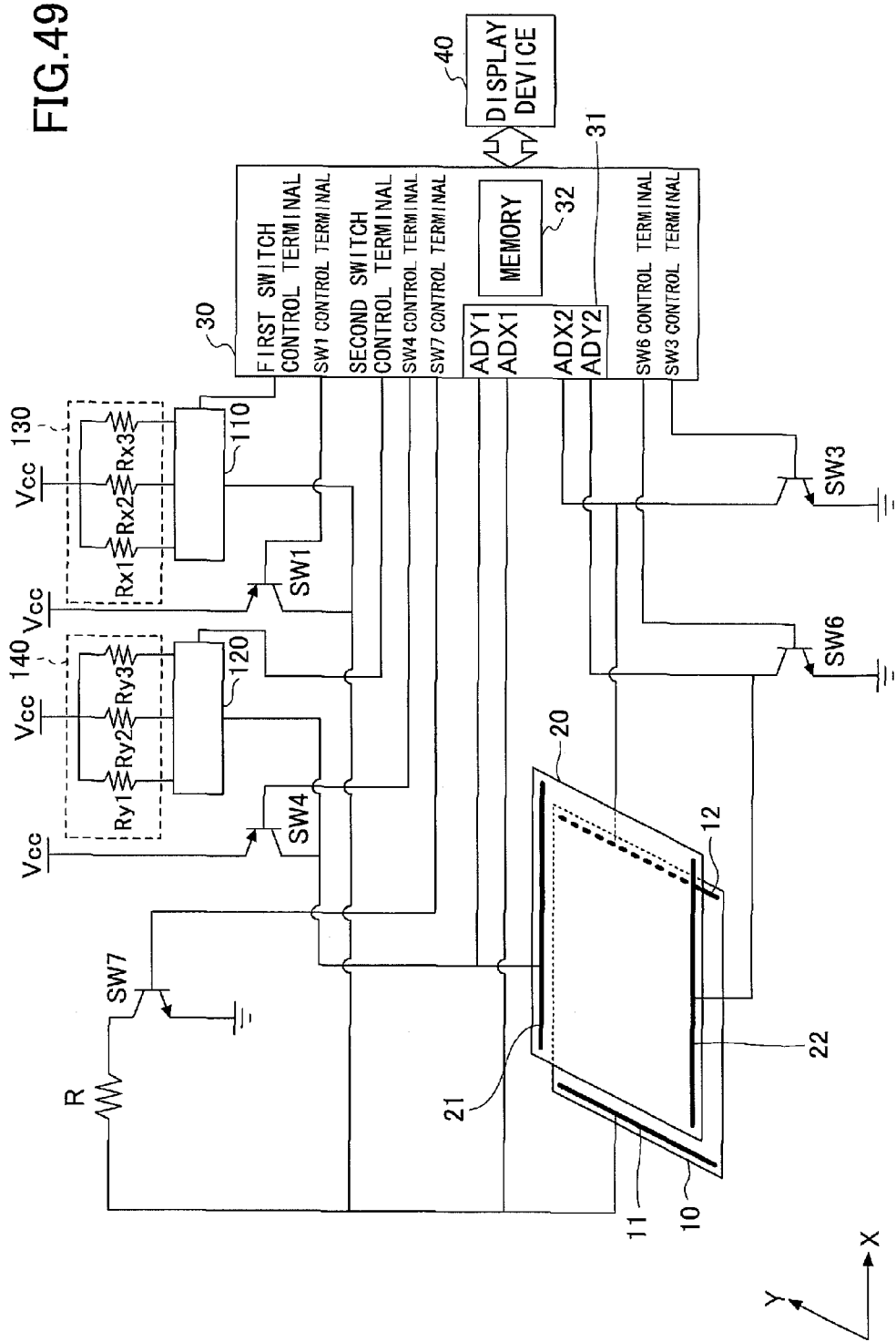
FIG. 49 is a diagram illustrating a configuration of a touch panel according to a fourth embodiment of the present invention.
Figure 56:
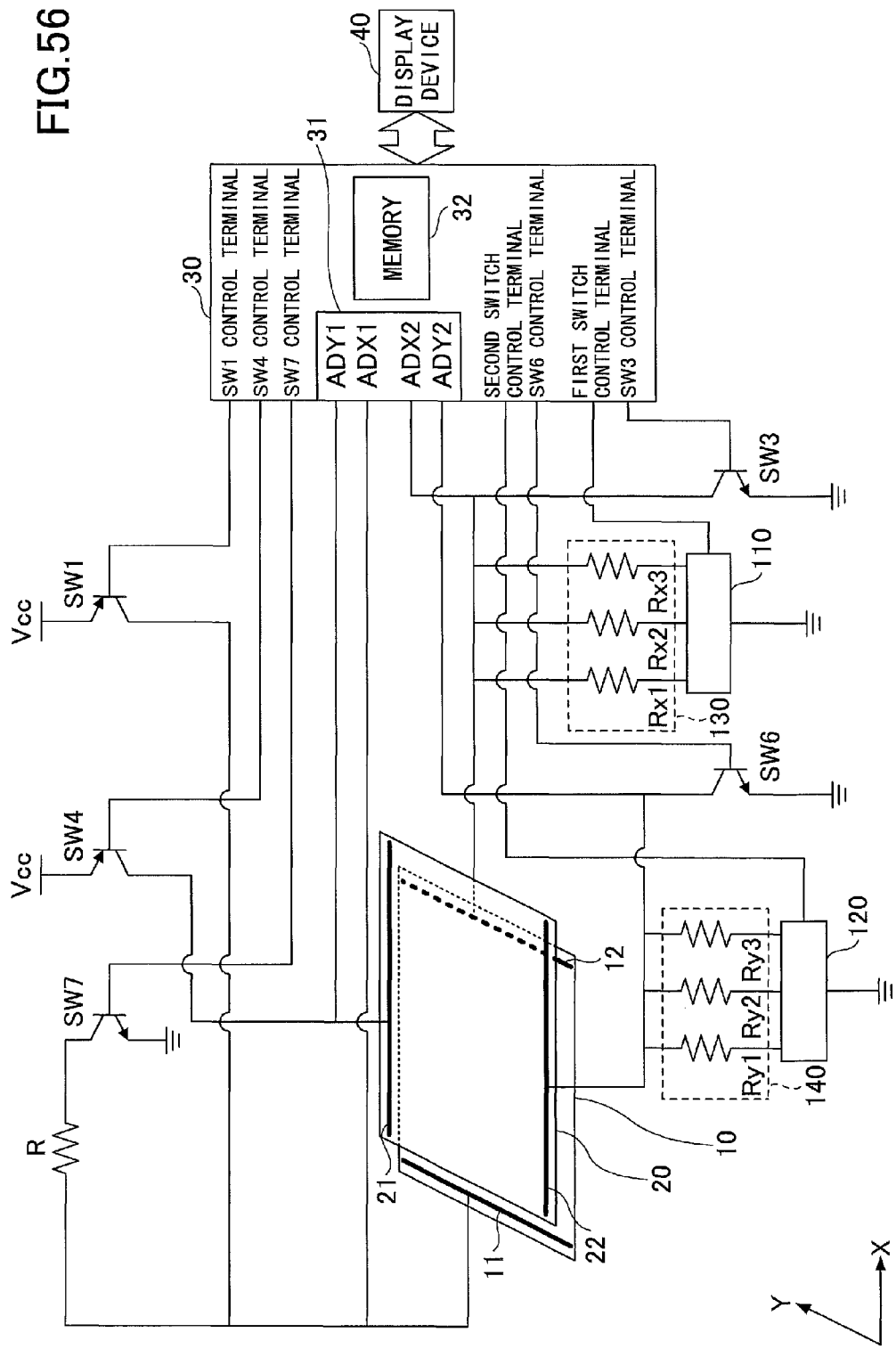
FIG. 56 is a diagram (1) illustrating a configuration of another touch panel of the sixth embodiment.

A touch panel having a structure illustrated in FIG. 56 corresponds to the touch panel of FIG. 49. In the touch panel of the fourth embodiment, the resistors Rx1, Rx2, Rx3, Ry1, Ry2, and Ry3 are connected to the ground side. More specifically, the touch panel of the fourth embodiment includes multiple resistors Rx1, Rx2, and Rx3 that are connected in series with the first resistance film 10 on the side of the XL electrode 12. By switching the first switch 110, one of the resistors Rx1, Rx2, Rx3 can be selected and connected in series with the first resistance film 10. Further, the touch panel also includes multiple resistors Ry1, Ry2, and Ry3 that are connected in series with the second resistance film 20 on the side of the YL electrode 22. Similarly, by switching the second switch 120, one of the resistors Ry1, Ry2, and Ry3 can be selected and connected in series with the second resistance film 20. The first and second switches 110, 120 are connected to the ground.

Figure 52:
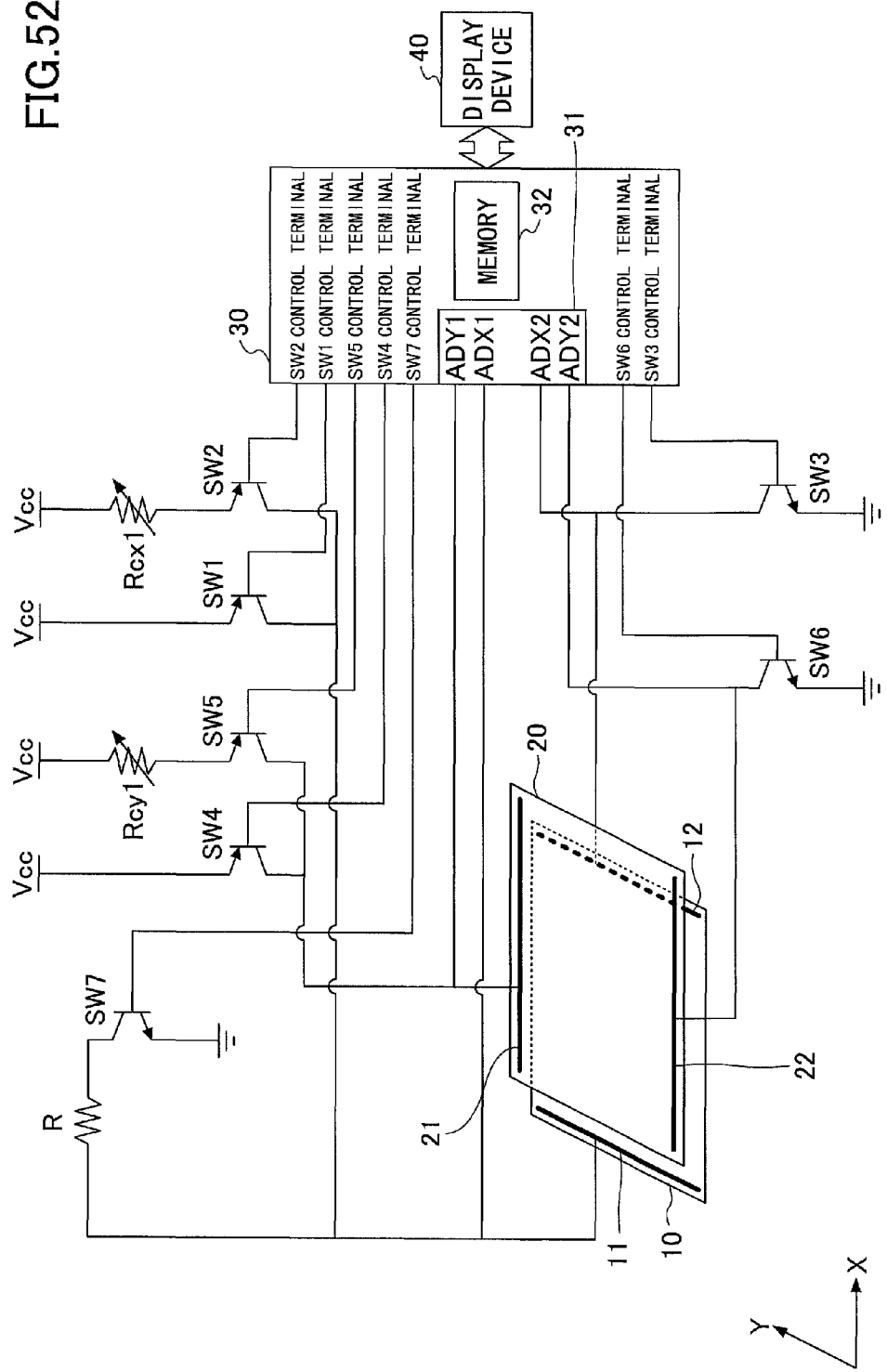
FIG. 52 is a diagram illustrating a configuration of a touch panel according to a fifth embodiment of the present invention.
Figure 57:
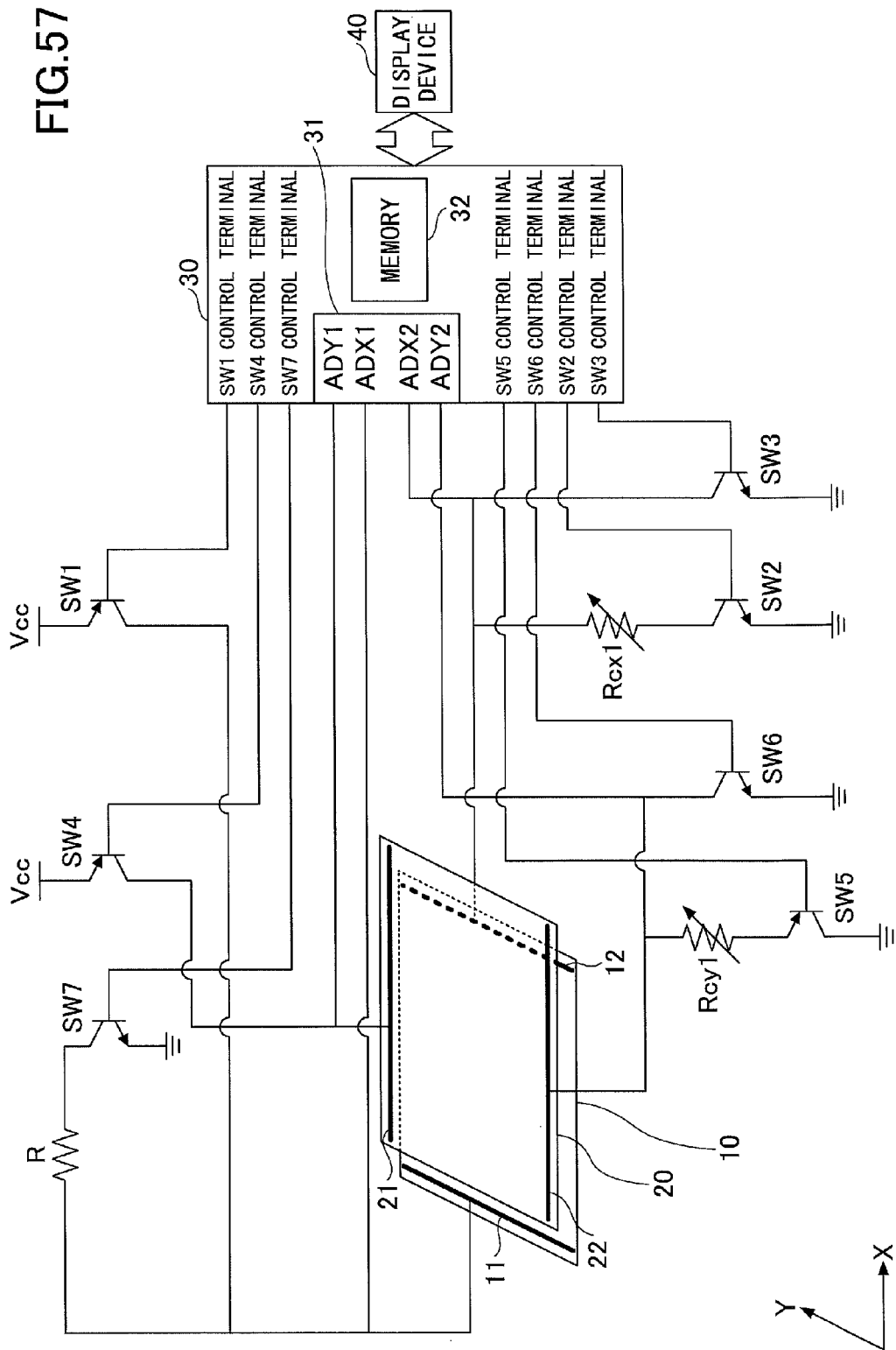
FIG. 57 is a diagram (2) illustrating a configuration of another touch panel of the sixth embodiment.

A touch panel having a structure illustrated in FIG. 57 corresponds to the touch panel of FIG. 52. In the touch panel of the fifth embodiment, the resistors Rcx1, Rxy1 are connected on the ground side. More specifically, the resistor Rcx1, which is a variable resistor, is connected in series with the first resistance film 10 on the side of the XL electrode 12. Similarly, the resistor Rcy1, which is a variable resistor, is connected in series with the second resistance film 20 on the side of the YL electrode 22.

The resistor Rcx1 is connected to the ground via a switch SW2 including a transistor. Further, the resistor Rcy1 is connected to the ground via a switch SW5 including a transistor.

Figure 58:
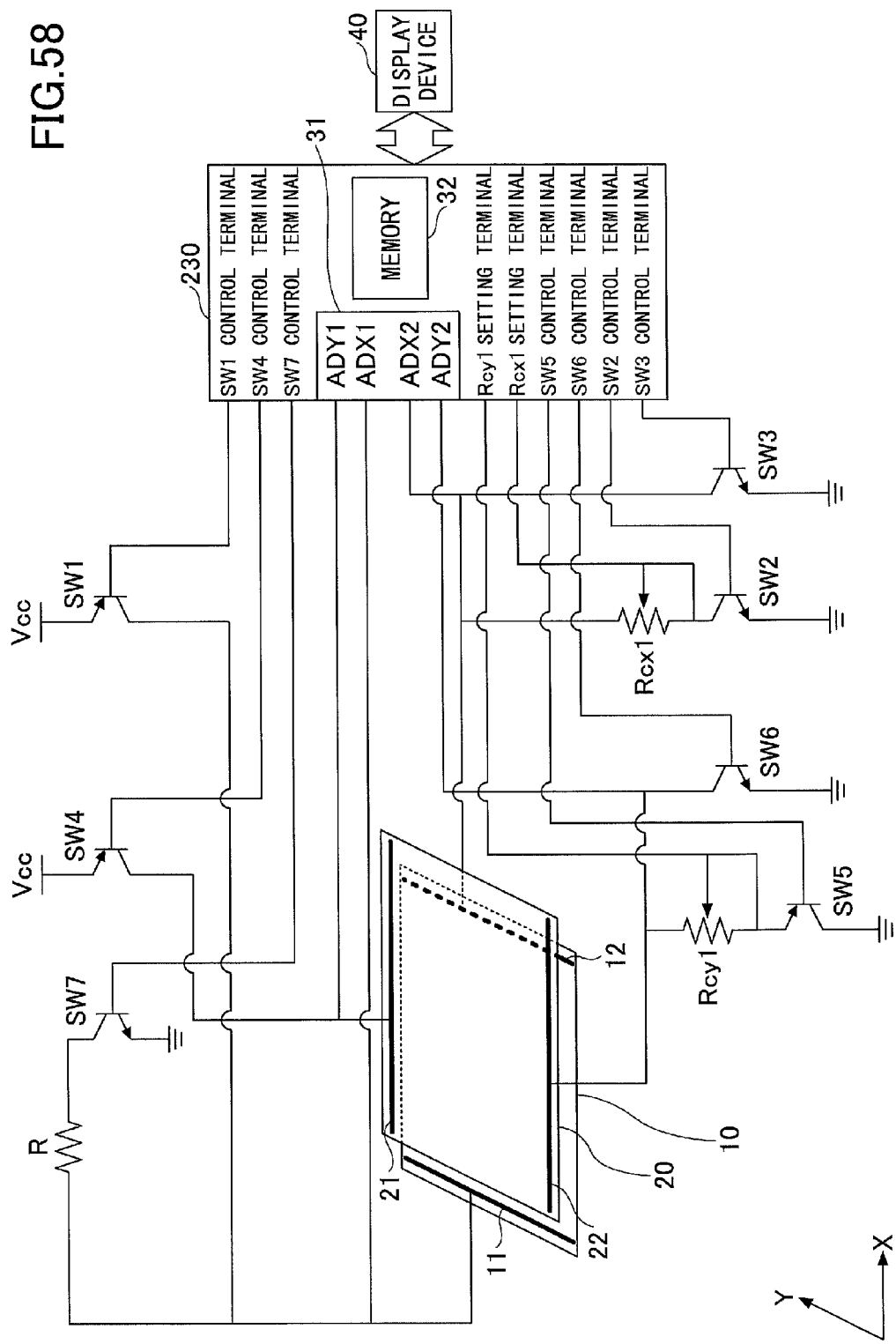
FIG. 58 is a diagram (3) illustrating a configuration of another touch panel of the sixth embodiment.

The touch panel having a structure illustrated in FIG. 58 corresponds to the touch panel of FIG. 53. In the touch panel of the fifth embodiment, the resistors Rcx1, Rxy1 are connected on the ground side. More specifically, the resistor Rcx1 is connected in series with the first resistance film 10 on the side of the XL electrode 12. Similarly, the resistor Rcy1 is connected in series with the second resistance film 20 on the side of the YL electrode 22. The resistor Rcx1 is connected to the ground via a switch SW2 including a transistor. Further, the resistor Rcy1 is connected to the ground via a switch SW5 including a transistor. Further, the resistance values of the resistors Rcx1, Rcy1 can be set by way of the Rcx1 setting terminal and the Rcy1 setting terminal of the control part 230.

<Seventh Embodiment>

Next, a seventh embodiment is described. This embodiment is a method for initializing, for example, a touch panel. More specifically, it is an initialization method for detecting a position with greater accuracy in a case where there are 2 contact points in the touch panel.

Figure 59:
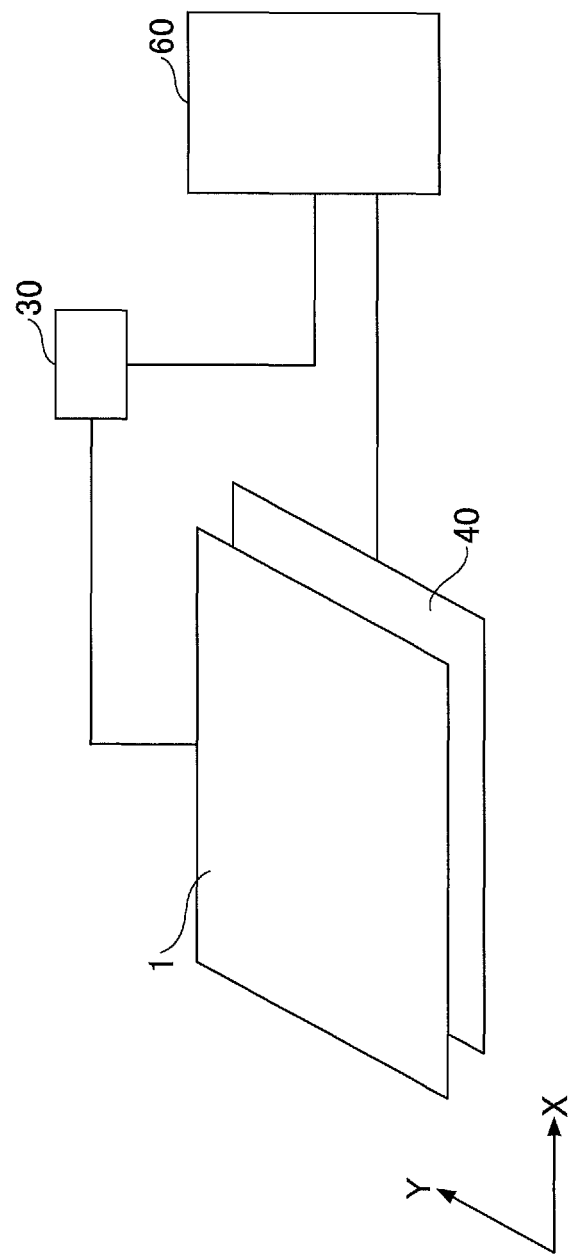
FIG. 59 is a diagram illustrating a configuration of a touch panel according to a seventh embodiment of the present invention.

With the initialization method of this embodiment, the touch panel 1 of the first embodiment is placed in a predetermined position on a display apparatus 40 connected to a personal computer (PC) 60 as illustrated in FIG. 59. The display apparatus 40 may be directly connected to the control part 30 of the touch panel 1 without being connected to the personal computer 60.

Figure 60:
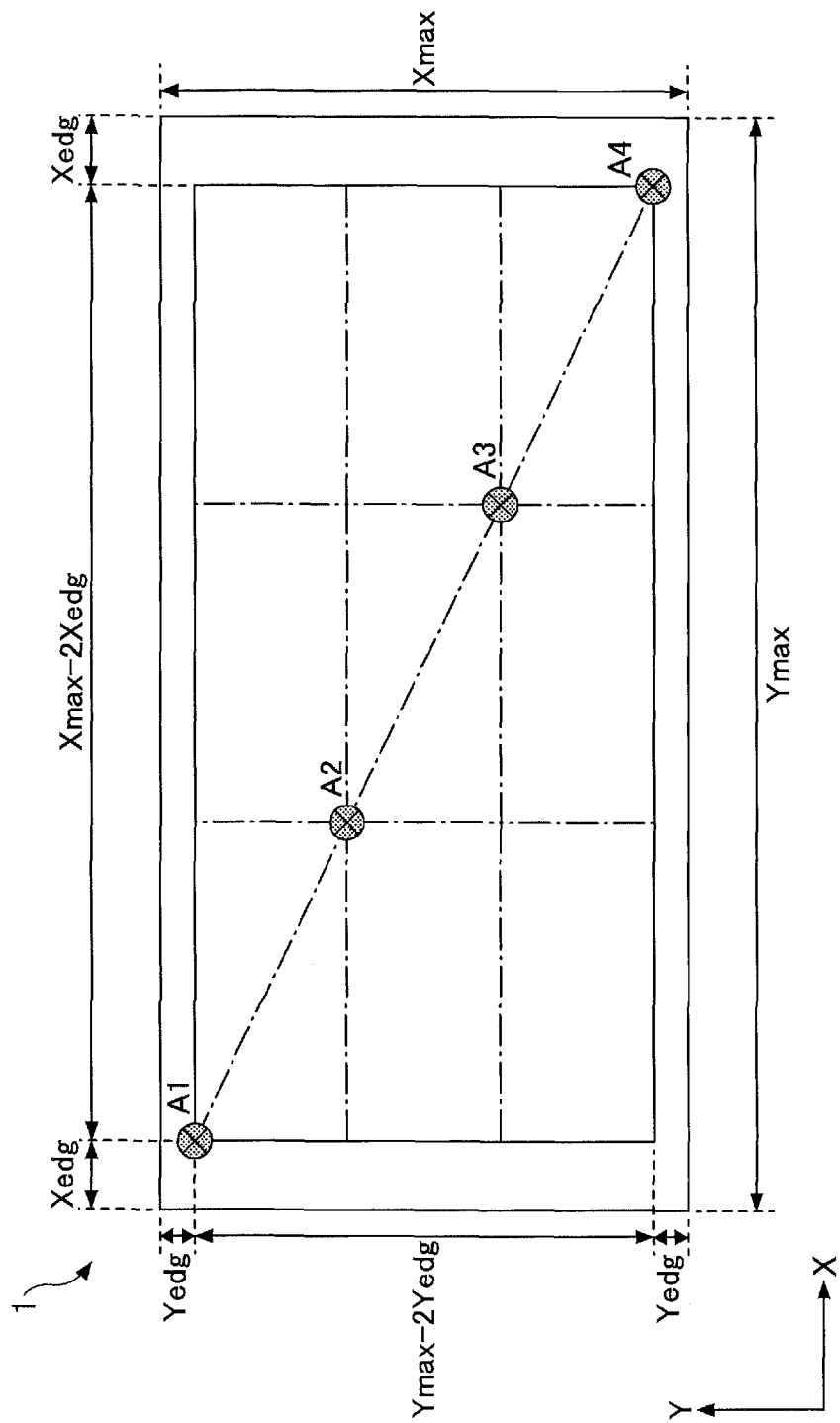
FIG. 60 is a diagram for describing an initialization method of a touch panel of the seventh embodiment.

In this embodiment, as illustrated in FIG. 60, points A1, A2, A3, and A4 are displayed on a display screen of the display apparatus 40 accommodating the touch panel 1 in correspondence with the timing of depressing the touch panel 1. By depressing the points that are displayed, the touch panel 1 can be initialized. The points A1 and A4, which are on a diagonal line of the display screen 40, are located Xedg more inward in the X axis direction and Yedg more inward in the Y axis direction with respect to the display screen of the display apparatus 40. The points A2 and A3 between the points A1 and A4 are located in positions corresponding to coordinates that are equally divided into three parts in the X axis direction and in the Y axis direction. Therefore, points A1, A2, A3, and A4 are positioned on the same straight line. As long as the points A1, A2, A3, and A4 are 4 points in the display screen of the display apparatus 40, the points A1, A2, A3, and A4 may be located in other than the positions corresponding to coordinates that are equally divided into three parts in the X axis direction and in the Y axis direction.

<Method for Initialization>

Figure 61:
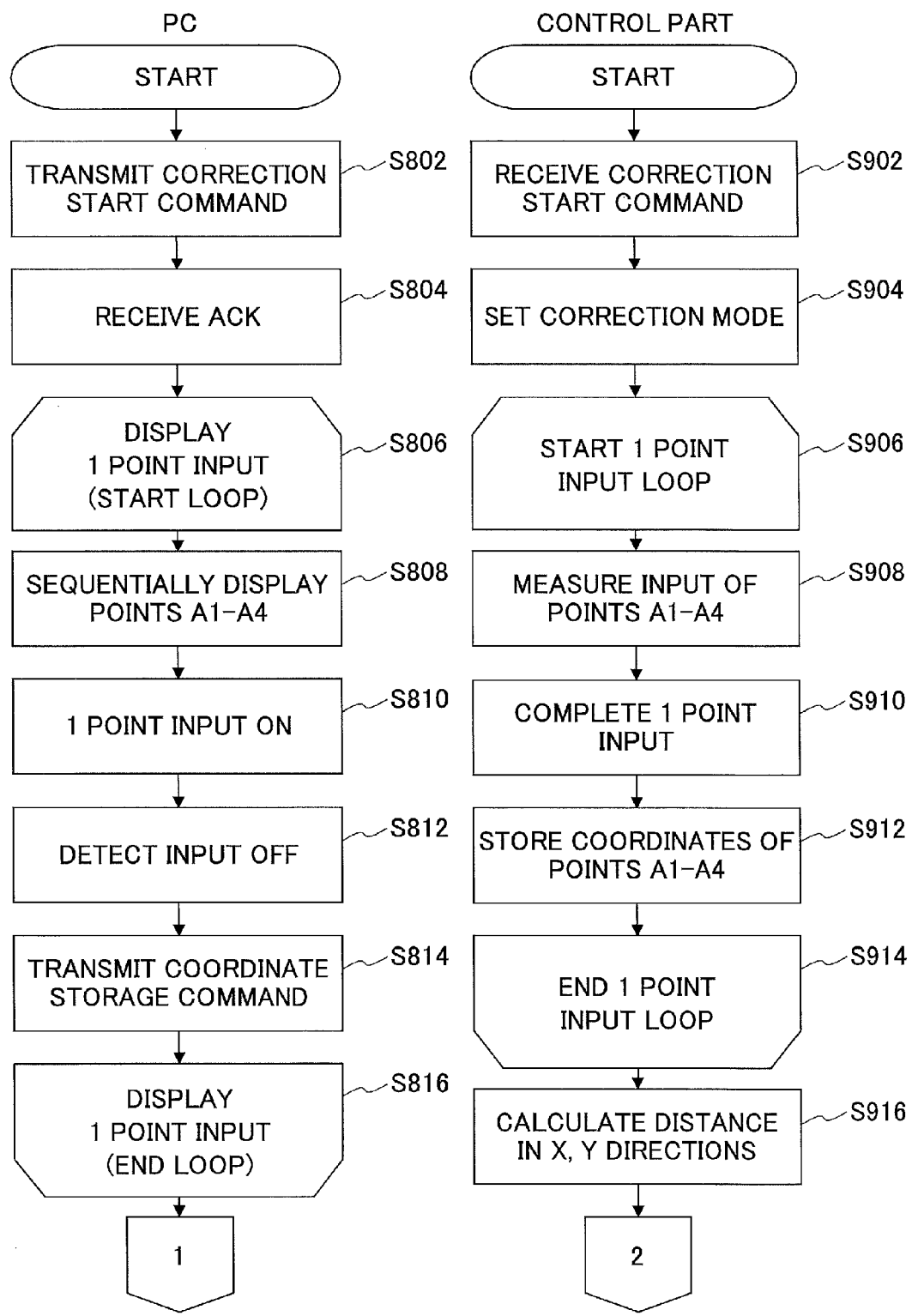
FIG. 61 is a flowchart (1) of a method for initializing the touch panel of the seventh embodiment.
Figure 62:
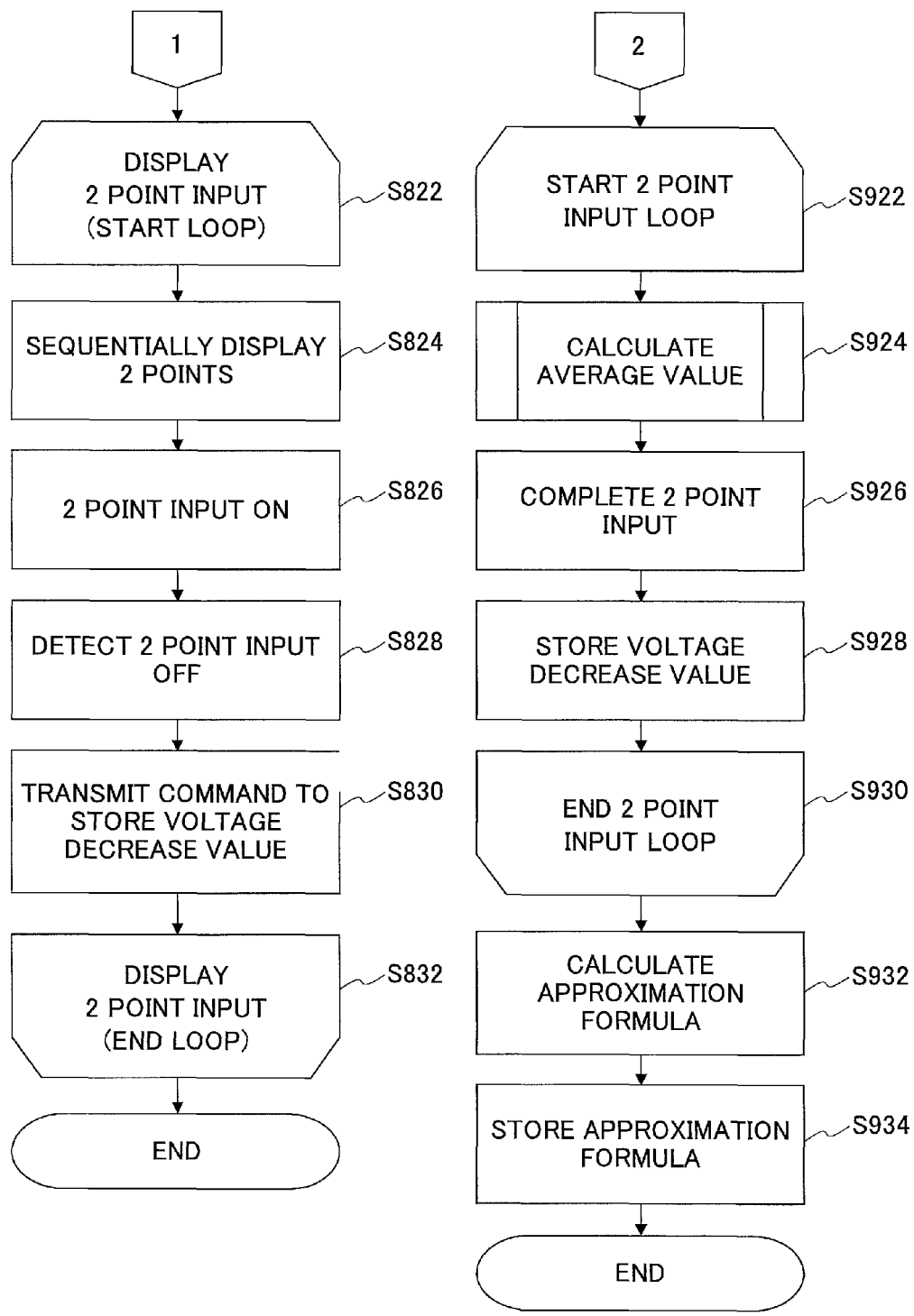
FIG. 62 is a flowchart (2) of a method for initializing the touch panel of the seventh embodiment.

Next, an initialization method according to this embodiment is described based on FIGS. 61-62. In FIGS. 61 and 62, the flowchart on the left side illustrates processes performed by the personal computer 60 whereas the flowchart on the right side illustrates processes performed by the control part 30 of the touch panel 1. Next, the flowcharts are described in relation to each other.

First, a power supply of the personal computer 60 and a power supply of the touch panel 1 are switched on.

In Step S802, a correction start command is transmitted from the personal computer 60 to the touch panel 1. The correction start command is a command indicating the starting of an initialization of the touch panel of this embodiment. Thereby, as illustrated in Step S902, the control part 30 of the touch panel 1 receives the correction start command transmitted from the personal computer 60 and transmits an ACK (Acknowledgement) signal to the personal computer 60 along with proceeding to Step S904. In Step S904, in order to start initialization, the control part 30 is set to a correction mode that is different from a regular touch panel input operation.

In Step S804, the personal computer 60 receives the ACK signal transmitted from the control part 30 and proceeds to a loop of Steps S806 to S816 for displaying a screen to perform 1 point input.

Steps S906 to S914 is a loop of the control part 30 corresponding to Steps S806 to S816.

In the loop of Steps S806 to S816, first, point A1 is displayed on the display screen of the display apparatus 40 in Step S808.

In Step S810, 1 point input is performed by depressing the point A1. Thereby, 1 point input is switched on. This information is transmitted from the personal computer 60 to the control part 30. In Step S908, the control part 30 measures the potentials of the point A1 in the X and Y axes directions.

In Step S812, the depression of the point A1 is released, that is, the point A1 is no longer depressed. Thus, it is detected that the input is switched off. This information is transmitted from the personal computer 60 to the control part 30. As illustrated in Step S910, the control part 30 completes the 1 point input of the point A1 and calculates the position coordinates of the point A1.

In Step S814, a storage command of the coordinates of the point A1 is transmitted from the personal computer 60 to the control part 30. As illustrated in Step S912, the control part 30 stores the coordinates of the point A1.

In the loop of Steps S806 to S816, the same processes are performed for a total of 4 points including points A1, A2, A3, and A4.

More specifically, in Step S808, the points A1, A2, A3, and A4 are sequentially displayed. By depressing predetermined positions corresponding to the points A1, A2, A3, and A4, the position coordinates of the points A1, A2, A3, and A4 are detected and stored. That is, Steps S806-S816 and Steps S906-S914 are sequentially performed on these points.

In Step S916, the distance between the input points in the X axis direction and the distance between the inputs points in the Y axis direction are calculated and stored. More specifically, the distance from the point A1 to the point A2 (LXA2A1, LYA2A1), the distance from the point A1 to the point A3 (LXA3A1, LYA3A1), and the distance from the point A1 to the point A4 (LXA4A1, LYA4A1) are calculated by using a formula illustrated in Expression 7 based on the position coordinates of the points A1, A2, A3, and A4 obtained in Steps S806-S816 and S906-S914, that is, point A1 (XA1, YA1), point A2 (XA2, YA2), point A3 (XA3, YA3), and point A4 (XA4, YA4).

$$A2(XA2,YA2)-A1(XA1,YA1)=(LXA2A1,LYA2A1)$$

$$A3(XA3,YA3)-A1(XA1,YA1)=(LXA3A1,LYA3A1)$$

$$A4(XA4,YA4)-A1(XA1,YA1)=(LXA4A1,LYA4A1) \quad \text{[Expression 7]}$$

Then, the process proceeds to a loop of S822-S832 for displaying a screen to perform 2 point input. Steps S922 to S930 is a loop of the control part 30 corresponding to Steps S822 to S832.

First, in the loop of Steps S822 to S832, two points A1 and A2 are displayed on the display screen of the display apparatus 40 in Step S824.

In Step S826, 2 point input is performed by simultaneously depressing 2 points A1 and A2. Thereby, 2 point input is switched on. This information is transmitted from the personal computer 60 to the control part 30. In Step S924, the control part 30 proceeds to a sub-routine for calculating an average value. The sub-routine for calculating the average value is described below.

In Step S828, the depression of the 2 points A1 and A2 is released, that is, the points A1 and A2 are no longer depressed. Thus, it is detected that the 2 point input is switched off. This information is transmitted from the personal computer 60 to the control part 30. As illustrated in Step S926, the control part 30 completes the 2 point input of the points A1 and A2 and measures a voltage drop value in this state.

In Step S830, a storage command of the voltage drop value is transmitted from the personal computer 60 to the control part 30. As illustrated in Step S928, the control part 30 stores the voltage drop value in the case where the 2 points A1 and A2 are depressed.

In the loop of Steps S822 to S832, the same processes are performed for a total of 3 times for sets of 2 points including 2 points A1 and A2, 2 points A1 and A3, and 2 points A1 and A4. More specifically, in Step S824, 2 points of A1 and A2, 2 points of A1 and A3, and 2 points of A1 and A4 are sequentially displayed. By depressing predetermined positions corresponding to 2 points, the voltage drop value of depressing 2 points of A1 and A2, 2 points of A1 and A3, and 2 points of A1 and A4 are detected and stored. That is, Steps S822-S832 and Steps S922-S930 are sequentially performed on these points.

In Step S932, an approximation formula is calculated. More specifically, $\alpha_2$, $\beta_2$, $\gamma_2$ of a diagonal X direction approximation formula of Expression 1 and $\alpha_4$, $\beta_4$, $\gamma_4$ of a diagonal Y direction approximation formula of Expression 1 can be obtained based on the distance from the point A1 to the point A2, the distance from the point A1 to the point A3, and the distance from the point A1 to the point A4 that are calculated by using the formula illustrated in Expression 7 and based on the voltage drop values of the depression of points A1 and A2, points A1 and A3, and points A1 and A4 in the X and Y axes directions that are detected by the loop of Steps S822-S832 and the loop of Steps S922-S934. Thereby, approximation formulas can be calculated based on the formulas illustrated in Expression 1. More specifically, the positions coordinates and the voltage drop values in the X and Y axes directions can be obtained based on the 3 different combinations of contact points (point A1 and point A2, point A1 and point A3, and point A1 and A4). Accordingly, $\alpha_2$, $\beta_2$, $\gamma_2$ that are the 3 unknown numbers in the X axis direction and $\alpha_4$, $\beta_4$, $\gamma_4 Y$ that are the 3 unknown numbers in the Y axis direction can be obtained. Similarly, $\alpha_1$, $\beta_1$, $\gamma_1$ of the parallel direction approximation formula of Expression 1 and $\alpha_3$, $\beta_3$, $\gamma_3$ of the orthogonal direction approximation formula of Expression 1 can be obtained by depressing the points that are arranged along the X axis direction or the Y axis direction instead of depressing the points arranged in the diagonal directions.

In Step S934, the approximation formulas are stored. The stored approximation formulas are used for detecting the positions of 2 contact points in the touch panel of this embodiment.

Figure 63:
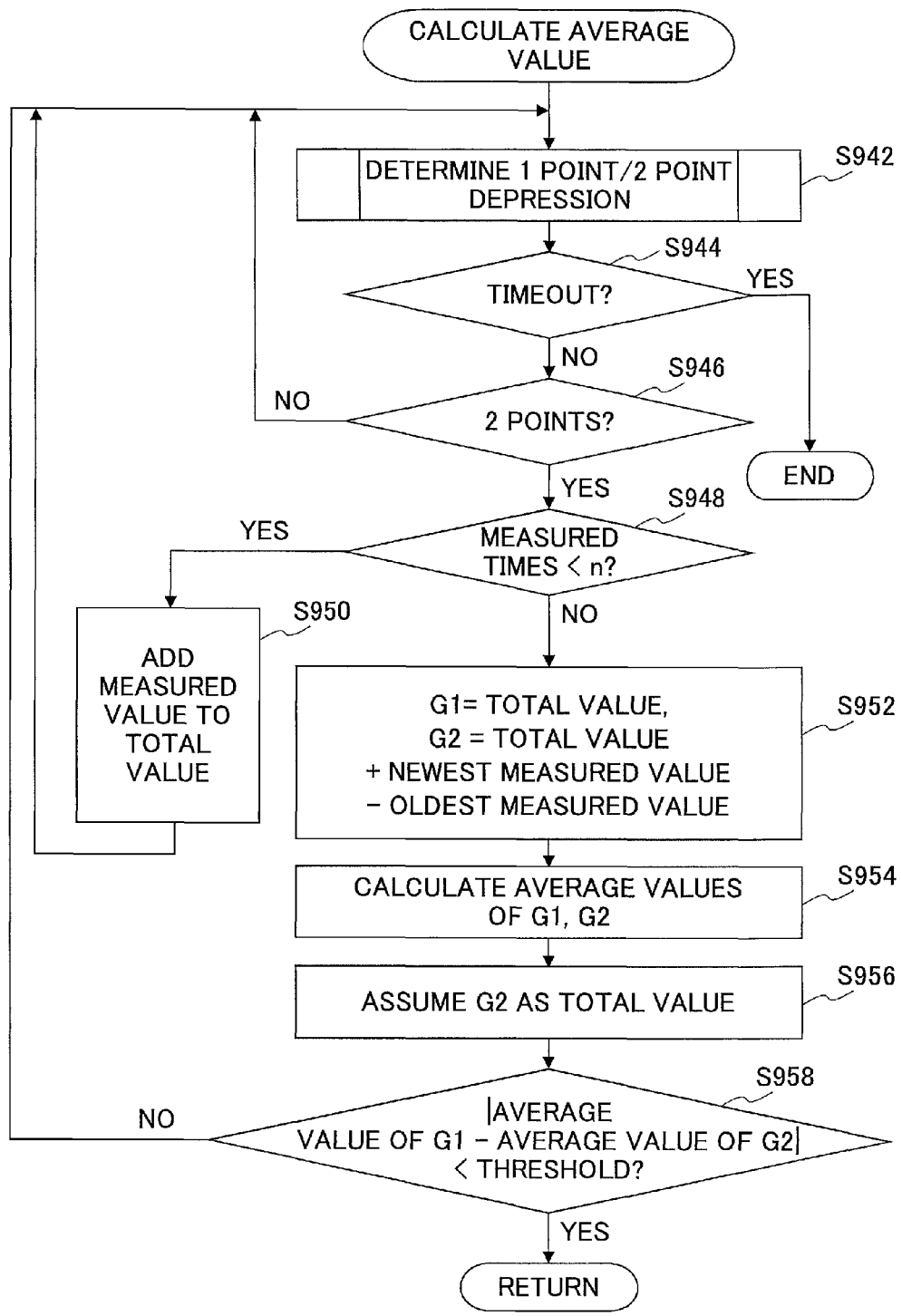
FIG. 63 is a flowchart (3) of a method for initializing the touch panel of the seventh embodiment.

Next, a sub-routine of Step S924 for average calculation is described based on FIG. 63.

First, in Step S942, it is determined whether 1 point or 2 points are depressed.

In Step S944, it is determined whether a predetermined time has elapsed (time out). More specifically, Steps S942 to Step S946 form a loop. When a predetermined time has elapsed during this loop, the loop is determined to be out of time. Therefore, the loop is determined to be out of time, the sub-routine for average calculation is terminated. On the other hand, in a case where the loop is determined not to be out of time, the sub-routine proceeds to Step S946. The predetermined time is determined beforehand.

In Step S946, it is determined whether 2 points are input. In a case where 2 points are determined to be input, the sub-routine proceeds to Step S948. On the other hand, the sub-routine proceeds to Step S942 in a case where 2 points are not determined to be input.

In Step S948, it is determined whether the number of times of measurement is less than a predetermined number of times n. In a case where the number of times of measurement is less than the predetermined number of times n, the sub-routine proceeds to Step S950. On the other hand, in a case where the number of times of measurement is not less than the predetermined number of times n (i.e., equal to or greater than the predetermined number of times n), the sub-routine proceeds to Step S952.

In Step S950, a newly measured value is added to a total value. Because the total value is initialized at the beginning of this sub-routine, the initial value of the total value is 0. By repeating Step S950, new measured values are sequentially added to the total value.

In Step S952, a value of (total value) is assumed to be "G1", and a value of (total value+newest measured value-oldest measured value) is assumed to be "G2". Therefore, both the value of G1 and the value of G2 indicate the sum of measured values for n number of times.

In Step S954, the average value of G1 is calculated by dividing the value of G1 by n, and the average value of G2 is calculated by dividing the value of G2 by n. The average value of G2 is one moving average after the average value of G1.

In Step s956, the total value is replaced by the value of G2.

In Step S958, it is determined whether the layerage value of G1–average value of G2| is less than or equal to a predetermined threshold. In a case where the |average value of G1–average value of G2| is less than or equal to the predetermined threshold, the sub-routine returns to the main routine illustrated in FIG. 62. On the other hand, in a case where the |average value of G1–average value of G2| is not less than or equal to the predetermined threshold, the sub-routine proceeds to Step S942. The threshold is provided for determining whether the value of the measured voltage is steady. From this standpoint, the value of the threshold is set.

Then, the sub-routine ends.

In this embodiment, the contact of 2 points is described in a case where the 2 points are A1 and A2, A1 and A3, and A1 and A4. However, the contact of the 2 points may be A1 and A4, A2 and A4, and A3 and A4. In a case where one of the 2 points is point A1 or point A4 of one of the ends, an accurate approximation formula can be obtained. Thus, one of the 2 points is preferably point A1 or point A4.

Figure 64:
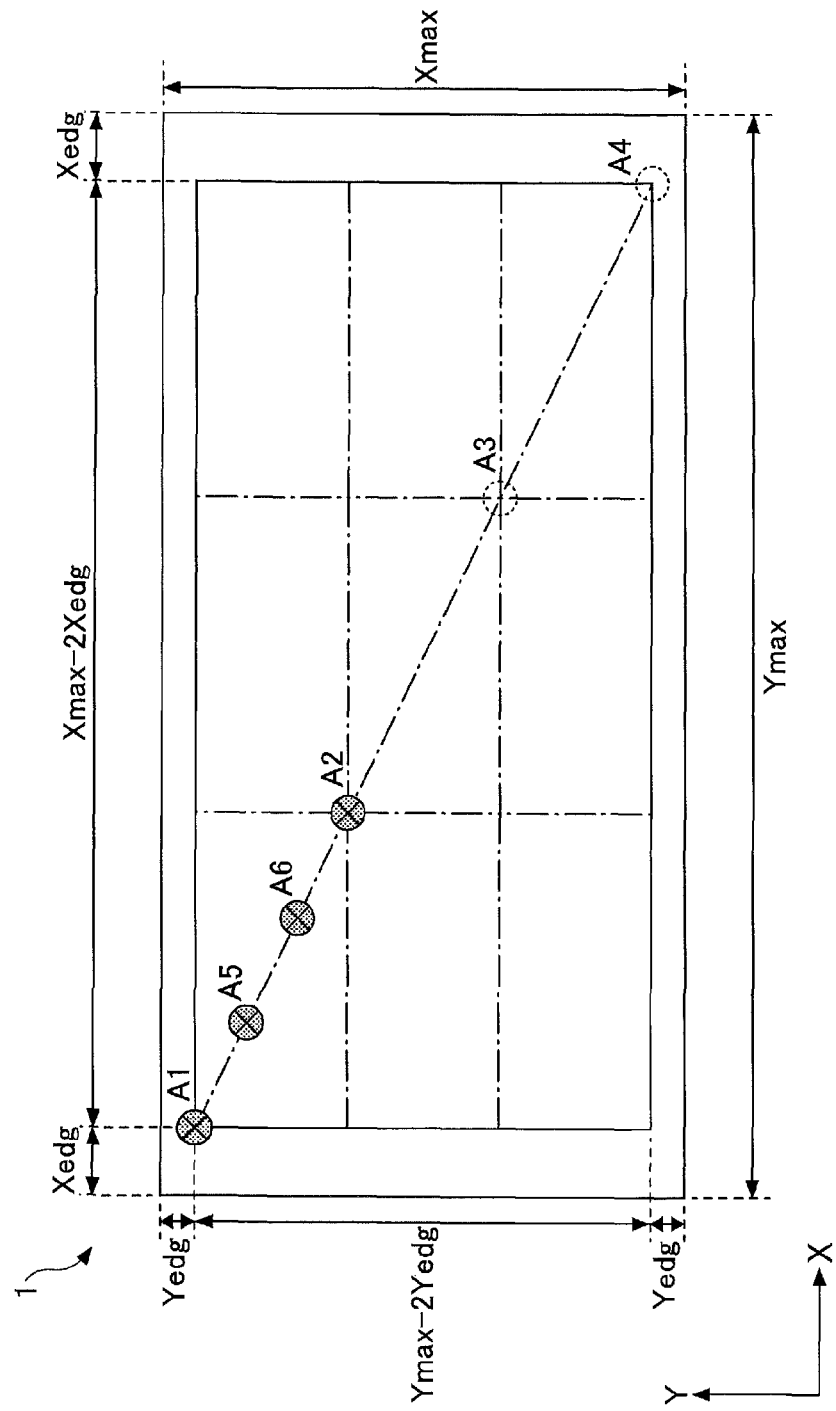
FIG. 64 is a diagram for describing another initialization method of a touch panel of the seventh embodiment.

Further, because error tends to occur in a case of point A1 and point A2, an area between point A1 and point A2 may be equally divided into three parts, and include points A5 and A6 as illustrated in FIG. 64, so that an initialization process of FIGS. 61-63 can be performed again with respect to points A1, A5, A6, and A2. Thereby, a separate process for calculating the approximation formula of the space between points A1 and A2 may be performed. In this case, the process of the flowchart of FIGS. 61-63 is performed assuming that point A5 corresponds to point A2, point A6 corresponds to point A3, and point A2 corresponds to point A4.

In this embodiment, $L_2$ and $L_4$ of the cubic formula of Expression 2 can be calculated by using any 5 points of points A1, A2, A3, A4, A5, and A6. Further, $L_1$ and $L_3$ of Expression 2 can also be calculated by depressing 5 points arranged in the X and Y axes directions.

In order to increase the accuracy of the distance between 2 points, the section for 2 point input may be further divided. For example, the relationship between the potential differences of the voltage drops and the distances of the 2 point input illustrated in FIG. 33 may be stored as a table and used to obtain a curve that runs through the input points (e.g., spline curve). The spline curve may be obtained as illustrated in the quadratic formula of Expression 1. Thereby, the distance between 2 points can be calculated with greater accuracy based on the potentials measured during the 2 point input operation.

Further, the following method is provided as a method for simplifying the calculation of the approximation formula used for two point coordinate calculation. More specifically, a representative touch panel is selected from touch panels of various sizes. The potential differences of the voltage drops, which are obtained by performing 2 point input for a multiple number of times on the selected touch panel, are stored as a table in a ROM (Read Only Memory) or the like. Then, a touch panel separate from the selected touch panel is connected to a circuit board including the control part for calculating a ratio of the potential difference of the voltage drop of 2 input points having a largest distance. Then, a coefficient is calculated by multiplying the calculated ratio of the potential difference of the voltage drop of 2 input points having the largest distance with the ratio of the potential difference of the voltage drop of 2 input points having the largest distance that is stored in the ROM or the like. Then, the coordinates of 2 points that match the connected touch panel can be obtained based on the calculated coefficient.

Further, in this embodiment, the quadratic approximation formula of Expression 1 is calculated in Step S932. However, a linear approximation formula may be calculated by connecting the points A1 and A2, points A2 and A3, and points A3 and A4. More specifically, linear approximation formulas illustrated in Expression 8 may be calculated based on the measured values. In this case, $\epsilon_1$-$\epsilon_6$ and $\eta_1$-$\eta_6$ are calculated based on the values of 2 linearly connected points.

$$Lx=\epsilon_1 V+\eta_1 (XA1 \leq Lx \leq XA2)$$

$$Lx=\epsilon_2 V+\eta_2 (XA2 \leq Lx \leq XA3)$$

$$Lx=\epsilon_3 V+\eta_3 (XA3 \leq Lx \leq XA4)$$

$$Ly=\epsilon_4 V+\eta_4 (YA1 \leq Ly \leq YA2)$$

$$Ly=\epsilon_5 V+\eta_5 (YA2 \leq Ly \leq YA3)$$

$$Ly=\epsilon_6 V+\eta_6 (YA3 \leq Ly \leq YA4) \quad \text{[Expression 8]}$$

<Eighth Embodiment>

Figure 65A:
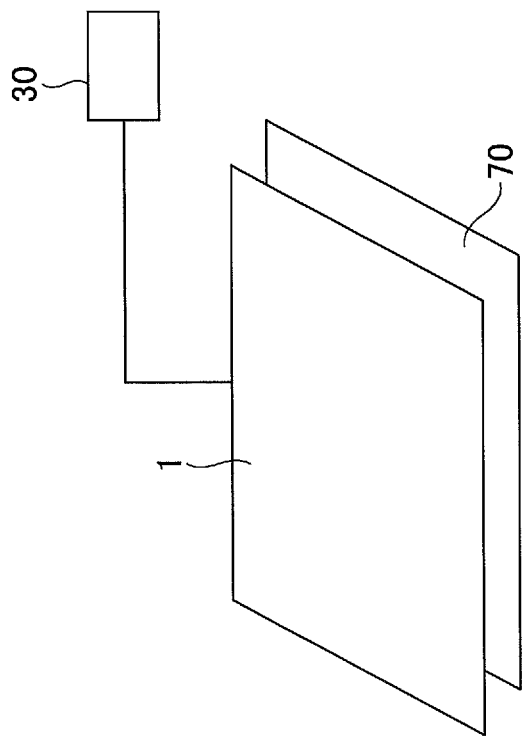
FIGS. 65A-65B are diagrams for describing a touch panel according to an eighth embodiment of the present invention.
Figure 65B:
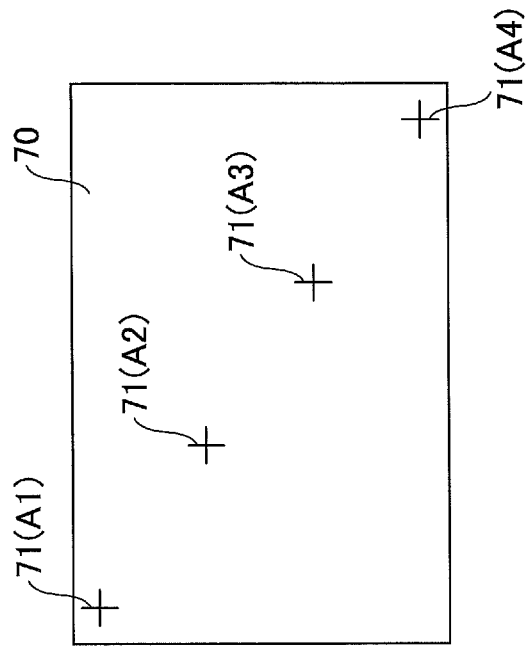
Figure 67:
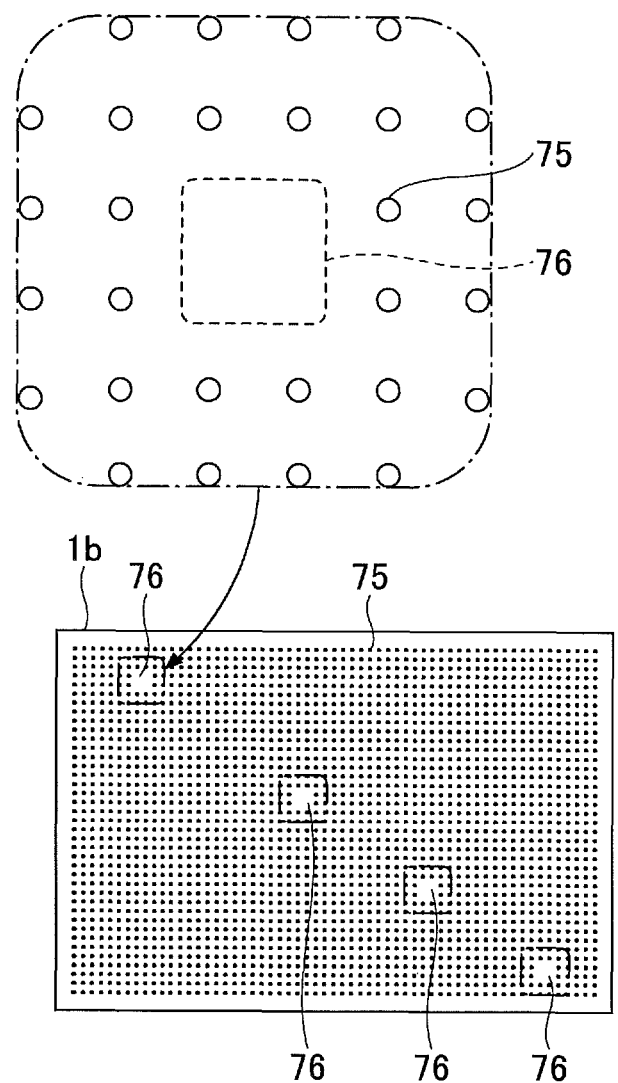
FIG. 67 a diagram (2) for describing another initialization method of a touch panel of the seventh embodiment.

Next, an eighth embodiment is described. This embodiment is a method for initializing a touch panel without having to use the display apparatus 4. More specifically, a display jig 70 is used instead of the display apparatus 40, in which marks 71 for printing are formed in areas of the display jig 70 in correspondence with points A1, A2, A3, and A4 as illustrated in FIGS. 65A-65B. By placing the touch panel 1 on the display jig 70, initialization can be performed in the same manner as the method of seventh embodiment. FIG. 65A is a perspective view illustrating an entire structure used for this method. FIG. 65B is an upper plan view of the display jig 70.

Alternatively, marks 73 that indicate the positions of point A1, point A2, point A3, and point A4 may be provided in the periphery of the touch panel 1a as illustrated in FIGS. 66A-66B. The marks 73 may be formed with, for example, a conductive paste. More specifically, the marks 73 may be formed, so that points A1, A2, A3, and A4 are located in positions at which straight lines connecting the marks 73 provided on opposite positions relative to the X axis direction intersect with straight lines connecting the marks 73 provided on opposite positions relative to the Y axis direction. Thereby, the points that are to be the contact points can be displayed. FIG. 66A is a perspective view illustrating an entire structure used for this method. FIG. 66B is an upper plan view of the touch panel 1a.

Alternatively, a touch panel 1b may have depression areas that are formed by thinning out dot spacers 75 in positions corresponding to points A1, A2, A3, and A4. The depression areas 76 are points that are to be the contact points.

<Ninth Embodiment>

Next, a ninth embodiment is described. This embodiment is a position detection method and a touch panel for obtaining position coordinates of 2 contact points with greater accuracy in a case where the touch panel is contacted at 2 points.

Figure 68:
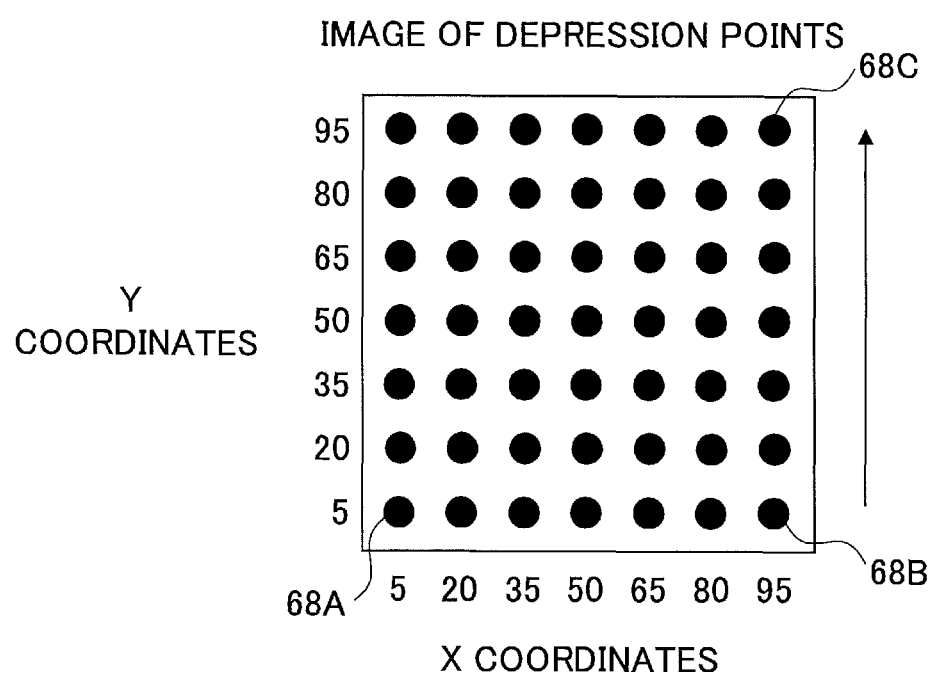
FIG. 68 is a diagram (1) for describing depression points in a touch panel according to a ninth embodiment of the present invention.

In the first to eighth embodiments, the position coordinates of contact points can be detected in a case where the touch panel is contacted at 2 points. However, in a case where relative positions between 2 points are different, it may be difficult to accurately detect the positions of the 2 contact points. More specifically, as illustrated in FIG. 68, even if the positions (values) of the X coordinates of point 68B and point 68C are the same, the positions (values) of the X coordinates of the point 68B and point 68C that are detected may slightly differ in a case where the 2 contact points are point 68A and point 68B and in a case where the 2 contact points are point 68A and point 68C.

Figure 69:
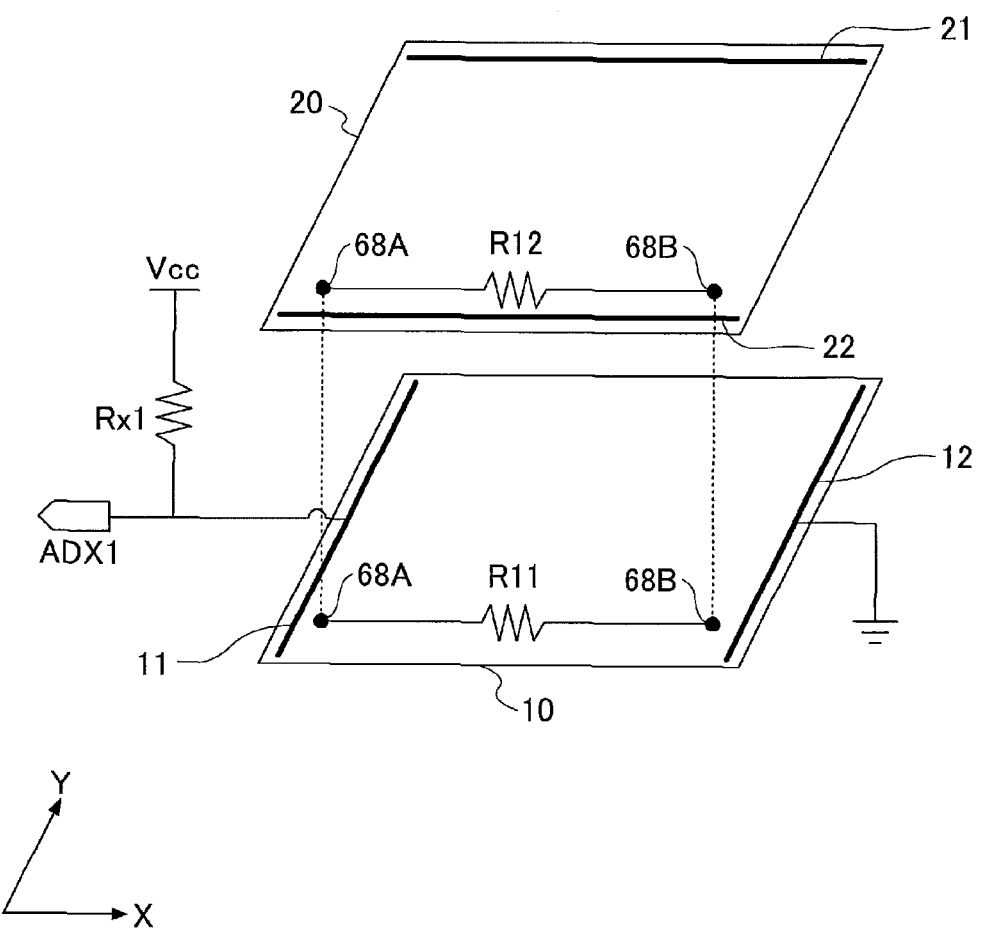
FIG. 69 is a diagram (1) for describing a position detection method of a touch panel of the ninth embodiment.
Figure 70:
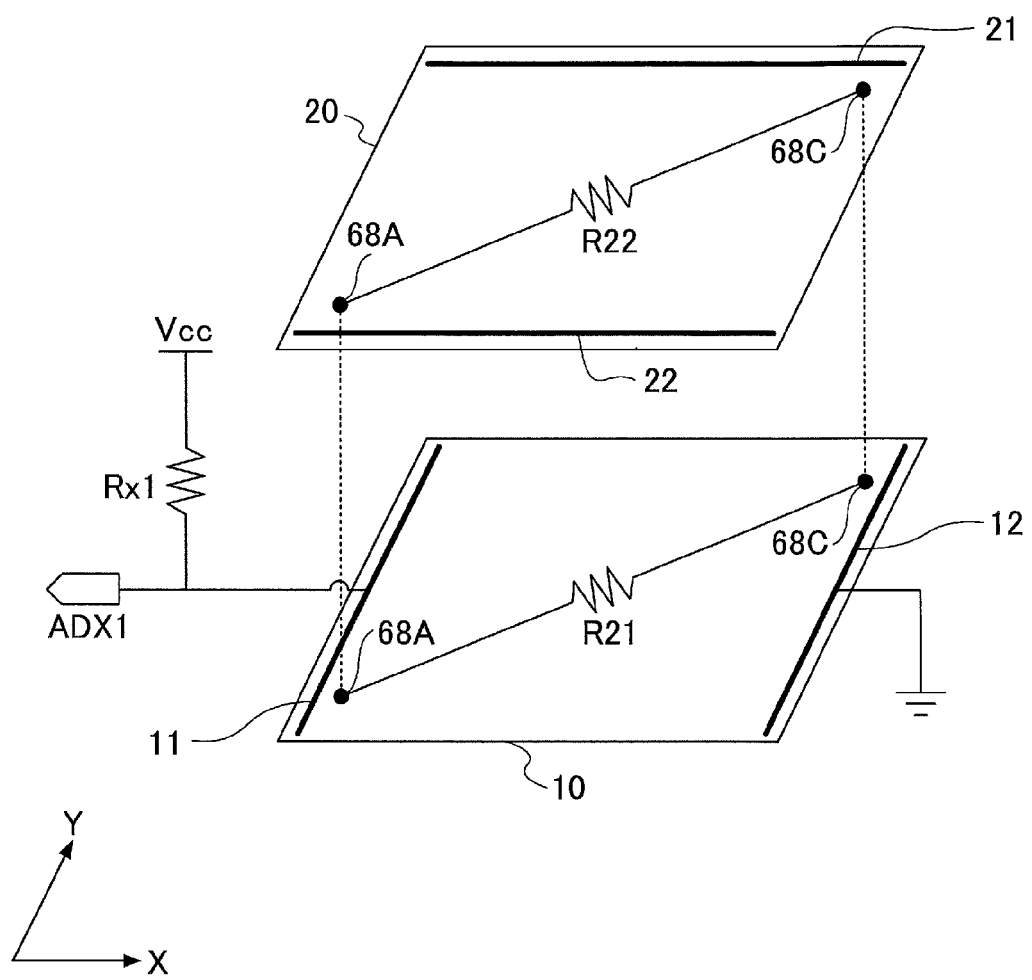
FIG. 70 is a diagram (2) for describing a position detection method of a touch panel of the ninth embodiment.

This is described in detail based on FIG. 69 and FIG. 70. In a case where the 2 contact points are point 68A and 68B, the value of the combined resistance of the resistor R11 of the first resistance film 10 and the resistor R12 of the second resistance film 12 is the resistance value between point 68A and point 68B as illustrated in FIG. 69. On the other hand, in a case where the 2 contact points are point 68A and 68C, the value of the combined resistance of the resistor R21 of the first resistance film 10 and the resistor R22 of the second resistance film 12 is the resistance value between point 68A and point 68C as illustrated in FIG. 70. The resistance value of the resistor R21 of the first resistance film 10 is greater than the resistance value of the resistor R11 of the first resistance film, and the resistance value of the resistor R22 of the first resistance film 10 is greater than the resistance value of the resistor R12 of the first resistance film 10.

Therefore, the resistance value of the combined resistance of the resistor R21 and the resistor R22 is greater than the resistance value of the combined resistance of the resistor R11 and the resistor R12.

Therefore, even in a case where points 68B and 68C have the same X coordinate positions (values), the potential detection part ADX1 may detect different voltages from the contact points. That is, as illustrated in FIG. 69, in a case where the value of the combined voltage of the resistor R11 and the resistor R12 is low, the voltage detected by the potential detection part ADX1 may be a relatively low voltage of, for example, 2.0 V due to the voltage division by the resistor Rx1. Further, as illustrated in FIG. 70, in a case where the value of the combined voltage of the resistor R21 and the resistor R22 is high, the voltage detected by the potential detection part ADX1 may be a relatively high voltage of, for example, 2.2 V due to the voltage division by the resistor Rx1. Therefore, even in a case where points 68B and 68C have the same X coordinate positions, the potential detection part ADX1 may detect different voltages from the contact points. Accordingly, in a case where voltages of different values are detected by the potential detection part ADX1, the X coordinate positions are also determined to be different positions. In a case where the touch panel is not being contacted, the voltage detected by the potential detection parts ADX1 is 2.5 V.

Therefore, in a case where the 2 contact points are point 68A and point 68B, the voltage detected by the potential detection part ADX1 is 2.0 V, and the voltage drop becomes 0.5 V. In a case where the 2 contact points are point 68A and point 68C, the voltage detected by the potential detection part ADX1 is 2.2 V, and the voltage drop becomes 0.3 V. Therefore, assuming that the criterion is the voltage drop in a case where the 2 contact points are point 68A and point 68B, the voltage drop is small in a case where the 2 contact points are point 68A and point 68C.

Figure 71:
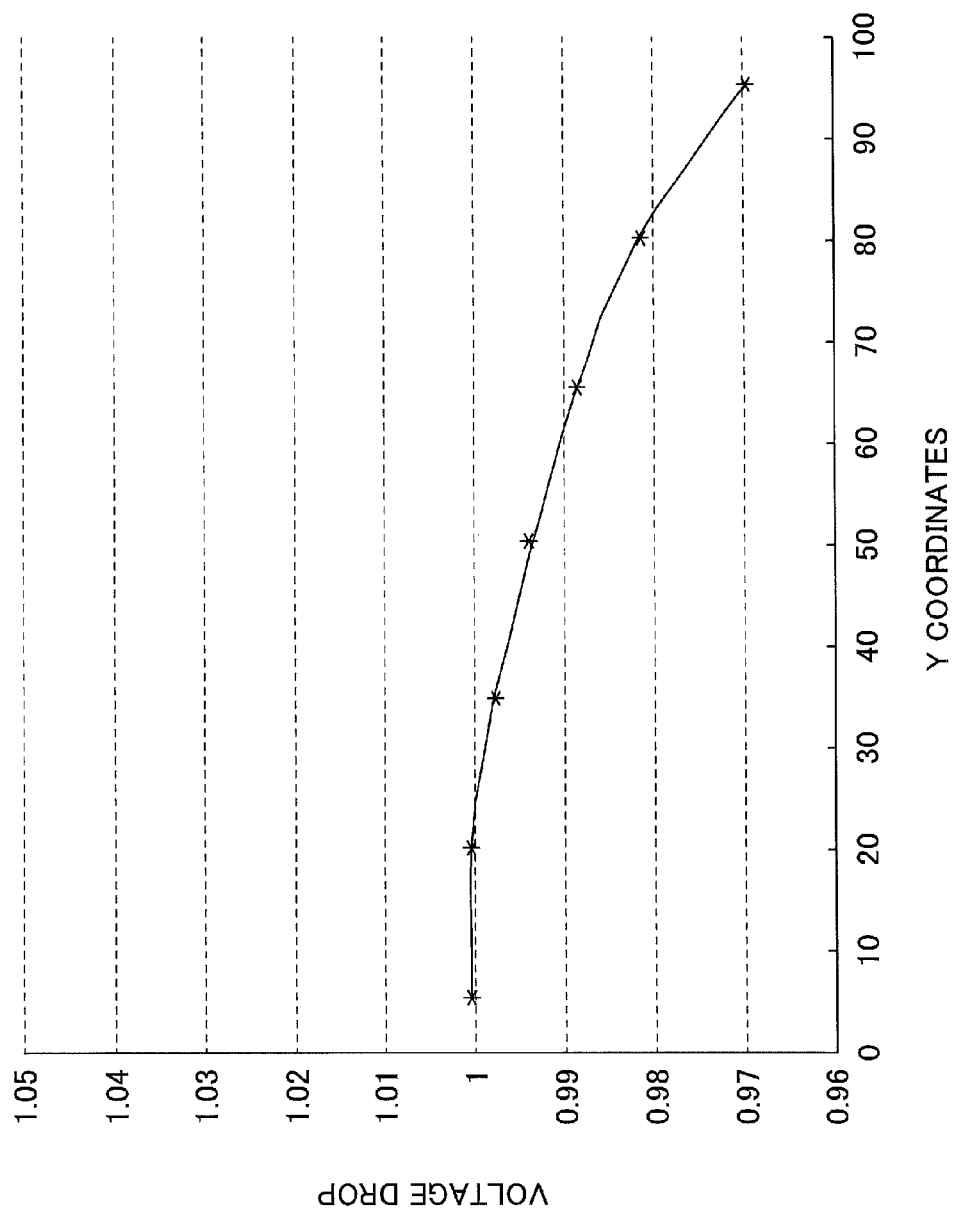
FIG. 71 is a diagram illustrating a correlation between positions of Y coordinate of 1 point among 2 points and a value of voltage drop.

Accordingly, a simulation was conducted on the relationship between Y coordinate positions and voltage drops at contact points by using the following combinations of 2 contact points (5, 5)-(95, 5), (5, 5)-(95, 20), (5, 5)-(95, 30), (5, 5)-(95, 50), (5, 5)-(95, 65), (5, 5)-(95, 80), and (5,5)-(95, 95) illustrated in the depression image of FIG. 68. Results obtained by the simulation are illustrated in FIG. 71. It is to be noted that the position of Y coordinates indicates the Y coordinate position of one of the 2 contact points that is moved. Further, the value of the voltage drop in FIG. 71 is normalized by the value of the voltage drop in a case where the combination of the 2 contact points is (5, 5)-(95, 5). As illustrated in FIG. 71, the voltage drop becomes smaller as the distance between the Y coordinates of the 2 contact points in the touch panel increases. Therefore, in a case where the space (distance) between the Y coordinates of the 2 contact points in the touch panel increases, the distance of the X coordinates of the 2 points is determined to be shorter than the actual distance.

In the position detection method of the touch panel of this embodiment, the distance of 2 contact points in the X direction can be corrected based on the distance between 2 contact points in the Y direction. Thereby, the X coordinate positions of 2 contact points can be calculated based on the corrected distance of the 2 contact points in the X direction.

Figure 72:
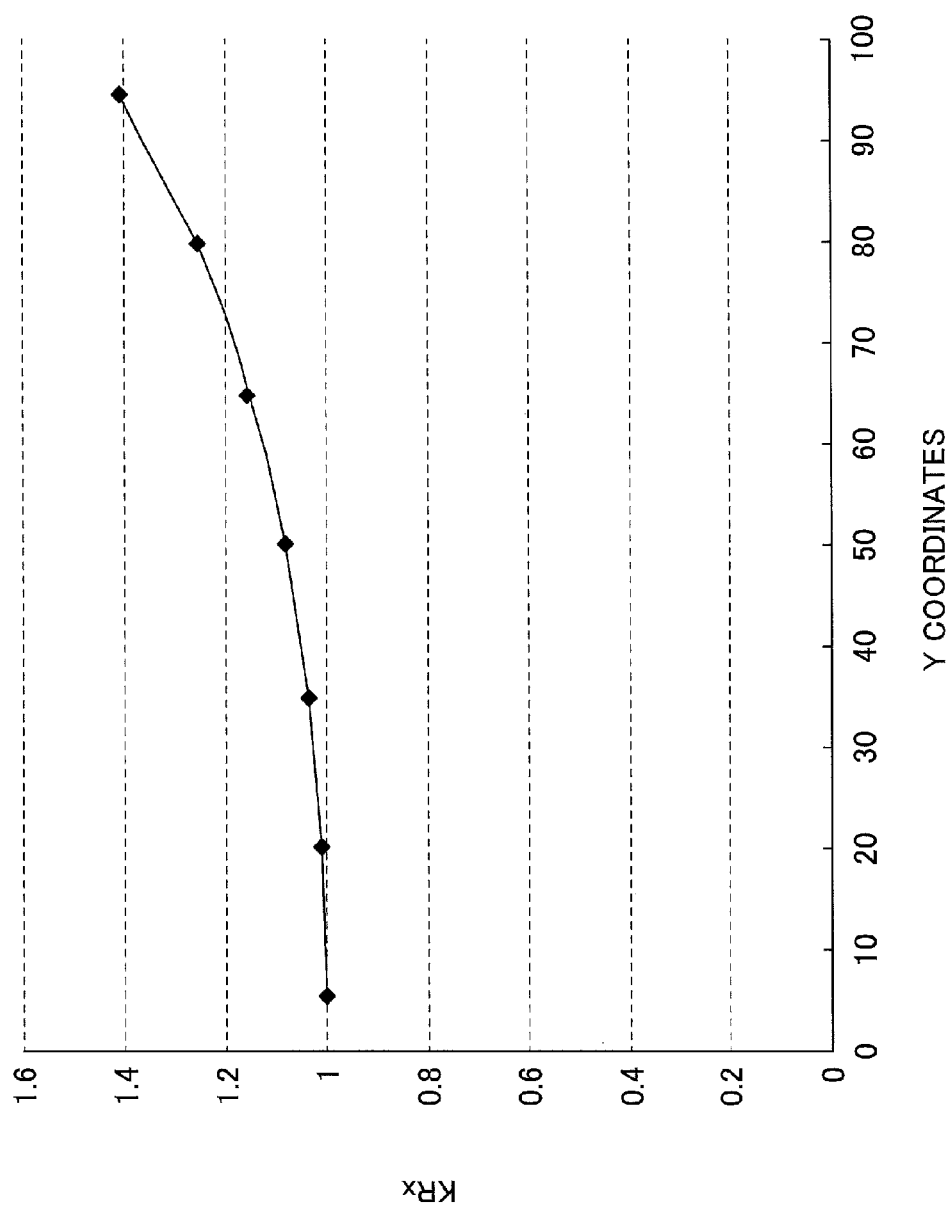
FIG. 72 is a diagram illustrating a correlation between positions of Y coordinate of 1 point among 2 points and a value of correction coefficient KRx.

FIG. 72 is a graph illustrating a relationship between Y coordinates of one of the 2 contact points obtained in FIG. 71 and correction coefficients. It is to be noted that Ly indicates a distance (space) between 2 points in the Y direction. That is, in a case where 2 points of (5, 5) and (95, 5) are to be the contact points, the distance Ly is 90=95−5). The correction coefficient KRx can be approximated with a quadratic formula of Ly. Expression 9 illustrates an approximation of the formula.

$$KRx = \alpha Ly^2 + \beta Ly + \gamma \qquad \text{[Expression 9]}$$

In a case where Lxa indicates the distance between the X coordinates of 2 points based on the voltage detected by the potential detection part ADX1, the distance Lxb between the X coordinates of 2 points can be expressed by using the correction coefficient KRx as illustrated with the formula of Expression 10.

$$Lxb = KRx \times Lxa \qquad \text{[Expression 10]}$$

In Expression 10, a predetermined coefficient pertaining to a predetermined aspect ratio is multiplied in the X direction or the Y direction in a case where the aspect ratio of the touch panel is different. Similarly, the distance between the Y coordinates of 2 points can be calculated by using the above-described method.

Accordingly, with the above-described embodiment, position coordinates of 2 contact points can be calculated with greater accuracy in a case where the touch panel is contacted at 2 points.

Further, with the touch panel of this embodiment, the formula of Expression 9 is stored in the memory 32, and the distance of the X or Y coordinates of 2 points can be calculated by the control part 30 based on the formula of Expression 10.

Figure 73:
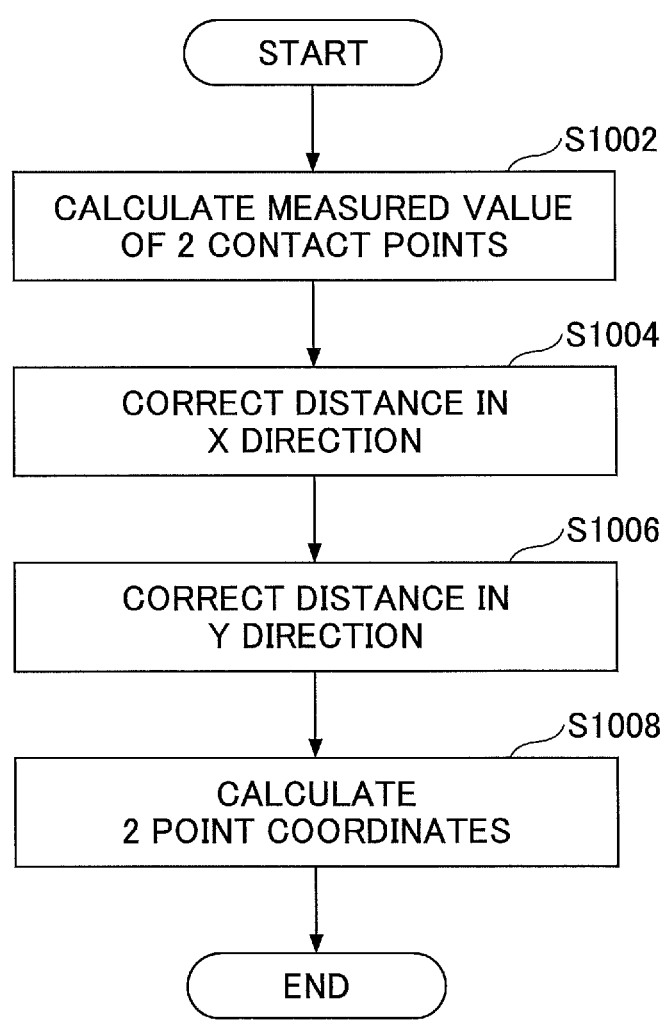
FIG. 73 is a flowchart (1) of a position detection method in a touch panel according to a ninth embodiment of the present invention.

Next, a position detection method in a touch panel of this embodiment is described based on FIG. 73. In the position detection method illustrated in FIG. 73, correction coefficients KRx for the X axis direction and correction coefficients KRy for the Y axis direction are stored beforehand in the memory 32.

First, in Step S1002, by contacting the touch panel at 2 points, measured values of the X and Y coordinates of the 2 contact points are calculated based on the voltages detected by the potential detection part.

In Step S1004, the distance of the 2 points in the X direction is corrected. More specifically, measured values of the distance between 2 points in the Y direction are calculated based on the Y coordinates of the 2 contact points calculated in Step S1002. Then, correction is performed by multiplying the correction coefficient KRx of FIG. 72 with the measured distance between the 2 points in the X direction based on the distance of the 2 points in the Y direction. That is, the formula Lxb of Expression 10 is calculated.

In Step S1006, the distance of the 2 points in the Y direction is corrected. More specifically, measured values of the distance between 2 points in the X direction are calculated based on the X coordinates of the 2 contact points calculated in Step S1002. Then, correction is performed by multiplying the correction coefficient KRy with the measured distance between the 2 points in the Y direction based on the distance of the 2 points in the X direction. In other words, a similar correction as Step S1004 is also performed for the distance in the Y direction. Thereby, the distance of the corrected 2 points can be calculated.

In Step S1008, the position coordinates of the 2 contact points are calculated based on, for example, the distance of the corrected 2 points in the X direction, the distance of the corrected 2 points in the Y direction, and the measured values of the X, Y coordinates of the 2 contact points.

Then, in a case where the touch panel is contacted at 2 points, the position coordinates of the 2 points can be accurately calculated. In a case where the aspect ratio of the touch panel is different, the distance may be calculated by multiplying a coefficient in correspondence with the aspect ratio.

In a case where correction coefficients KRx, KRy are not stored in the memory 32 or the like beforehand, the correction coefficients KRx, KRy may be calculated by using the method illustrated in FIG. 74 and stored in the memory 32 or the like.

More specifically, first, in Step S1012, in a state where the touch panel is contacted at 2 points, the potential detection part ADX1 detects voltage by moving one of the 2 points in the Y direction without changing the position of the X coordinates. Thereby, a correlation between the Y coordinates and voltage drop illustrated in FIG. 71 is obtained.

In Step S1014, the correction coefficient KRx is calculated based on the correlation obtained in Step S1012.

In Step S1016, in a state where the touch panel is contacted at 2 points, the potential detection part ADY1 detects voltage by moving one of the 2 points in the X direction without changing the position of the Y coordinates. Thereby, a correlation between the X coordinates and voltage drop illustrated in FIG. 71 is also obtained.

In Step S1018, the correction coefficient KRy is calculated based on the correlation obtained in Step S1016.

In Step S1020, the correction coefficients KRx and KRy are stored in the memory 32 or the like.

The ninth embodiment is similar to the first-eighth embodiments other than the content described above.

According to the above-described embodiments of the present invention, there can be provided a position detection method and a touch panel that allow position coordinates to be accurately detected with a 4-line type touch panel with a simple method and at a low cost even in a case where two points are simultaneously contacted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A position detection method in a touch panel that includes a first resistance film having first and second electrodes provided one on each end in a first direction and a second resistance film having third and fourth electrodes provided one on each end in a second direction orthogonal to the first direction, the position detection method comprising:
   calculating a distance between two contact points in the first direction by measuring a potential of the first electrode in a state where a power supply voltage is applied to the first electrode and the second electrode is grounded;
   calculating a distance between the two contact points in the second direction by measuring a potential of the third electrode in a state where a power supply voltage is applied to the third electrode and the fourth electrode is grounded; and
   correcting the calculated distance between the two contact points in the first direction by multiplying the calculated distance between the two contact points in the first direction by a correction coefficient calculated from the calculated distance between the two contact points in the second direction,
   wherein the correction coefficient increases as the calculated distance between the two contact points in the second direction increases, and decreases as the calculated distance between the two contact points in the second direction decreases.

2. The position detection method in a touch panel as claimed in claim 1, wherein the calculated distance between the two contact points in the second direction is corrected based on the calculated distance between the two contact points in the first direction obtained by the potential of the first electrode.

3. The position detection method in a touch panel as claimed in claim 2, wherein at a time of the correcting of the calculated distance between the two contact points in the second direction, the calculated distance between the two contact points in the second direction is multiplied by a correction coefficient that is defined in accordance with a space between the two contact points in the first direction.

4. The position detection method in a touch panel as claimed in claim 1, wherein the correction coefficient is a quadratic equation of the calculated distance between the two contact points in the second direction.

5. The position detection method as claimed in claim 1, further comprising:
   calculating coordinates of the two contact points in the first direction based on the corrected distance between the two contact points in the first direction.

6. The position detection method as claimed in claim 1, wherein as the calculated distance between the two contact points in the second direction increases, the calculated distance between the two contact points in the first direction becomes shorter than an actual distance between the two contact points in the first direction.

7. A position detection method in a touch panel that includes a first resistance film having first and second electrodes provided one on each end in a first direction and a second resistance film having third and fourth electrodes provided one on each end in a second direction orthogonal to the first direction, the position detection method comprising:
    measuring a potential of the first electrode when the touch panel is contacted at two contact points by applying voltage to the first electrode without applying voltage to the third electrode;
    measuring a potential of the third electrode when the touch panel is contacted at the two contact points by applying voltage to the third electrode without applying voltage to the first electrode; and
    correcting a distance between the two contact points by correcting a distance between the two contact points in the first direction obtained by the measured potential of the first electrode by multiplying the obtained distance between the two contact points in the first direction by a first correction coefficient calculated from a distance between the two contact points in the second direction obtained by the measured potential of the third electrode, wherein the first correction coefficient increases as the calculated distance between the two contact points in the second direction increases, and decreases as the calculated distance between the two contact points in the second direction decreases.

8. The position detection method as claimed in claim 7, further comprising:
    calculating coordinates of the two contact points in the first direction based on the corrected distance between the two contact points in the first direction.

9. The position detection method as claimed in claim 7, wherein as the distance between the two contact points in the second direction increases, the distance between the two contact points in the first direction becomes shorter than an actual distance between the two contact points in the first direction.

10. The position detection method as claimed in claim 7, further comprising:
    correcting the obtained distance between the two contact points in the second direction by multiplying the obtained distance between the two contact points in the second direction by a second correction coefficient calculated from the obtained distance between the two contact points in the first direction, wherein the second correction coefficient increases as the calculated distance between the two contact points in the first direction increases, and decreases as the calculated distance between the two contact points in the first direction decreases.

11. A touch panel comprising:
    a first resistance film having first and second electrodes provided one on each end in a first direction;
    a second resistance film having third and fourth electrodes provided one on each end in a second direction orthogonal to the first direction;
    a control part; and
    a storage part;
    wherein in a case where the touch panel is contacted at two contact points, the control part is configured to
    calculate a distance between the two contact points in the first direction by measuring a potential of the first electrode in a state where a power supply voltage is applied to the first electrode and the second electrode is grounded,
    calculate a distance between the two contact points in the second direction by measuring a potential of the third electrode in a state where a power supply voltage is applied to the third electrode and the fourth electrode is grounded, and
    correct the calculated distance between the two contact points in the first direction by multiplying the calculated distance between the two contact points in the first direction by a correction coefficient calculated from the calculated distance between the two contact points in the second direction,
    wherein the correction coefficient increases as the calculated distance between the two contact points in the second direction increases, and decreases as the calculated distance between the two contact points in the second direction decreases, and
    wherein the correction coefficient is stored in the storage part.

12. The touch panel as claimed in claim 11, wherein the storage part stores a correlation between the distance between the two contact points in the second direction and the correction coefficient.

13. The touch panel as claimed in claim 11, wherein the control part is further configured to calculate coordinates of the two contact points in the first direction based on the corrected distance between the two contact points in the first direction.

14. The touch panel as claimed in claim 11, wherein as the calculated distance between the two contact points in the second direction increases, the distance between the two contact points in the first direction becomes shorter than an actual distance between the two contact points in the first direction.

* * * * *